United States Patent
Hsieh et al.

(10) Patent No.: US 12,008,191 B2
(45) Date of Patent: Jun. 11, 2024

(54) SINGLE-CHIP DEVICE FOR DRIVING A PANEL INCLUDING FINGERPRINT SENSING PIXELS, DISPLAY PIXELS AND TOUCH SENSORS, ELECTRONIC MODULE THEREFOR, AND ELECTRONIC APPARATUS INCLUDING THE SINGLE-CHIP DEVICE

(71) Applicant: NOVATEK MICROELECTRONICS CORP., Hsinchu (TW)

(72) Inventors: Tzu-Wen Hsieh, Hsinchu (TW);
Weilun Shih, Hsinchu (TW);
Ting-Hsuan Hung, Hsinchu (TW);
Huang-Chin Tang, Zhubei (TW)

(73) Assignee: Novatek Microelectronics Corp., Hsinchu (TW)

( * ) Notice: Subject to any disclaimer, the term of this patent is extended or adjusted under 35 U.S.C. 154(b) by 257 days.

(21) Appl. No.: 17/037,760

(22) Filed: Sep. 30, 2020

(65) Prior Publication Data
US 2021/0109638 A1    Apr. 15, 2021

Related U.S. Application Data

(60) Provisional application No. 62/912,666, filed on Oct. 9, 2019.

(51) Int. Cl.
*G06F 3/041*    (2006.01)
*G06V 40/13*   (2022.01)
*G09G 3/20*    (2006.01)

(52) U.S. Cl.
CPC ........ *G06F 3/04164* (2019.05); *G06F 3/0412* (2013.01); *G06F 3/04166* (2019.05); *G06V 40/1318* (2022.01); *G09G 3/20* (2013.01)

(58) Field of Classification Search
None
See application file for complete search history.

(56) References Cited

U.S. PATENT DOCUMENTS

| | | | |
|---|---|---|---|
| 2019/0138123 A1 | 5/2019 | Jung et al. | |
| 2019/0179463 A1* | 6/2019 | Lim | G06F 1/1626 |
| 2020/0320269 A1* | 10/2020 | Kim | G06F 3/0416 |
| 2021/0167135 A1* | 6/2021 | Park | G06V 40/13 |

* cited by examiner

*Primary Examiner* — Krishna P Neupane
(74) *Attorney, Agent, or Firm* — JCIPRNET

(57) ABSTRACT

A single-chip device for driving a panel including fingerprint sensing pixels, display pixels and touch sensors, electronic module therefor, and electronic apparatus including the single-chip device are provided. The single-chip device comprises a main body, a first group of pads and a second group of pads disposed in the main body. The main body has a left portion and a right portion with respect to an axis. The first group of pads comprise a plurality of first pads for driving the fingerprint sensing pixels, are disposed on both the left portion and the right portion and configured to be coupled to the fingerprint sensing pixels. The second group of pads comprise a plurality of second pads for driving the display pixels and the touch sensors, are disposed on both the left portion and the right portion and configured to be coupled to the panel.

106 Claims, 31 Drawing Sheets

SINGLE-CHIP DEVICE FOR DRIVING A PANEL INCLUDING FINGERPRINT SENSING PIXELS, DISPLAY PIXELS AND TOUCH SENSORS, ELECTRONIC MODULE THEREFOR, AND ELECTRONIC APPARATUS INCLUDING THE SINGLE-CHIP DEVICE

CROSS-REFERENCE TO RELATED APPLICATION

This non-provisional application claims priority under 35 U.S.C. § 119(e) on U.S. provisional Patent Application No. 62/912,666 filed on Oct. 9, 2019, the entire contents of which are hereby incorporated by reference.

BACKGROUND OF THE INVENTION

1. Field of the Invention

The present disclosure relates to a technology for driving fingerprint sensing pixels, display pixels and touch sensors in a computing device, and in particular to a single-chip device for driving a panel including fingerprint sensing pixels, display pixels and touch sensors, an electronic module therefor, and an electronic apparatus including the single-chip device.

2. Description of the Related Art

For computing devices, such as smart phones, tablet computers or other information processing devices, touch screens are indispensable components of the computing devices for user interactions. In order to simplify circuit area, circuit layout, and make the computing device thinner, a touch and display driver integration (TDDI) integrated circuit that combines a touch controller and a display driver circuit into a single chip has been utilized to drive and control the display panel and the associated touch sensors of the display panel of the computing device such as smart phones and tablet computers using LCD display technology.

On the other hand, fingerprint sensing is becoming standard functionality of the computing devices to meet the emerging needs for enhancing security in various applications such as fingerprint identification in unlocking the computing device etc. As the technology progresses, some smart phones nowadays have been equipped with a front-mounted in-display or under-display fingerprint sensor.

As such, it is challenging to design circuits and layout for circuit traces and control circuits for a display panel associated with touch sensing and fingerprint sensing elements in a computing device such as smart phones or tablet computers as circuit complexity increases due to the requirements of touch sensing, fingerprint sensing, and display driving associated with the display panel.

BRIEF SUMMARY OF THE INVENTION

The present disclosure provides architecture for driving fingerprint sensing pixels, display pixels, and touch sensors by using a single-chip device in a computing device. Based on the architecture, the single-chip device can be implemented to have its pads arranged in a manner so that the electrical connection of the pads and control lines or related lines for the fingerprint sensing pixels, display pixels, and touch sensors can be realized by using traces without crossing over each other. In this way, circuit layout simplification and circuit load balance of the traces can be facilitated.

The present disclosure provides a single-chip device for driving a panel including a plurality of display pixels, a plurality of touch sensors and a plurality of fingerprint sensing pixels, as exemplified in some embodiments below. The single-chip device comprises a main body, a first group of pads disposed in the main body, and a second group of pads disposed in the main body. The main body has a left portion and a right portion with respect to an axis. The first group of pads comprise a plurality of first pads for driving the fingerprint sensing pixels, wherein the first group of pads are disposed on both the left portion and the right portion and configured to be coupled to the fingerprint sensing pixels. The second group of pads comprise a plurality of second pads for driving the display pixels and the touch sensors, wherein the second group of pads are disposed on both the left portion and the right portion and configured to be coupled to the panel.

In some embodiments of the single-chip device, the main body has a rectangular shape having a first side, a second side parallel to the first side and closer to the panel than the first side, a left side on the left portion and perpendicular to the first side and the second side, and a right side on the right portion and parallel to the left side, and the axis intersects with the first side and the second side.

In some embodiments of the single-chip device, all the first group of pads and all the second group of pads are disposed along the first side.

In some embodiments of the single-chip device, the first group of pads are closer to the axis than the second group of pads.

In some embodiments of the single-chip device, the second group of pads are closer to the axis than the first group of pads.

In some embodiments of the single-chip device, all the first group of pads and all the second group of pads are disposed along the second side.

In some embodiments of the single-chip device, the first group of pads are closer to the axis than the second group of pads.

In some embodiments of the single-chip device, the second group of pads are closer to the axis than the first group of pads.

In some embodiments of the single-chip device, all the first group of pads are disposed along one of the first side and the second side, and all the second group of pads are disposed along both the left side and the right side.

In some embodiments of the single-chip device, all the first group of pads are disposed along both the left side and the right side, and all the second group of pads are disposed along one of the first side and the second side.

In some embodiments of the single-chip device, all the first group of pads are disposed along the left side and the right side, and all the second group of pads are disposed along the left side and the right side.

In some embodiments of the single-chip device, the first pads comprise a plurality of fingerprint gate-driver-on-array selection pads.

In some embodiments of the single-chip device, the second pads comprise a plurality of gate-driver-on-array selection pads.

In some embodiments of the single-chip device, the panel further comprises a plurality of data lines coupled to the display pixels, a plurality of fingerprint sensing lines coupled to the fingerprint sensing pixels, and a plurality of selection circuits each coupled to a corresponding set of the plurality of data lines, and the second group of pads further comprises a plurality of third pads configured to be coupled to the panel for controlling the selection circuits.

In some embodiments of the single-chip device, each of the selection circuits is further coupled to at least one of the fingerprint sensing lines.

In some embodiments of the single-chip device, the third pads are disposed on both the left portion and the right portion.

In some embodiments of the single-chip device, the main body has a rectangular shape having a first side and a second side parallel to the first side and closer to the panel than the first side, and the third pads are disposed along the first side.

In some embodiments of the single-chip device, the main body has a rectangular shape having a first side and a second side parallel to the first side and closer to the panel than the first side, and the third pads are disposed along the second side.

In some embodiments of the single-chip device, the panel further comprises a plurality of data lines coupled to the display pixels, a plurality of fingerprint sensing lines coupled to the fingerprint sensing pixels, and the single-chip device further comprises a third group of pads, disposed in the main body, for driving the data lines or receiving fingerprint sensing signals from the fingerprint sensing lines or for being coupled to the touch sensing lines of the panel and receiving touch signals from the touch sensing lines.

In some embodiments of the single-chip device, the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

In some embodiments of the single-chip device, the panel further comprises a plurality of selection circuits, wherein each of the selection circuits is coupled to a corresponding set of the plurality of data lines and a corresponding one of the fingerprint sensing lines, and wherein the first sub-group of pads are configured to be coupled to the selection circuits.

In some embodiments of the single-chip device, the first sub-group of pads and the second sub-group of pads are alternately disposed on the main body.

In some embodiments of the single-chip device, the first sub-group of pads are configured to drive the data lines in a time-division manner with the second sub-group of pads receiving touch signals from the touch sensing lines.

In some embodiments of the single-chip device, the main body has a rectangular shape having a first side and a second side parallel to the first side and closer to the panel than the first side, and the third group of pads are disposed along the second side.

In some embodiments of the single-chip device, the single-chip device further comprises a fingerprint driver circuit and a touch-display driver circuit. The fingerprint driver circuit is disposed in the main body and coupled to the first pads. The touch-display driver circuit is disposed in the main body and coupled to the second pads and the third pads.

In some embodiments of the single-chip device, in the right portion, none of the third pads is disposed between the first pads and the second pads, and in the left portion, none of the third pads is disposed between the first pads and the second pads.

In some embodiments of the single-chip device, the third pads are disposed beside the second pads and not beside the first pads.

In some embodiments of the single-chip device, the second pads are disposed beside the first pads and beside the third pads.

In some embodiments of the single-chip device, the main body is configured to be disposed on a film as a chip-on-film structure.

In some embodiments of the single-chip device, the main body is configured to be disposed on a glass as a chip-on-glass structure.

In some embodiments of the single-chip device, the single-chip device further comprises a fingerprint driver circuit and a touch-display driver circuit. The fingerprint driver circuit is disposed in the main body and coupled to the first group of pads. The touch-display driver circuit is disposed in the main body and coupled to the second group of pads.

In some embodiments of the single-chip device, in the right portion, none of the first group of pads is disposed between the second group of pads, and none of the second group of pads is disposed between the first group of pads, and in the left portion, none of the first group of pads is disposed between the second group of pads, and none of the second group of pads is disposed between the first group of pads.

In some embodiments, the panel further comprises at least one first gate-on-array (GOA) circuit, and the first group of pads are configured to be coupled to the fingerprint sensing pixels through the at least one first GOA circuit.

In some embodiments, the panel further comprises at least one second gate-on-array (GOA) circuit, and the second group of pads are configured to be coupled to the display pixels and the touch sensors through the at least one second GOA circuit.

The present disclosure further provides a single-chip device for driving a panel. The panel includes a plurality of display pixels, a plurality of touch sensors, and a plurality of fingerprint sensing pixels, the panel further includes a plurality of data lines coupled to the display pixels, a plurality of fingerprint sensing lines coupled to the fingerprint sensing pixels, and a plurality of touch sensing lines coupled to the touch sensors, and a plurality of selection circuits each coupled to a corresponding set of the plurality of data lines. The single-chip device comprises a main body, a first group of pads, a second group of pads, and a plurality of third pads, all of which are disposed in the main body. The main body has a left portion and a right portion with respect to an axis and has a rectangular shape having a first side and a second side parallel to the first side and closer to the panel than the first side. The first group of pads comprise a plurality of first pads for driving the fingerprint sensing pixels, wherein the first group of pads are disposed on both the left portion and the right portion and configured to be coupled to the fingerprint sensing pixels. The second group of pads comprise a plurality of second pads for driving the display pixels and the touch sensors, and a plurality of third pads for controlling the selection circuits, wherein the second group of pads are disposed on both the left portion and the right portion and configured to be coupled to the panel, wherein the third pads are disposed along the first side. The third group of pads are for driving the data lines or receiving fingerprint sensing signals from the fingerprint sensing lines or for being coupled to the touch sensing lines of the panel and receiving touch signals from the touch sensing lines, wherein the third group of pads are disposed along the second side.

In some embodiments of the single-chip device, the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

In some embodiments of the single-chip device, each of the selection circuits is further coupled to a corresponding one of the fingerprint sensing lines, and the first sub-group of pads are configured to be coupled to the selection circuits.

In some embodiments of the single-chip device, the first sub-group of pads are configured to drive the data lines in a time-division manner with the second sub-group of pads receiving touch signals from the touch sensing lines.

The present disclosure further provides an electronic module for driving a plurality of fingerprint sensing pixels, a plurality of display pixels and a plurality of touch sensors, as exemplified in some embodiments below. The electronic module comprises a film and a single-chip device disposed on the film, wherein the single-chip device is exemplified as in any one of the embodiments or any combination of at least one thereof, wherever appropriate.

The present disclosure further provides an electronic apparatus, as exemplified in some embodiments below. The electronic apparatus comprises a panel including a plurality of display pixels, a plurality of touch sensors and a plurality of fingerprint sensing pixels; and a single-chip device for being coupled to the panel, wherein the single-chip device is exemplified as in any one of the embodiments or any combination of at least one thereof, wherever appropriate.

In some embodiments, the fingerprint sensing pixels correspond to a fingerprint sensing region, the panel has a display region, the touch sensors correspond to a touch sensing region, and sizes of the fingerprint sensing region, the display region, and the touch sensing region are substantially the same.

In some embodiments, the electronic apparatus further comprises a substrate, and the display pixels, the touch sensors, and the fingerprint sensing pixels are disposed on the substrate.

In some embodiments, the substrate includes a glass and the single-chip device is disposed on a portion of the glass as a chip-on-glass structure.

In some embodiments, the substrate further comprises a film, and the single-chip device is disposed on the film as a chip-on-film structure.

DETAILED DESCRIPTION OF THE INVENTION

To facilitate understanding of the object, characteristics and effects of this present disclosure, embodiments together with the attached drawings for the detailed description of the present disclosure are provided. Embodiments are provided below to describe various implementations, though the disclosure is not limited to the provided embodiments, and the provided embodiments can be suitably combined. The term "coupling," "coupled," "connecting", "connected" used in this specification (including claims) of the application may refer to any direct or indirect connection. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

In the following, architecture for driving fingerprint sensing pixels, display pixels, and touch sensors by using a single-chip device in a computing device will be provided. Based on the architecture, the single-chip device can be implemented to include its pads arranged in a manner so that the electrical connection of the pads and control lines or related lines for the fingerprint sensing pixels, display pixels, and touch sensors can be realized by using traces without crossing over each other. The pad arrangement of the single-chip device can facilitate circuit layout simplification and circuit load balance of the traces.

Architecture for driving fingerprint sensing pixels, display pixels, and touch sensors by using a single-chip device is provided below.

Figure 1:
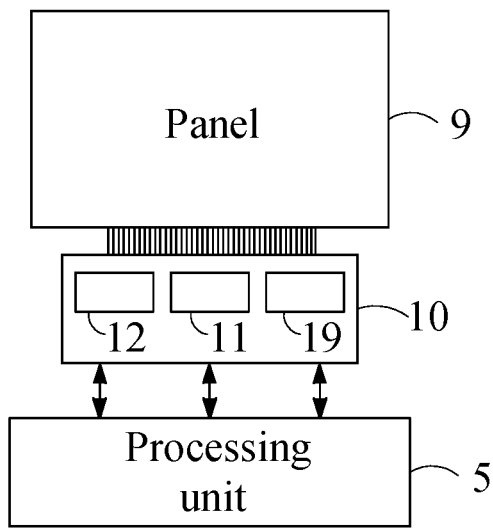
FIG. 1 is a schematic diagram illustrating architecture for driving fingerprint sensing pixels, display pixels, and touch sensors by using a single-chip device in a computing device according to various embodiments of the present disclosure.

Referring to FIG. 1, architecture for driving fingerprint sensing pixels, display pixels, and touch sensors by using a single-chip device in a computing device is illustrated according to various embodiments of the present disclosure. As shown in FIG. 1, a computing device 1 includes a processing unit 5, a single-chip device 10, and a panel 9 including a plurality of display pixels associated with a plurality of touch sensors and a plurality of fingerprint sensing pixels. The single-chip device 10 can be utilized for being coupled and serving as a "bridge" between the processing unit 5 and the panel 9 associated with the touch sensors and fingerprint sensing pixels. The processing unit 5 can be configured to control the single-chip device 10 to drive the display pixels, the fingerprint sensing pixels, and/or the touch sensors so as to display images or videos, obtain fingerprint data, and/or touch data. The panel 9 can be a display panel, for example, an on-cell touch panel or in-cell touch panel. The single-chip device 10 can be implemented to integrate and include a display driver circuit 11, a touch driver circuit 12, and a fingerprint driver circuit 19. In this manner, the single-chip device 10 can be referred to as a fingerprint, touch, display driver integration (FTDI) IC. Based on the architecture shown in FIG. 1, the single-chip device 10, as will be exemplified later in different embodiments such as FIGS. 4A, 5 or so on, can be configured to include its pads arranged in a manner so that the electrical connection between the pads and control lines or related lines for the fingerprint sensing pixels, display pixels, and touch sensors can be realized by using traces without crossing over each other.

It is noted that the single-chip device 10 may perform the driving directly on the display pixels, the fingerprint sensing pixels, and/or the touch sensors by providing related driving signals directly to the display pixels, the fingerprint sensing pixels, and/or the touch sensors. Alternatively, the single-chip device 10 may perform the driving indirectly on the display pixels, the fingerprint sensing pixels, and/or the touch sensors by providing related driving or control signals to other control circuits (such as gate driver on array; GOA circuits) which can then provide driving signal directly to the display pixels, the fingerprint sensing pixels, and/or the touch sensors. In other words, the term "driving" may mean "direct driving" which can include generating and directly applying driving signals or may mean "indirect driving" which can include causing the directly-driving signals to be generated and/or provided in different implementations.

In some embodiments, the computing device 1 (or an electronic apparatus) further comprises a substrate, and the display pixels, the touch sensors, and the fingerprint sensing pixels are disposed on (e.g., directly attached to, embedded into, or disposed above, but not limited to) the substrate. For example, the substrate includes a glass and the single-chip device 10 is disposed on a portion of the glass as a chip-on-glass structure, wherein the portion of the glass may be an extended portion separated from another portion of the glass (e.g., active area (AA)) where the display pixels, the touch sensors, and the fingerprint sensing pixels are disposed.

In some embodiments, the substrate comprises a film. The single-chip device can be disposed on the film as a chip-on-film structure.

Based on the architecture for use in the computing device 1 illustrated in FIG. 1, any electronic device such as a smart phone, tablet computer or any other information processing device can be realized, wherein the computing device 1 may further include, but not limited to, additional components such as memory, circuits for wireless or wired communication, image capturing or so on, whenever appropriate.

Figure 2:
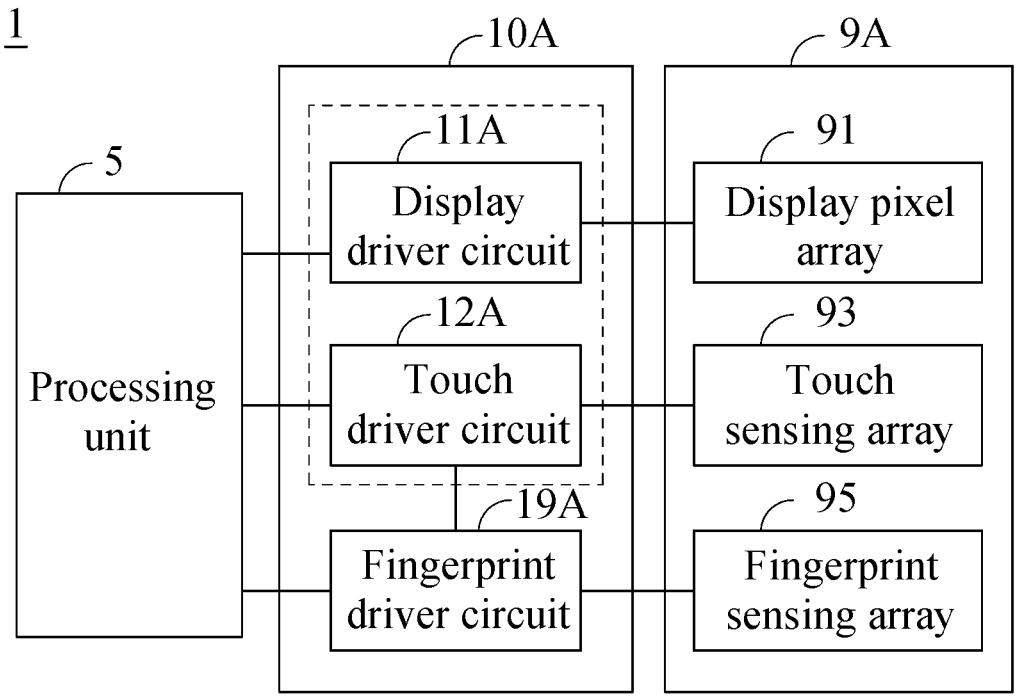
FIG. 2 is a schematic diagram illustrating an embodiment of the architecture of FIG. 1.

In an embodiment, as illustrated schematically in FIG. 2, a single-chip device 10A (e.g., an FTDI IC) integrates and includes a display driver circuit 11A, a touch driver circuit 12A, and a fingerprint driver circuit 19A, which are used for being electrically coupled to a display pixel array 91 including display pixels, a touch sensing array 93 including touch sensors, and a fingerprint sensing array 95 including fingerprint sensing pixels, respectively. The FTDI IC (e.g., single-chip device 10 or 10A) can be designed by combining circuits of discrete versions of the display driver circuit 11A, touch driver circuit 12A, and fingerprint driver circuit 19A into a single chip, or by integrating the display driver circuit 11A, touch driver circuit 12A, and fingerprint driver circuit 19A into a single chip in any appropriate manner. The FTDI IC (e.g., single-chip device 10 or 10A) can be implemented to have a reduced overall circuit area, for example, by internally sharing a same set of circuit such as a power circuit, multi-time-programmable (MTP) ROM, and/or oscillation circuit. In an exemplary implementation of an FTDI IC, the display driver circuit 11A and touch driver circuit 12A (e.g., a touch and display driver integration (TDDI) IC) can be configured to communicate with the fingerprint driver circuit 19A (e.g., including a fingerprint readout IC (ROIC)) through an internal communication interface, which can be readily implemented and controlled in a time-sharing manner. In some embodiments, an FTDI IC has different sets of circuits that are shared internally, such as those exemplified in U.S. Patent Publication No. 2018/0164943A1. Certainly, the implementation of the present disclosure is not limited to the above examples.

Regarding hardware structures of the components in the embodiment of FIG. 1 or 2, the display driver circuit (e.g., 11 or 11A), touch driver circuit (e.g., 12 or 12A), and fingerprint driver circuit (e.g., 19 or 19A) may be implemented, individually or integrally, based on a control circuit which includes a microcontroller-based or processor-based core having computational capability. Alternatively, the display driver circuit (e.g., 11 or 11A), touch driver circuit (e.g., 12 or 12A), and fingerprint driver circuit (e.g., 19 or 19A) may be designed, based on technique using hardware description languages (HDL) or any other design methods for digital circuits familiar to people skilled in the art and may be based on hardware circuits implemented using a field programmable gate array (FPGA), a complex programmable logic device (CPLD), or an application-specific integrated circuit (ASIC).

In some embodiments, the display pixel array 91 may be a liquid crystal display (LCD) pixel array, organic light emitting diode (OLED) pixel array, or any appropriate type of pixel array. The panel 9, for example, can be implemented by an in-cell type or on-cell type touch display panel integrated with fingerprint sensing, wherein the display pixel array 91, the touch sensing array 93, and the fingerprint sensing array 95 are integrated in a layered manner or any appropriate manner. The touch sensing array 93 may be implemented by using a capacitive touch sensor in a form of touch sensing array. The fingerprint sensing array 95, for example, can be implemented by an optical fingerprint sensor, capacitive fingerprint sensor, ultrasonic fingerprint sensor, or any appropriate device for sensing fingerprint signals. Certainly, the implementation of the present disclosure is not limited thereto.

In some embodiments, the fingerprint sensing pixels of the fingerprint sensing array 95 correspond to a fingerprint sensing region, the panel (or the display pixel array 91) has a display region, the touch sensors of the touch sensing array 93 correspond to a touch sensing region, and sizes of the fingerprint sensing region, the display region, and the touch sensing region are substantially the same; for example, these regions are the same, nearly the same, or slightly different, or the differences between these areas are within a range, so as to facilitate full-screen fingerprint sensing of the panel. Certainly, the implementation of the present disclosure is not limited to the examples. For example, the size of the fingerprint sensing region may be different from that of the display region.

The following provides demonstration of how critical the pad arrangement for the single-chip device is.

In practical implementations, the electrical connection between the single-chip device 10 or 10A (i.e., FTDI IC) and the display pixels of the panel 9 and the associated touch sensors and fingerprint sensing pixels are more complicated than that shown schematically in FIG. 1 or 2. A plurality of pads of the single-chip device 10 (or 10A) are arranged thereon, and a plurality of corresponding traces are required to be disposed for connecting the pads of the single-chip device 10 (or 10A) to the control lines and related lines of the display pixels and the associated touch sensors and fingerprint sensing pixels. In some implementations, the plurality of corresponding traces are disposed for connecting the pads of the single-chip device 10 (or 10A) to first GOA circuit(s) for driving fingerprint sensing pixels and second GOA circuit(s) for driving the display pixels and the associated touch sensors. If the pads and the corresponding traces for connecting the single-chip device to the control lines and related lines are not implemented appropriately, signal interference on the traces will become inevitably serious and degrade the performance of the touch or fingerprint sensing.

Figure 3:
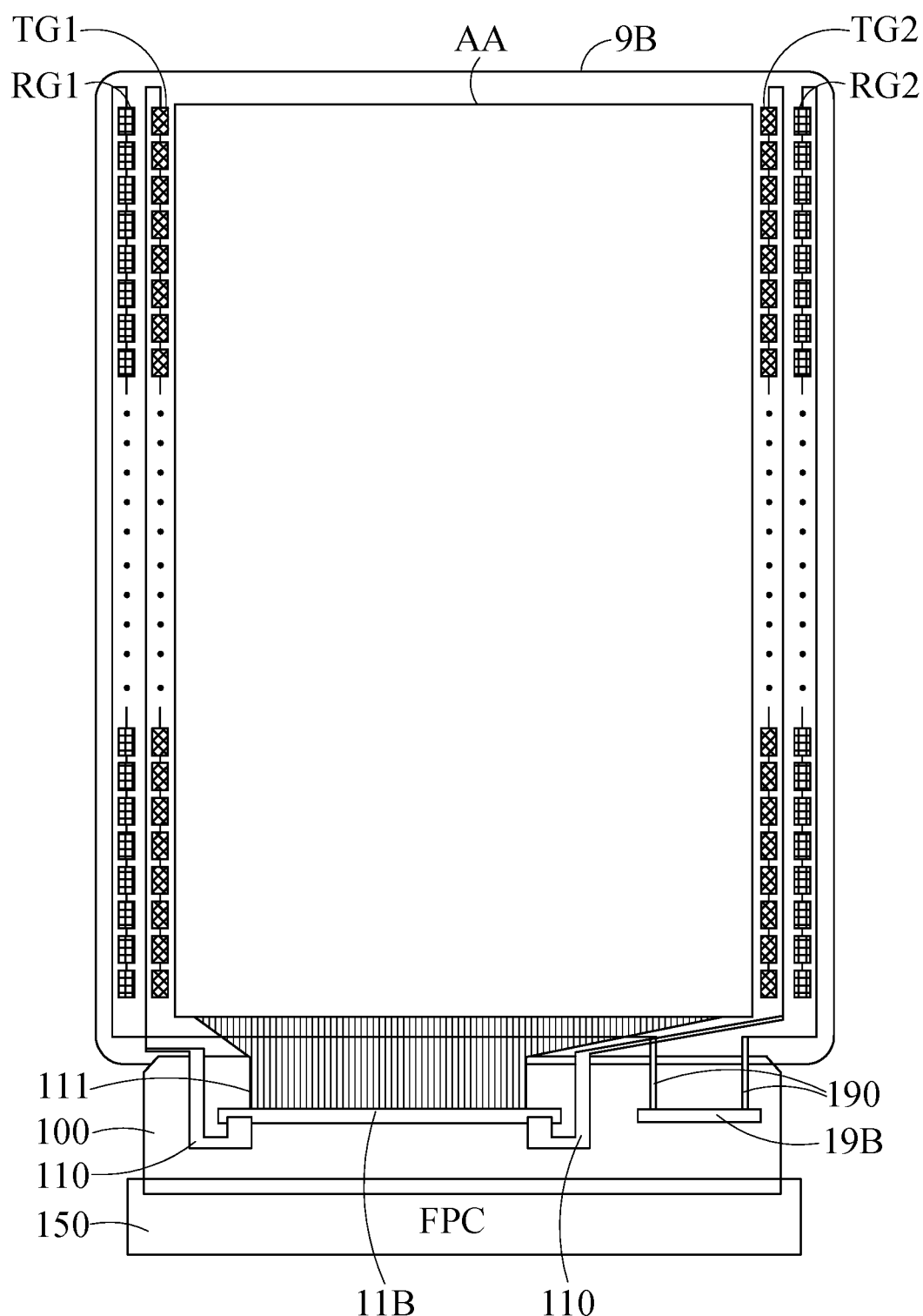
FIG. 3 is a schematic diagram illustrating a possible example of an electronic module that combines a TDDI and an ROIC.

In order to demonstrate how critical the pad arrangement for the single-chip device is, a possible implementation as shown in FIG. 3 is taken as an example. In this example, a display panel 9B associated with touch sensing elements (e.g., touch sensors) and fingerprint sensing elements (e.g., fingerprint sensing pixels) is configured to operate with a combination of a TDDI IC 11B and an ROIC 19B for fingerprint sensing, as mentioned above. The TDDI IC 11B and ROIC 19B are bonded in a chip-on-film (COF) manner on a film 100. The film 100 is connected to a flexible printed circuit 150, through which the integrated circuits (ICs) on the film 100 can be electrically connected to a processing unit (e.g., as shown in FIG. 1 or 2). The display panel 9B comprises gate-on-array (GOA) circuits TG1 and TG2 to be driven by the TDDI IC 11B and GOA circuits RG1 and RG2 to be driven by the ROIC 19B on the left and right borders of the display panel 9B, respectively. The TDDI IC 11B comprises some pads for outputting corresponding control signals to control the GOA circuits TG1 and TG2 while the ROIC 19B comprises some pads for outputting corresponding control signals to control the GOA circuits RG1 and RG2. The TDDI IC 11B and ROIC 19B are bonded on the film 100 as shown in FIG. 3 so that the traces 190 from the left side of the ROIC 19B are inevitably required to cross over the traces from the TDDI IC 11B on the display panel 9B, such as the traces 111 for controlling data lines (or display data lines or source lines) of the display panel 9B and the traces 110 for controlling the GOA circuits TG1 and TG2. In this way, disadvantages will arise as follows. The traces crossing over each other will lead to signal interference and readily degrade the performance of display, touch sensing, or fingerprint sensing, thereby affecting user experience. In order to reduce signal interference due to the traces crossing over each other, additional processes with specific materials are required to utilize in the layers corresponding to the region where the traces crossing over each other occurs, which will increase the total cost as well. In FIG. 3, the TDDI IC 11B is positioned on the left side and the ROIC 19B is positioned on the right side. Since the bonding positions of the TDDI IC 11B and ROIC 19B on the film 100 are not symmetrical to the middle line of the display panel 9B, the resistance-capacitance (RC) loads of the traces on the left and right sides of the display panel are uneven due to the traces having asymmetrical lengths. This not only affects the capability of the signals for driving the GOA circuits on the left and right sides of the display panel, but also affects the performance of display, touch sensing, or fingerprint recognition.

In order to reduce signal interference, referring to FIG. 4A, a single-chip device 20 for driving fingerprint sensing pixels, display pixels and touch sensors is illustrated schematically according to various embodiments, as will be exemplified below.

Figure 4A:
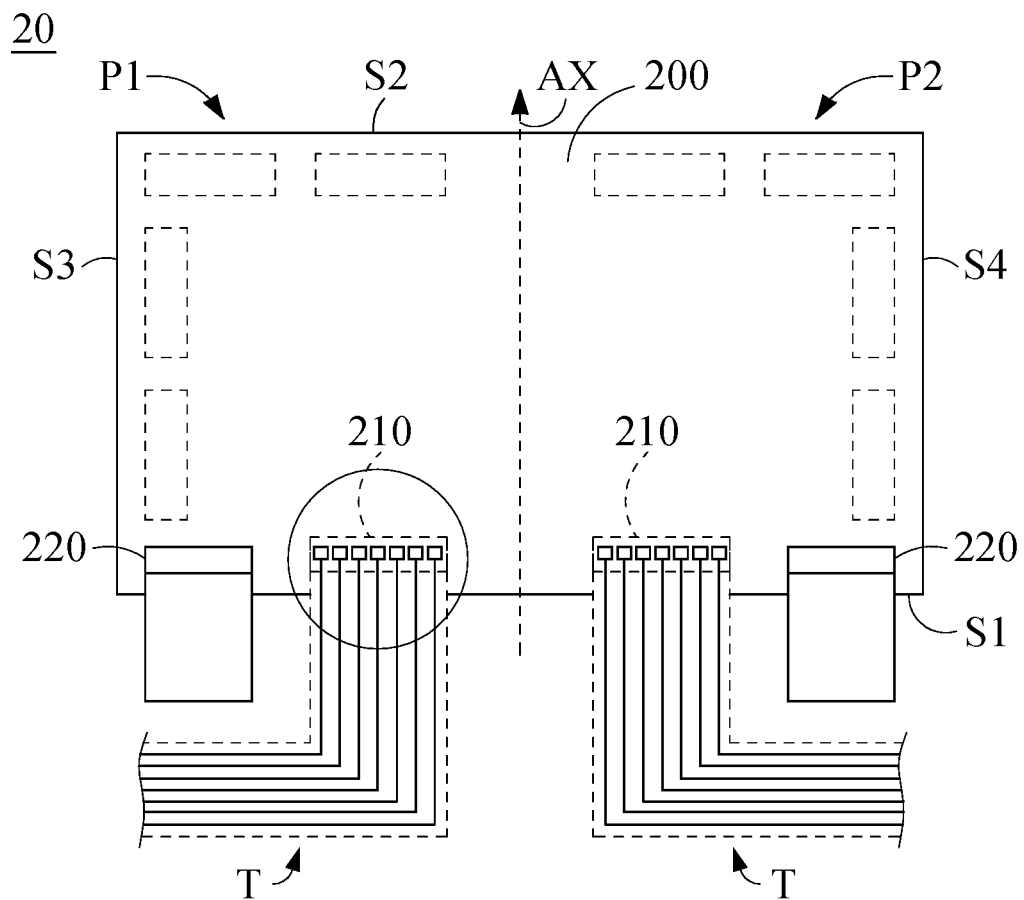
FIG. 4A is a schematic diagram illustrating various embodiments of a single-chip device, based on FIG. 1, for driving fingerprint sensing pixels, display pixels and touch sensors.

In FIG. 4A, the single-chip device 20 comprises a main body 200, a first group of pads 210, and a second group of pads 220, all of the pads disposed in the main body 200. The first group of pads 210 are configured to be coupled to the fingerprint sensing pixels (for example, via a first GOA circuit) and comprise a plurality of first pads for driving the fingerprint sensing pixels. The second group of pads 220 are configured to be coupled to the panel (e.g., 9, 9A, or 9B) (for example, via a second GOA circuit) and comprise a plurality of second pads for driving the display pixels and the touch sensors. An axis AX (e.g., a middle line across the main body 200) defines the main body 200 into a left portion P1 and a right portion P2. In other words, the main body 200 has the left portion P1 and the right portion P2 with respect to the axis AX. The first group of pads 210 are disposed on both the left portion P1 and the right portion P2, and the second group of pads 220 are disposed on both the left portion P1 and the right portion P2. As illustrated in FIG. 4A, for example, the first group of pads 210 (or the second group of pads 220) can be disposed on both the left portion P1 and the right portion P2 in a symmetrical manner or nearly equally distributed manner so that traces (e.g., represented by T) can be connected to the first group of pads 210 and extended in a similar manner. In addition, the first group of pads 210 in either one of the left portion P1 or the right portion P2 are separated from the second group of pads 220, and the second group of pads 220 in either one of the left portion P1 or the right portion P2 are separated from the first group of pads 210. Accordingly, the pad arrangement of the single-chip device 20 (e.g., as will be illustrated later such as in any one of FIGS. 5, 9A-14 or related embodiments) facilitates that corresponding first traces, through which the first group of pads 210 are capable of being coupled to the fingerprint sensing pixels, and corresponding second traces, through which the second group of pads 220 are capable of being coupled to the panel, do not cross over each other, and reduced signal interference can be achieved effectively.

Figure 4B:
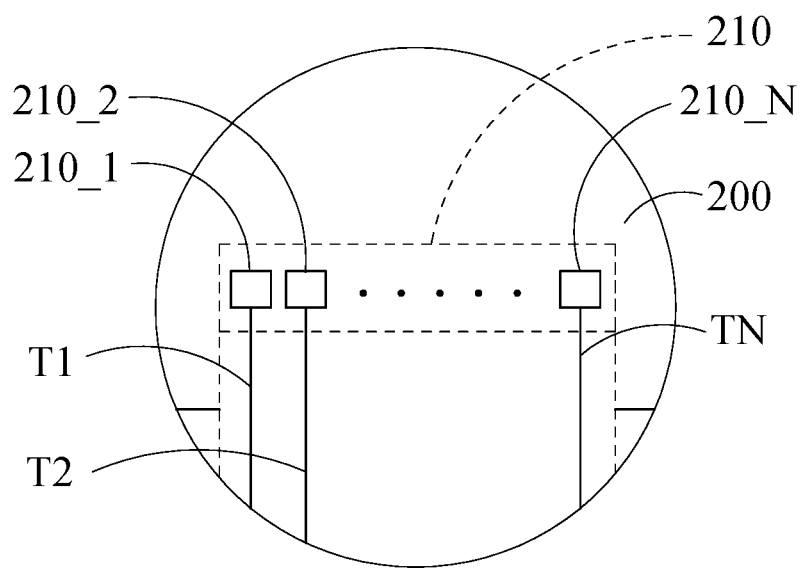
FIG. 4B is a schematic diagram illustrating an example of traces connected to pads of the single-chip device in FIG. 3A.

Specifically, in FIG. 4A, the main body 200 represents an integrated circuit of the single-chip device 20 that includes a display driver circuit 11, a touch driver circuit 12, and a fingerprint driver circuit 19 (or those shown in FIG. 2), wherein the main body may also be referred to a chip body. Referring to FIGS. 4A and 4B, the first group of pads 210 in FIG. 4A represents a plurality of conductive (e.g., metal) pads, for example, pads 210_1, 210_2 to 210_N (where N>1) illustrated in FIG. 4B, arranged on the main body 200 to which the traces T in FIG. 4A representing, for example, traces (or trace lines or wires) T1, T2 to TN illustrated in FIG. 4B can be bonded so that electrical connection can be made to components or circuits (e.g., represented by a fingerprint driver circuit 19) in the single-chip device 20 for driving the fingerprint sensing pixels. Likewise, the second group of pads 220 are conductive (e.g., metal) pads arranged on the main body 200 to which traces (or wires) can be bonded so that electrical connection can be made to components or circuits (e.g., represented by a display driver circuit 11 and a touch driver circuit 12) in the single-chip device 20 for driving the display pixels and the touch sensors. In the following Figures, the pads and traces will be represented as shown in FIG. 4A or 4B for the sake of readily illustration.

In some embodiments of the single-chip device 20, the main body 200 in FIG. 4A (e.g., being observed from a top view or bottom view perspective) has a rectangular shape having a first side S1, a second side S2, a left side S3, and a right side S4. As illustrated in FIG. 4A, the second side S2 is parallel to the first side S1 and closer to the display panel (e.g., as shown in FIG. 1, 2, or 3) than the first side S1. The left side S3 is on the left portion P1 and perpendicular to the first side S1 and the second side S2, and the right side S4 is on the right portion P2 and parallel to the left side S3. In addition, the axis AX intersects with the first side S1 and the second side S2. The single-chip device 20 can be implemented to include the first group of pads (or second group of pads) distributed on the left portion P1 and the right portion P2. In FIG. 4A, although the first group of pads and the second group of pads are illustrated nearly evenly on the first side S1 with respect to the axis AX, the first group of pads and the second group of pads can be also distributed, with respect to the axis AX, on any positions of the second side S2, or both the left and right sides, as schematically represented by dashed rectangles exemplified in FIG. 4A. Certainly, the implementation of the present disclosure is not limited to the examples.

Figure 5:
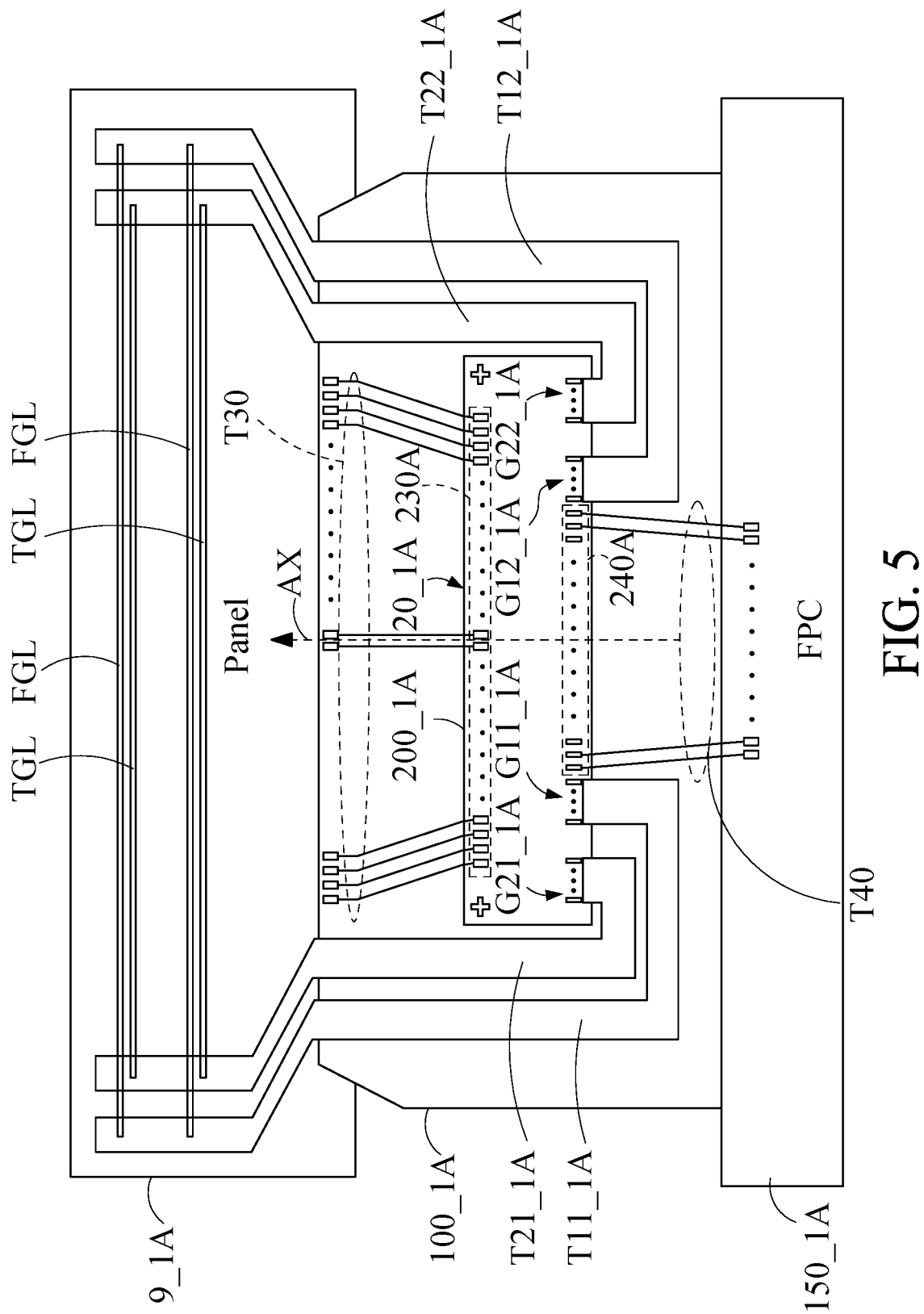
FIG. 5 is a schematic diagram illustrating an exemplary embodiment of pad arrangement of a single-chip device.

Referring to FIG. 5, an exemplary embodiment of pad arrangement of a single-chip device based on FIG. 4A is illustrated. As shown in FIG. 5, a single-chip device 20_1A includes a main body 200_1A and a plurality of pads. An electronic module including the film 100_1A and the single-chip device 20_1A disposed on the film 100_1A can be implemented based on FIG. 5. The plurality of pads include a first group of pads, represented by G11_1A and G12_1A, and a second group of pads, represented by G21_1A and G22_1A. The first group of pads G11_1A and G12_1A include a plurality of first pads for driving the fingerprint sensing pixels and the second group of pads G21_1A and G22_1A include a plurality of second pads for driving the display pixels and the touch sensors. In FIG. 5, the first group of pads G11_1A and G12_1A and the second group of pads G21_1A and G22_1A are all disposed along a first side of the main body 200_1A, and the first group of pads G11_1A and the second group of pads G21_1A are disposed on a left portion of the main body 200_1A with respect to the axis AX while the first group of pads G12_1A and the second group of pads G22_1A are disposed on a right portion of the main body 200_1A with respect to the axis AX. In an example, the single-chip device 20_1A is bonded on a film 100_1A in a COF manner. A plurality of first traces, represented by T11_1A and T12_1A, can be implemented to connect to the first group of pads G11_1A and G12_1A, respectively, and extended to the left and right borders of a display panel 9_1A to drive a plurality of fingerprint scan lines FGL (which are illustrated in part) connected to a fingerprint sensing array associated with the display panel 9_1A (as illustrated in part in FIG. 6B, 6C, or 6D). A plurality of second traces, represented by T21_1A and T22_1A, can be implemented to connect to the second group of pads G21_1A and G22_1A, respectively, and extended to the left and right borders of the display panel 9_1A to drive a plurality of TDDI scan lines TGL (which are illustrated in part) connected to a display pixel array and a touch sensing array associated with the display panel 9_1A (as illustrated in part in FIG. 6B, 6C, or 6D). In addition, an alignment mark (e.g., a cross sign) can be optionally made on the housing of the main body, as in FIG. 5.

As illustrated in FIG. 5, the pad arrangement of the single-chip device 20_1A based on FIG. 4A can facilitate the traces to be implemented without traces crossing over each other. In addition, the pad arrangement of the single-chip device 20_1A based on FIG. 4A can facilitate the traces to be implemented in a nearly symmetrical manner in trace length and trace pattern, thus reducing the influence of uneven RC loads of the traces. This not only can enhance the capability of the signals for driving the GOA circuits on the left and right sides of the panel, but also enhance the performance of display, touch sensing, or fingerprint recognition, as compared to the implementation as shown in FIG. 3 where traces are required to cross over each other. Further, the pad arrangement of the single-chip device 20_1A based on FIG. 4A can save the cost of manufacturing for additional processes with specific materials that are required to utilize in the layers corresponding to the region where the traces cross over each other, as compared to the implementation as shown in FIG. 3.

As shown in FIG. 5, in an example, the single-chip device 20_1A can further include a third group of pads 230A, for example, disposed along a second side of the main body 200_1A, for connecting to the display panel 9_1A. For example, the third group of pads 230A are for driving data lines of the display panel 9_1A or receiving fingerprint sensing signals from fingerprint sensing lines of the display panel 9_1A or being coupled to touch sensing lines of the display panel 9_1A for receiving touch signals from the touch sensing lines. In FIG. 5, a plurality of traces T30 can be implemented to connect the third group of pads 230A to the display panel 9_1A by a film-on-glass (FOG) connection.

As shown in FIG. 5, in an example, the single-chip device 20_1A can further include a plurality of pads 240A disposed along the first side of the main body 200_1A for connecting to a flexible printed circuit 150_1A. In FIG. 5, a plurality of traces T40 can be implemented to connect the pads 240A to the flexible printed circuit 150_1A by film-on-film (FOF) connection.

For demonstrating how the pad arrangement of the single-chip device affects the implementation based on the architecture of FIG. 1, the following embodiments are related to an electronic apparatus for display, touch sensing and fingerprint sensing based on the architecture using an FTDI IC (e.g., as illustrated in FIGS. 4A, 5 or so on).

In these embodiments related to the electronic apparatus, some embodiments illustrate the grouping and arrangement of TDDI and fingerprint (FPR) gate output (CGOUT) signals outputted by an FTDI IC for a display panel through inner leads, outer leads, and side leads on the FTDI IC. Both pads for TDDI and fingerprint CGOUT signals can be coupled to TDDI GOA (Gate Driver on Array) and FPR GOA on the display panel, and then the scan lines of the display pixel array are driven by using the TDDI GOA, and the scan lines of the FPR sensing pixels are driven by using FPR GOA. In addition, some embodiments based on the pad arrangement of the single-chip device show trace arrangement for pads for TDDI and fingerprint CGOUT signals on the display panel. Embodiments of the grouping of the TDDI and FPR CGOUT signals are also provided.

Figure 6A:
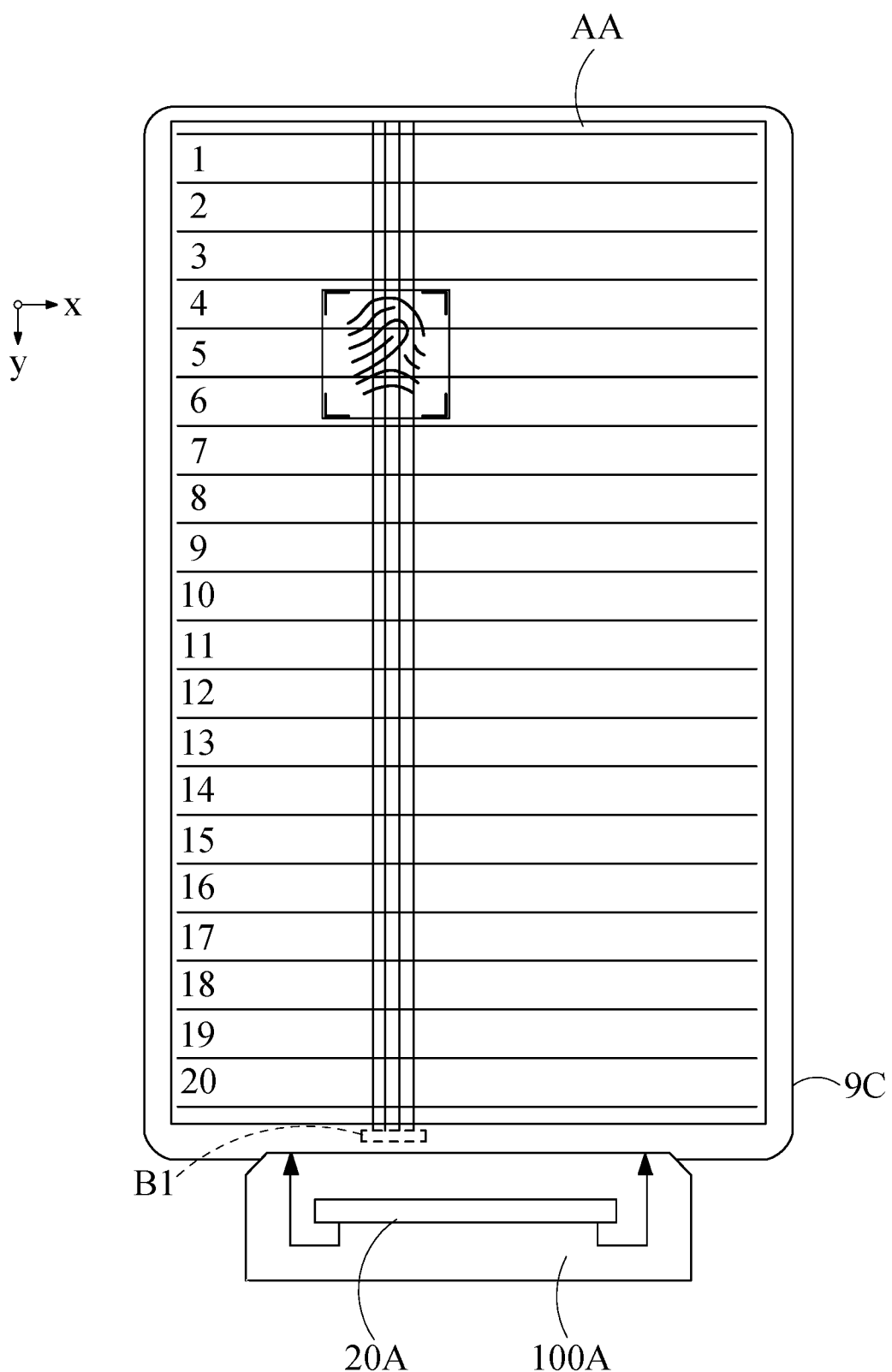
FIG. 6A is a schematic diagram illustrating a panel being coupled to a single-chip device according to an embodiment of the present disclosure.
Figure 6B:
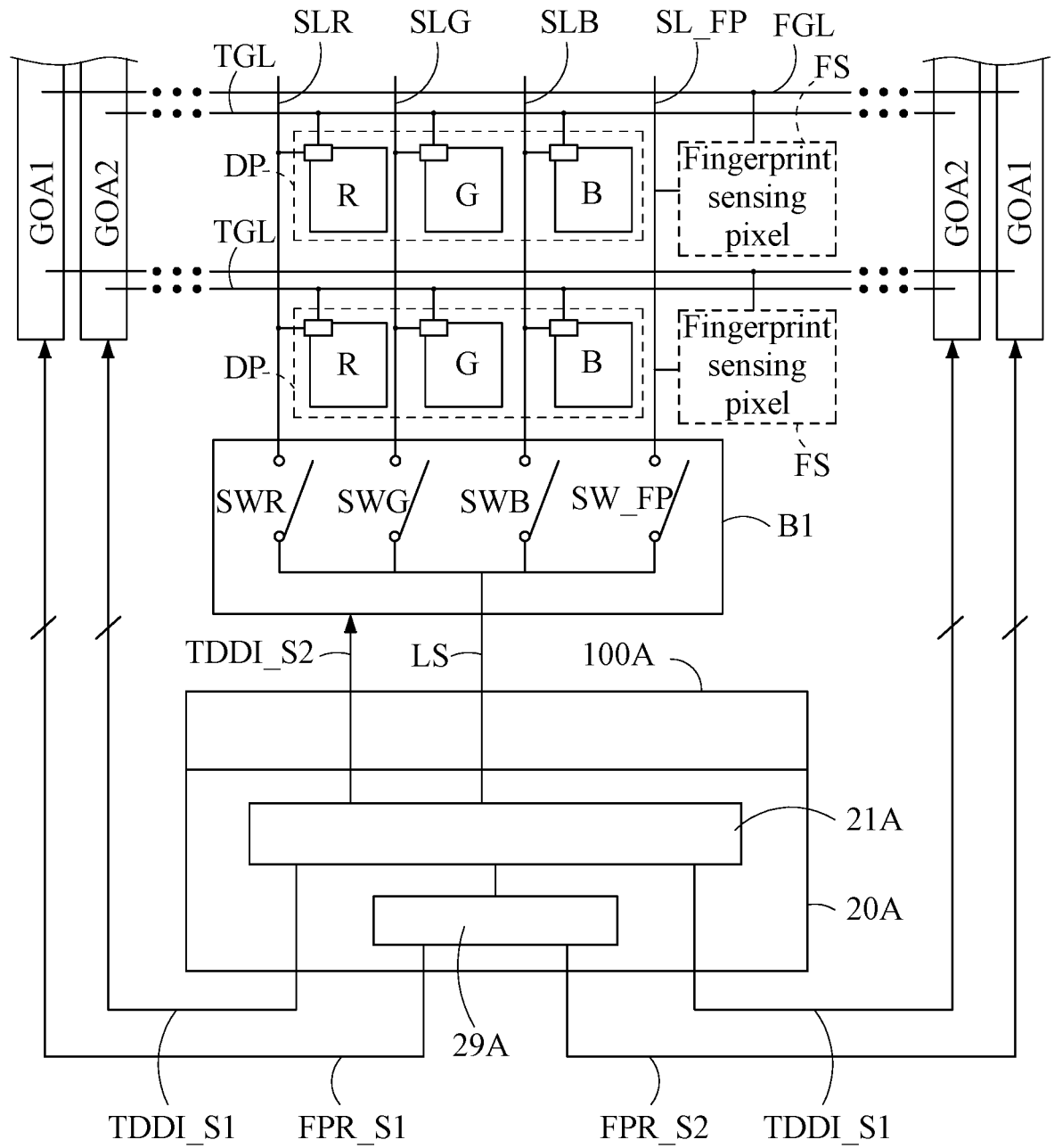
FIG. 6B is a schematic diagram illustrating a panel including display pixels and fingerprint sensing pixels being coupled to a single-chip device according to an embodiment of the present disclosure.

Referring to FIG. 6A, a display panel including display pixels and fingerprint sensing pixels being coupled to a single-chip device is illustrated according to an embodiment. Taking the panel architecture illustrated in FIG. 6A as an example, an active area (AA) of the display panel 9C can be divided into a plurality of zones for a fingerprint sensing array including a plurality of fingerprint sensing pixels, such as 20 zones in the Y direction while the number of the fingerprint sensing pixels in the X direction can be the same as that of the display pixels for each display row, wherein each or more display pixels can be equipped with a fingerprint sensing pixel. FIG. 6B is an enlarged schematic diagram of some components (e.g., indicated by a block B1 in FIG. 6A or 6B). As shown in FIGS. 6A and 6B, a single-chip device 20A, disposed on a film 100A, is used for outputting a plurality of fingerprint driving signals (e.g., represented by FPR_S1, FPR_S2) from a fingerprint driver circuit 29A of the single-chip device 20A to gate-on-array (GOA) circuits GOA1 for the fingerprint sensing pixels FS. The single-chip device 20A is also used for outputting a plurality of display driving signals (or touch related signals) (e.g., represented by TDDI_S1) from a TDDI circuit 21A of the single-chip device 20A to GOA circuits GOA2 for the display pixels DP. Accordingly, the single-chip device 20A comprises a first group of pads including a plurality of first pads for driving the fingerprint sensing pixels, and a second group of pads including a plurality of second pads for driving the display pixels and the touch sensors (e.g., as illustrated in any of FIG. 5, 9A-14).

In FIGS. 6A and 6B, for example, the block B1, disposed on the panel 9C, includes a selection circuit (e.g., which may include a signal selector, switches, a multiplexer, demultiplexer, or any combination thereof), schematically illustrated by switches SWR, SWG, SWB, and SW_FP. The selection circuit of the block B1 in FIG. 6B can be implemented to serve as a combination of a data line selection circuit for selecting one data line from a set of data lines (e.g., display data lines or source lines for sub-pixels of a display pixel or more display pixels) and a fingerprint sensing line selection circuit for selecting at least one fingerprint sensing line. For example, a selection circuit including the switches SWR, SWG, SWB is disposed in the panel 9C for selecting data lines (e.g., indicated by SLR, SLG, and SLB) for a set of red subpixel (R), green subpixel (G), and blue subpixel for a display pixel DP. The single-chip device 20A, for example, generates driving signals for driving the selected data lines and generates selection signals TDDI_S2 (e.g., signals indicated by TDDI_SWR, TDDI_SWG, TDDI_SWB, as will be exemplified later in TABLES 1 and 2) for controlling the switches SWR, SWG, SWB so as to drive the data lines SLR, SLG, and SLB selectively. Accordingly, for example, the second group of pads of the single-chip device 20A further include a plurality of third pads for controlling the selection circuit. In this manner, the number of traces, as well as corresponding pads, for electrical coupling or connection between the single-chip device 20A and the data lines of the panel 9C can be reduced.

In addition, in the block B1, the switch SW_FP is for selecting a corresponding one of the fingerprint sensing lines so as to receive a fingerprint sensing signal from a fingerprint sensing pixel (e.g., indicated by FS). In an example, the third pads further include a pad for outputting a selecting signal (e.g., a signal indicated by TDDI_SW_FP as will be exemplified later in TABLE 1 or 2) to control the block B1 so as to use a trace LS for receiving the fingerprint sensing signal, wherein the trace LS is connected to a pad of the third group of pads of the single-chip device 20A. In this example, the pad connected to the trace LS can be employed to drive the data lines (e.g., SLR, SLG, SLB as illustrated in FIG. 6B) of the panel 9C or receiving a fingerprint sensing signal from the fingerprint sensing line SL_FP of the panel 9C, selectively, in different time instants. In this manner, if the embodiment as shown in FIG. 6B is applied to the scenario of FIG. 5, the single-chip device 20_1A of FIG. 5 can be implemented to include a reduced number of the third group of pads 230A.

In this above embodiment, the configuration of the selection circuit (e.g., the block B1) in the panel as shown in FIG. 6B, the need for the single-chip device 20A to include the third pads (e.g., for outputting the selection signals TDDI_S2) for controlling the selection circuit, and the need for disposing corresponding traces are optional.

Figure 6C:
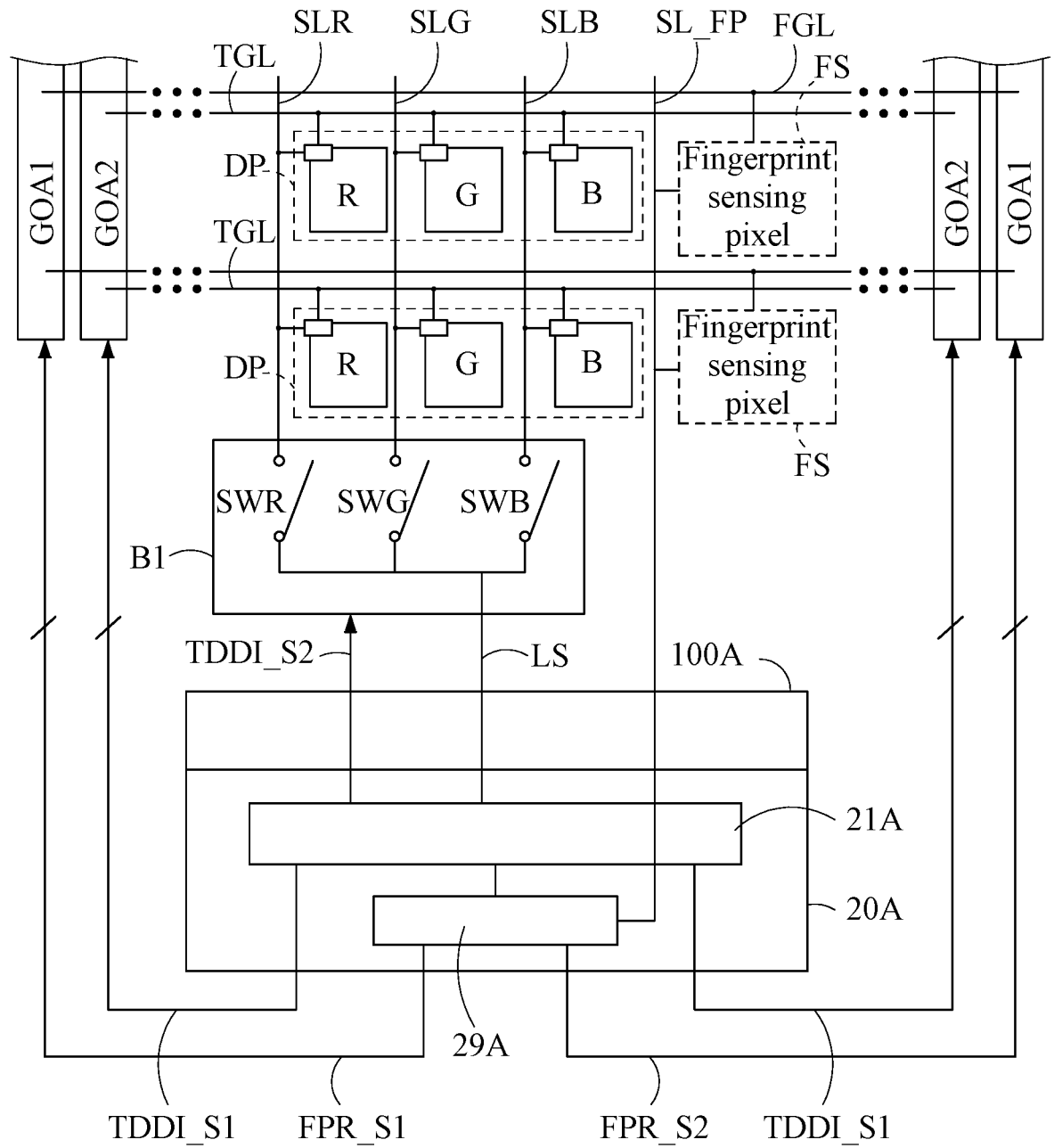
FIG. 6C is a schematic diagram illustrating a panel including display pixels and fingerprint sensing pixels being coupled to a single-chip device according to another embodiment of the present disclosure.

For example, the single-chip device can be implemented to drive the display pixels with the use of selection circuits but receive fingerprint sensing signals directly, as shown in FIG. 6C, wherein the single-chip device 20A in FIG. 6C is required to include the third pads (as well as corresponding traces) for controlling the selection circuit including the switches SWR, SWG, SWB. In this example, the selection circuit of the block B1 in FIG. 6C is a data line selection circuit.

Figure 6D:
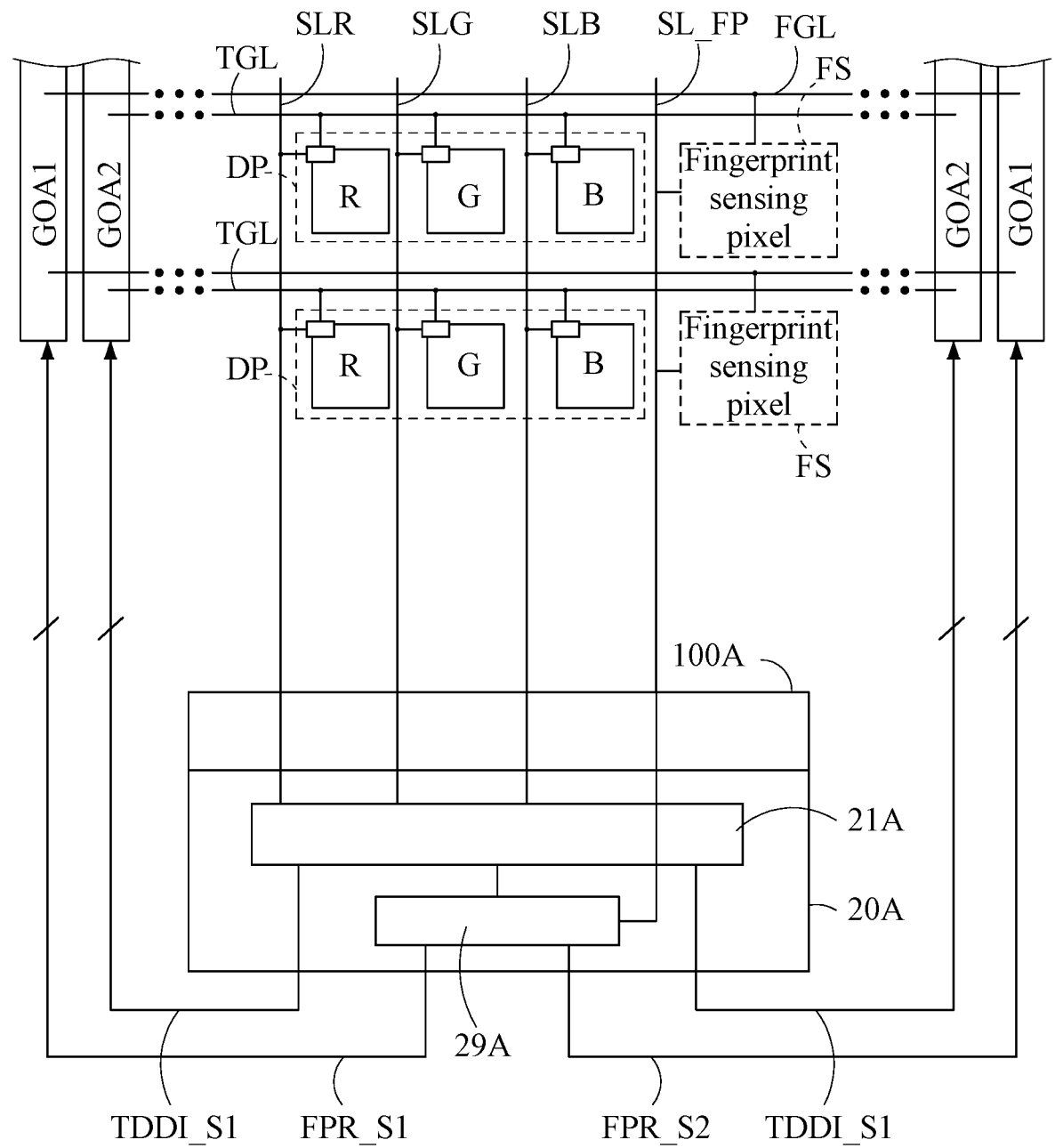
FIG. 6D is a schematic diagram illustrating a panel including display pixels and fingerprint sensing pixels being coupled to a single-chip device according to yet another embodiment of the present disclosure.

In another example, the single-chip device can even be implemented to drive the display pixels and receive fingerprint sensing signals directly without the use of selection circuit (e.g., block B1), as shown in FIG. 6D, wherein there is no need for the single-chip device 20A in FIG. 6D to include the third pads (as well as corresponding traces).

The above examples (e.g., as shown in any of FIG. 6B-6D) can be employed to any embodiment of the single-chip device, such as that illustrated in any one of FIGS. 5, 9A-15, whenever appropriate.

For more information about the structure and operation of the display panel and FTDI IC, Annex I and Annex II of U.S. provisional Patent Application No. 62/912,666 filed on Oct. 9, 2019, as part of this application, can be referred to. However, the implementation of the invention is not limited thereto.

Figure 7:
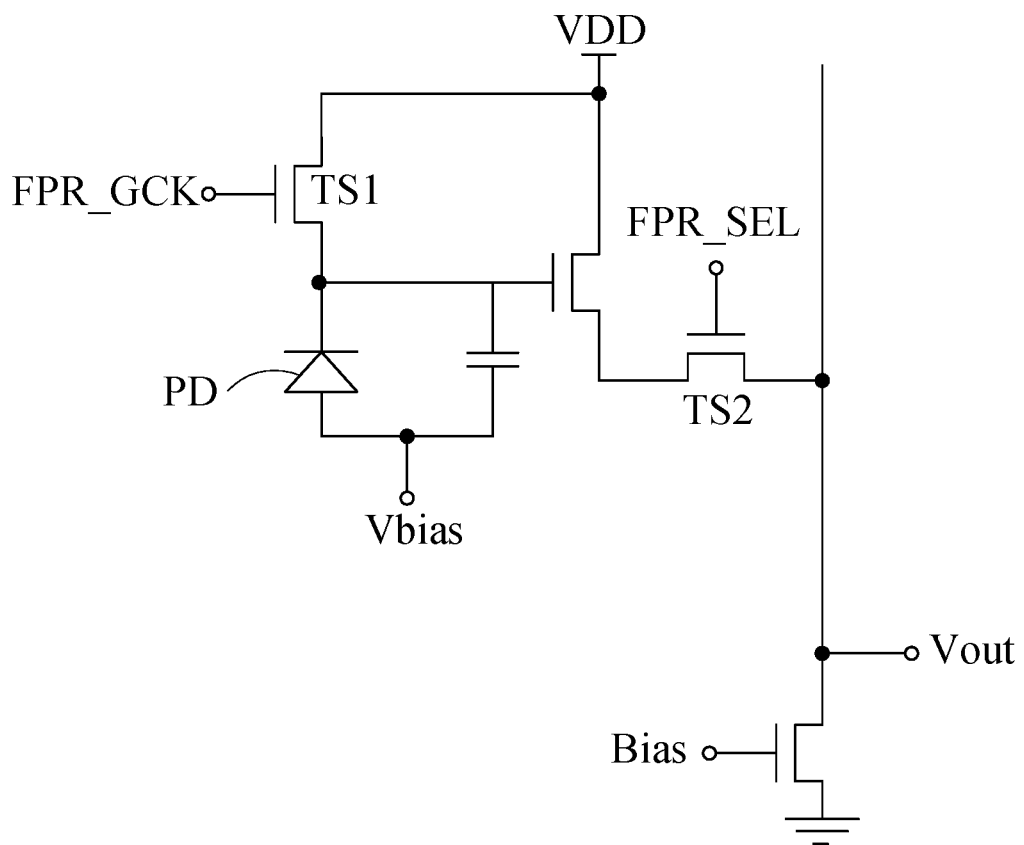
FIG. 7 is a schematic diagram illustrating a fingerprint sensing pixel according to an embodiment of the present disclosure.
Figure 8:
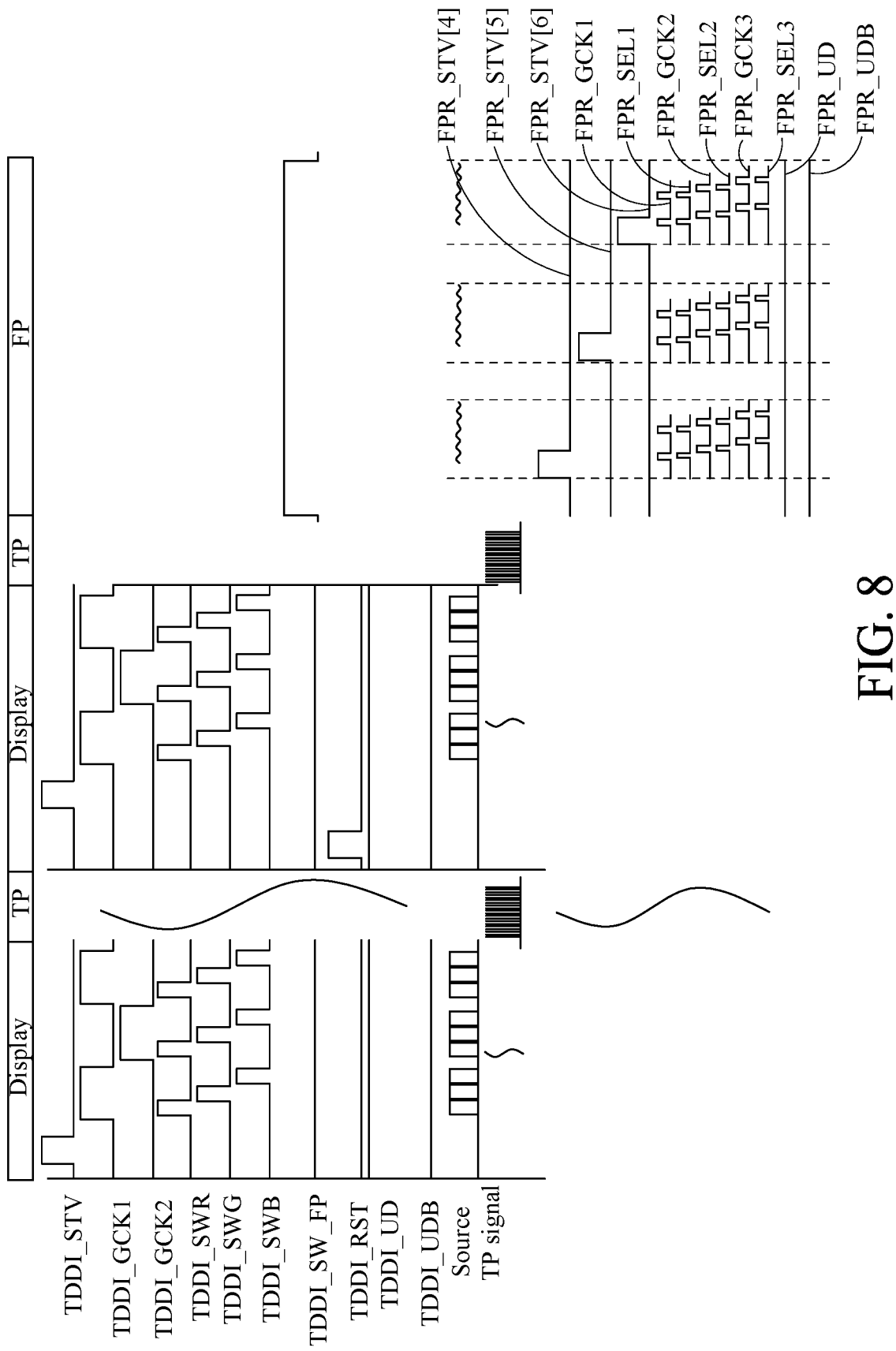
FIG. 8 is a timing diagram illustrating an embodiment of driving fingerprint sensing pixels, display pixels and touch sensors.

Referring to FIGS. 7 and 8, an embodiment of the circuit architecture and working principle of the fingerprint sensing pixel is demonstrated as follows.

In FIG. 7, a fingerprint sensing pixel includes a photodiode PD, switches, and a capacitor. In FIG. 8, a plurality of operation cycles in an FTDI IC are illustrated and represented by blocks indicated by Display, TP, and FP, for display pixel driving, touch sensors, fingerprint sensing pixel driving, respectively. In addition, during each operation cycle for Display, TP, and FP, exemplary waveforms of the corresponding control signals are illustrated under the blocks representing the operation cycles in FIG. 8, wherein the control signals illustrated will be described below by way of examples and in TABLES 1 and 2.

The following is an example of the operation of fingerprint sensing using the fingerprint sensing pixel.

In a first step, a fingerprint driver circuit (or fingerprint recognition circuit) for fingerprint (FPR) zones sequentially outputs start pulse signals (e.g., STV[4:6], corresponding to an example shown in FIG. 6A) to the panel for a region (e.g., zones 4-6 in FIG. 6A) where pressing of a finger occurs, and a reset signal FPR_GCK sequentially turns on reset switches (e.g., switches TS1) for each related zone, so that the cathode of a corresponding photodiode PD is reset to VDD (e.g., 5 V) and the anode is at a voltage Vbias (e.g., 0 V).

In a second step, the reset signal FPR_GCK turns off the switch TS1, and the voltage across the photodiode is 5V. When the light illuminates the fingerprint, it will generate reflected light. The reflected light illuminates the photodiode PD, making the discharge rate of the photodiode faster. The reflected light of the fingerprint ridge is brighter, which makes the resistance of the photodiode PD smaller, while the discharge rate at the cathode of the photodiode PD is fast and the voltage of the cathode is small (for example, about 2 V). The reflected light of the fingerprint valley is darker than that of the fingerprint ridge, which makes the resistance of the photodiode PD larger, while the discharge rate at the cathode of the photodiode PD is slow and the voltage of the cathode is larger (for example, about 3V).

In a third step, a selection signal (or called acquiring signal) FPR_SEL sequentially turns on a switch TS2 of each zone and the cathode voltage of the photodiode PD is transmitted to a fingerprint sensing line connected to a node Vout. In the FPR zone, a TDDI_SW_FP signal of the TDDI CGOUT signals will output a signal at a high level (or asserted) to select the FTDI data line or fingerprint sensing line function for fingerprint voltage sensing, and the remaining TDDI_SWR/TDDI_SWG/TDDI_SWB signal of the TDDI CGOUT signals will be at a low level. Meanwhile, an analog front-end (AFE) circuit of the FTDI IC can read a corresponding sensing result Vout1.

In a fourth step, the reset signal FPR_GCK turns on the switch TS1, the cathode of the photodiode is reset to VDD (e.g., 5 V) again, and the 5 V voltage is transmitted to the node Vout, so the AFE circuit can read a corresponding reset result Vout2.

In a fifth step, fingerprint information is obtained by subtracting the voltage of the reset result Vout2 by the sensing result Vout1.

The following provides embodiments of CGOUT signals of an FTDI IC (e.g., single-chip device 20 or 20_1A).

TABLES 1 and 2 list FPR CGOUT signals and TDDI CGOUT signals, respectively, with their description in brief, according to an embodiment, wherein the symbol "_L" or "_R" in the TABLE 1 or 2 represents a signal, its pad or trace of which can be implemented on the left or right portion of the single-chip device. Certainly, the invention is not limited thereto. In any panel design, the signals provided by the FTDI chip to the FPR GOA can be changed according to the design requirements, and the signals listed in TABLE 1 can be categorized as the FPR CGOUT signals. Similarly, the signals provided by the FTDI chip to the TDDI GOA can be changed according to the design requirements, and the signals listed in TABLE 2 can be categorized as the TDDI CGOUT signals.

TABLE 1

| Signal names for fingerprint detection | | Description |
| --- | --- | --- |
| FPR_STV[1:10]_L | FPR_STV[1:10]_R | Selection zone signal in Y direction of a fingerprint detector (e.g., associated with finger sensing pixels), the zone in Y direction is detected when the voltage of the signal at a high level |

TABLE 1-continued

| Signal names for fingerprint detection | | Description |
|---|---|---|
| FPR_GCK1_L | FPR_GCK1_R | Reset signal; when it is at the high level, the switch TS1 is turned on and the cathodes of the photodiodes of the column are reset to a VDD voltage. |
| FPR_GCK2_L | FPR_GCK2_R | Same as above field. |
| FPR_GCK3_L | FPR_GCK3_R | Same as above field. |
| FPR_SEL1_L | FPR_SEL1_R | Acquiring signal; when it is at the high level, the switch TS2 is turned on and the fingerprint voltages of the photodiodes of the column are sent to sensing lines connected to Vout nodes. |
| FPR_SEL2_L | FPR_SEL2_R | Same as above field. |
| FPR_SEL3_L | FPR_SEL3_R | Same as above field. |
| FPR_UD_L | FPR_UD_R | Scanning voltage signals for fingerprint detection from the top to the bottom. |
| FPR_UDB_L | FPR_UDB_R | Scanning voltage signals for fingerprint detection from the bottom to the top. |

TABLE 2

| Signal names for TDDI | | Description |
|---|---|---|
| TDDI_STV_L | TDDI_STV_R | Starting pulse signals for each display frame |
| TDDI_UD_L | TDDI_UD_R | Scanning voltage signals for display from the top to the bottom. |
| TDDI_UDB_L | TDDI_UDB_R | Scanning voltage signals for display from the bottom to the top. |
| TDDI_GCK1_L | TDDI_GCK1_R | Signals indicating turning on TFT switch elements for the column such that data line is charged to the liquid crystal voltage |
| TDDI_GCK2_L | TDDI_GCK2_R | Same as above field. |
| TDDI_RST_L | TDDI_RST_R | Ending pulse signal for each display frame |
| TDDI_SWR_L | TDDI_SWR_R | Selection signal for selecting a data line of a driver chip to output data to R data line of the panel; suitable for one-to-multiple design for data from the chip to the panel |
| TDDI_SWG_L | TDDI_SWG_R | Selection signal for selecting a data line of a driver chip to output data to G data line of the panel; suitable for one-to-multiple design for data from the chip to the panel |
| TDDI_SWB_L | TDDI_SWB_R | Selection signal for selecting a data line of a driver chip to output data to B data line of the panel; suitable for one-to-multiple design for data from the chip to the panel |
| TDDI_SW_FP_L | TDDI_SW_FP_R | Selection signal for selecting a data line of a driver chip to receive fingerprint sensing voltage data from the panel |

As illustrated in TABLES 1 and 2, the TDDI CGOUT signals and FPR CGOUT signals are grouped because the fact that the operating voltages of circuit components for the display, touch sensing, and fingerprint recognition on the panel are in different categories is taken into consideration. Categorizing the CGOUT signals into different groups can facilitate the circuit design simplification and clean panel wiring. In other words, it is preferable that the traces of TDDI CGOUT and the FPR CGOUT signals are not interleaved or do not cross over each other. In some implementations, the fingerprint sensing line selection circuit for FTDI can be integrated with the data line selection circuit for display data signals and this integration (e.g., the selection circuit of the block B1 in FIG. 6B) will bring benefit of reduced number of pinout or pad requirements for electrical connection in the panel design, in the circuit manufacturing and design as well as the FTDI. In this way, TDDI_SW_FP signal can be classified as the TDDI CGOUT voltage signal category and placed in the TDDI CGOUT signal group for the sake of the selection circuit integration.

In addition, any group of the TDDI CGOUT and FPR CGOUT signal groups can be further categorized into subgroups according to design requirements. The traces (and so on) of the signals within the subgroup are adjacent to each other and do not intersect with the traces (and so on) of the signals of other subgroups, but the invention is not limited thereto. In some embodiments, each group of the TDDI CGOUT and FPR CGOUT signal groups can be divided into at least two subgroups (e.g., left and right subgroups), which are provided to the GOA on the left and right sides of the panel, respectively (e.g., as illustrated in FIG. 6B). Preferably, the corresponding pads for the left and right subgroups can be disposed along the left and right sides of the FTDI IC, respectively.

In some embodiments, signals outputted to the panel and signals outputted to the FTDI IC can be further divided into other signal group (hereinafter shown or categorized as other inner-lead-bonding (ILB) pads (or other ILB signal group) in FIGS. 9A to 12D) in addition to the TDDI CGOUT and FPR CGOUT. In a similar manner for the signal group mentioned above, the traces (and pads) for the other signal group can be arranged adjacent to each other, and do not cross over the traces of the pads of the two groups of TDDI CGOUT and FPR CGOUT. For example, some or all of the pads for TDDI power and/or FPR power can be classified as other ILB pads. That is, signals for power can be treated as belonging to the group of other ILB pads shown in FIGS. 9A to 12D. In addition, a separate signal group for power facilitates making electrical connection to a capacitor on a flexible printed circuit (FPC).

The above TABLES 1 and 2 are only an example. In another example, the FPR CGOUT signals may further include one or more signals for power (such as high and low voltage signals provided to the FPR GOA, and the bias signal or the voltage source signal provided to the FPR sensor), wherein the pads and traces of the signals for power can be arranged adjacent to each other, and these traces do not cross over the traces of the left and right subgroups of the FPR CGOUT signals. Similarly, the TDDI CGOUT signals may include one or more signals for power (such as the high and low voltage signals provided to the TDDI GOA, and the bias signal or the voltage source signal provided to the FPR sensor), wherein the pads and traces of the signals for power can be arranged adjacent to each other, and these traces do not cross over the traces of the left and right subgroups of the TDDI CGOUT signals.

In some embodiments, some or all of the pads of signals for TDDI power and/or for FPR power can be classified as other ILB pads. In other embodiments, the pads of signals for power can be classified as a subgroup of the TDDI CGOUT group or a subgroup of the FPR CGOUT group.

In some embodiments, the left and right subgroups of the FPR CGOUT signals can be further subdivided into at least one of the following subgroups, such as GOA SEL (such as the acquiring signal included in TABLE 1), GOA Reset (such as the reset signal in TABLE 1). In an embodiment, since a gate clock shift register circuit on the panel to which any GCK (e.g., FPR_GCK1, FPR_GCK2, FPR_GCK3) of the FPR CGOUT signals is transmitted can be made in a same zone on the panel, the GCK CGOUT signals can also be categorized as a same reset signal subgroup, wherein the pads and traces of the GCK CGOUT signals can be arranged adjacent to each other, and these traces do not cross over the traces of other signal subgroups (e.g., acquiring signal). Similarly, the left and right subgroups of the TDDI CGOUT signal can be subdivided into at least one of the following subgroups, a sub-group of the selection signals (such as those depicted in TABLE 2), or a sub-group of other control signals (such as other signals depicted in TABLE 2), wherein the pads and traces for these subgroups can be configured to be adjacent to each other and without crossing over the pads and traces for other subgroups (such as the signals of the control signal subgroup).

In other words, according to design requirements, the signals of the FTDI chips can be divided into at least two groups, for example, FPR CGOUT signals and TDDI CGOUT signals, or more groups, and the signals in each group can be adjacent to each other and not interleaved with the signals of another group with respect to pads and traces. The signals in each group can be further subdivided into at least one subgroup according to design requirements (such as the voltage ranges of the signals, functional properties, and the positions of the corresponding GOA circuit on the panel), and the pads (e.g., the first group of pads) and signal traces of the subgroup can be configured adjacent to each other and not interleaved with (or crossing over) the pads and traces of signals of other subgroups.

By way of the discussion and embodiments for signal grouping mentioned above, it is understood that under the architecture shown in FIG. 1, the pad assignment for the first group of pads and the second group of pads based on the embodiment as illustrated in FIG. 4A technically contributes to the effectiveness of trace planning and manufacturing, signal interference reduction, and trace RC loading balance. In overall, such a pad assignment can facilitate the performance of display, touch sensing, and fingerprint sensing. Moreover, industry can be benefited from the pad assignment provided by the single-chip device, and electronic products such as a single-chip device, an electronic module based on the single-chip device, and a computing device based on the electronic module can be readily and efficiently made and developed accordingly.

The following provides embodiments with respect to various pad assignments of the first group of pads and the second group of pads and manufacturing technology (e.g., COF or COG) for a single-chip device based on the architecture of FIG. 1. In FIGS. 5, 9A-17 and so on, a single-chip device (e.g., 20_1A~20_1D, 20_2A~20_2D, 20_3A~20_3D, 20_4A~20_4D, 30A~30C, 40) including a main body (e.g., 200_1A~200_1D, 200_2A~200_2D, 200_3A~200_3D, 20_4A~20_4D, 300A~300C) is disposed on a panel or film and coupled between the panel and a flexible printed circuit; the panel (e.g., a portion of the panel for illustration) is represented by a block each indicated by one of symbols 9_1A~9_1D, 9_2A~9_2D to 9_4A~9_4D, for example, and the flexible printed circuit (FPC) (e.g., in part) is represented by another block each indicated by symbols 150_1A~150_1D to 150_2A~150_2D, for example. In addition, the third group of pads may also be assigned in any embodiment of a single-chip device shown in FIG. 9A~17, in any manner, for example, in a manner similar to the third group of pads of the single-chip device 20_1A shown in FIG. 5. In the following embodiments as illustrated in FIGS. 5, 9A-12D, the specific pad assignments in terms of TDDI GOA and FPR GOA are not shown for the sake of brevity.

In some embodiments based on FIGS. 1 and 4A, as illustrated in FIGS. 5, 9A-9C, all the first group of pads and all the second group of pads are disposed along a lower side of the single-chip device (or the first side S1 as in FIG. 4A).

As an example using COF packaging, referring to FIG. 5 again, the single-chip device 20_1A bonded on the film 100_1A has all of the first group of pads G11_1A-G12_1A for fingerprint sensing and the second group of pads G21_1A-G22_1A for display and touch sensing (e.g., TDDI) disposed along the first side (or a lower transversal side).

Figure 9A:
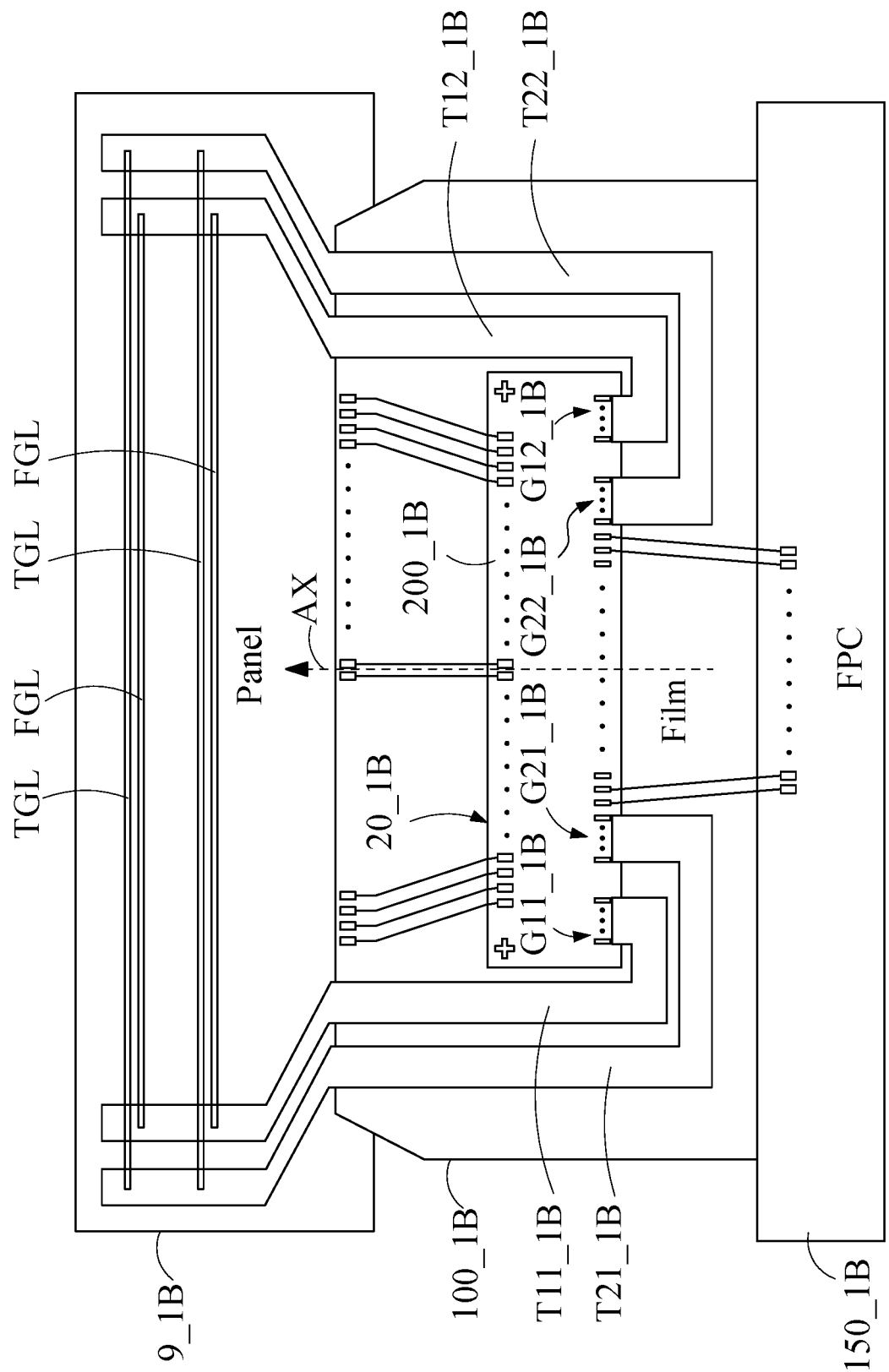
FIG. 9A is a schematic diagram illustrating an embodiment of pad arrangement of a single-chip device along a first side thereof.

In another example using COF packaging, referring to FIG. 9A, a single-chip device 20_1B bonded on a film 100_1B comprises all first group of pads G11_1B-G12_1B for fingerprint sensing and the second group of pads G21_1B-G22_1B for display and touch sensing (e.g., TDDI) disposed along the first side (or a lower transversal side). A plurality of first traces, represented by T11_1B and T12_1B, can be implemented to connect to the first group of pads G11_1B and G12_1B, respectively, and extended to the left and right borders of a display panel 9_1B to drive a plurality of fingerprint scan lines FGL connected to a fingerprint sensing array associated with the display panel 9_1B. A plurality of second traces, represented by T21_1B and T22_1B, can be implemented to connect to the second group of pads G21_1B and G22_1B, respectively, and extended to the left and right borders of the display panel 9_1B to drive a plurality of TDDI scan lines TGL connected to a display pixel array and a touch sensing array associated with the display panel 9_1B.

Figure 9B:
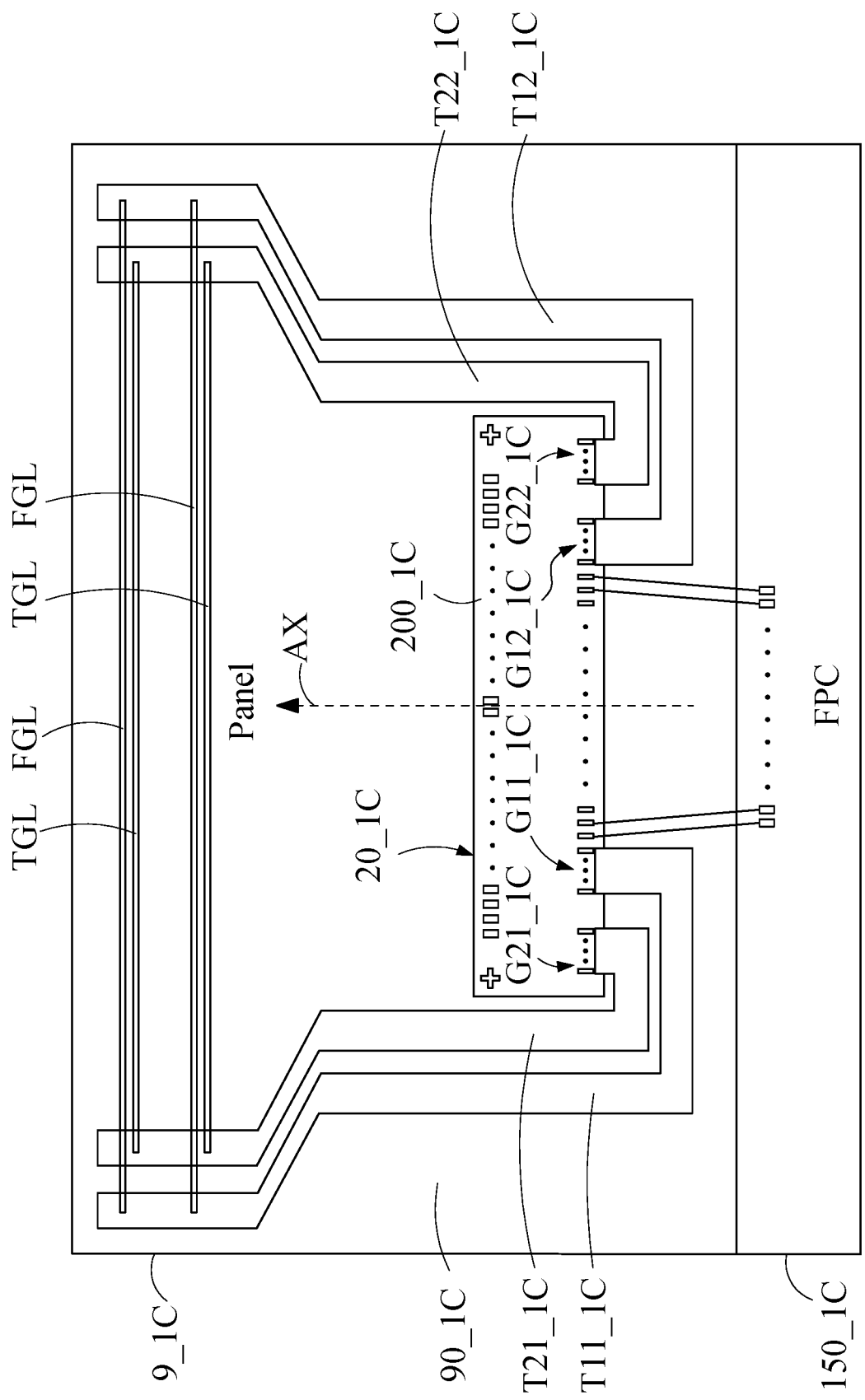
FIG. 9B is a schematic diagram illustrating an embodiment of pad arrangement of a single-chip device along a first side thereof.

In an example using COG packaging, referring to FIG. 9B, a single-chip device 20_1C bonded on a glass portion 90_1C of a display panel 9_1C comprises all first group of pads G11_1C-G12_1C for fingerprint sensing and the second group of pads G21_1C-G22_1C for display and touch sensing (e.g., TDDI) disposed along the first side (or a lower transversal side). On the glass portion 90_1C, a plurality of first traces T11_1C and T12_1C can be implemented to connect to the first group of pads G11_1C and G12_1C, respectively, and extended to the left and right borders of a display panel 9_1C to drive a plurality of fingerprint scan lines FGL connected to a fingerprint sensing array associated with the display panel 9_1C. A plurality of second traces T21_1C and T22_1C can be implemented to connect to the second group of pads G21_1C and G22_1C, respectively, and extended to the left and right borders of the display panel 9_1C to drive a plurality of TDDI scan lines TGL connected to a display pixel array and a touch sensing array associated with the display panel 9_1C.

Figure 9C:
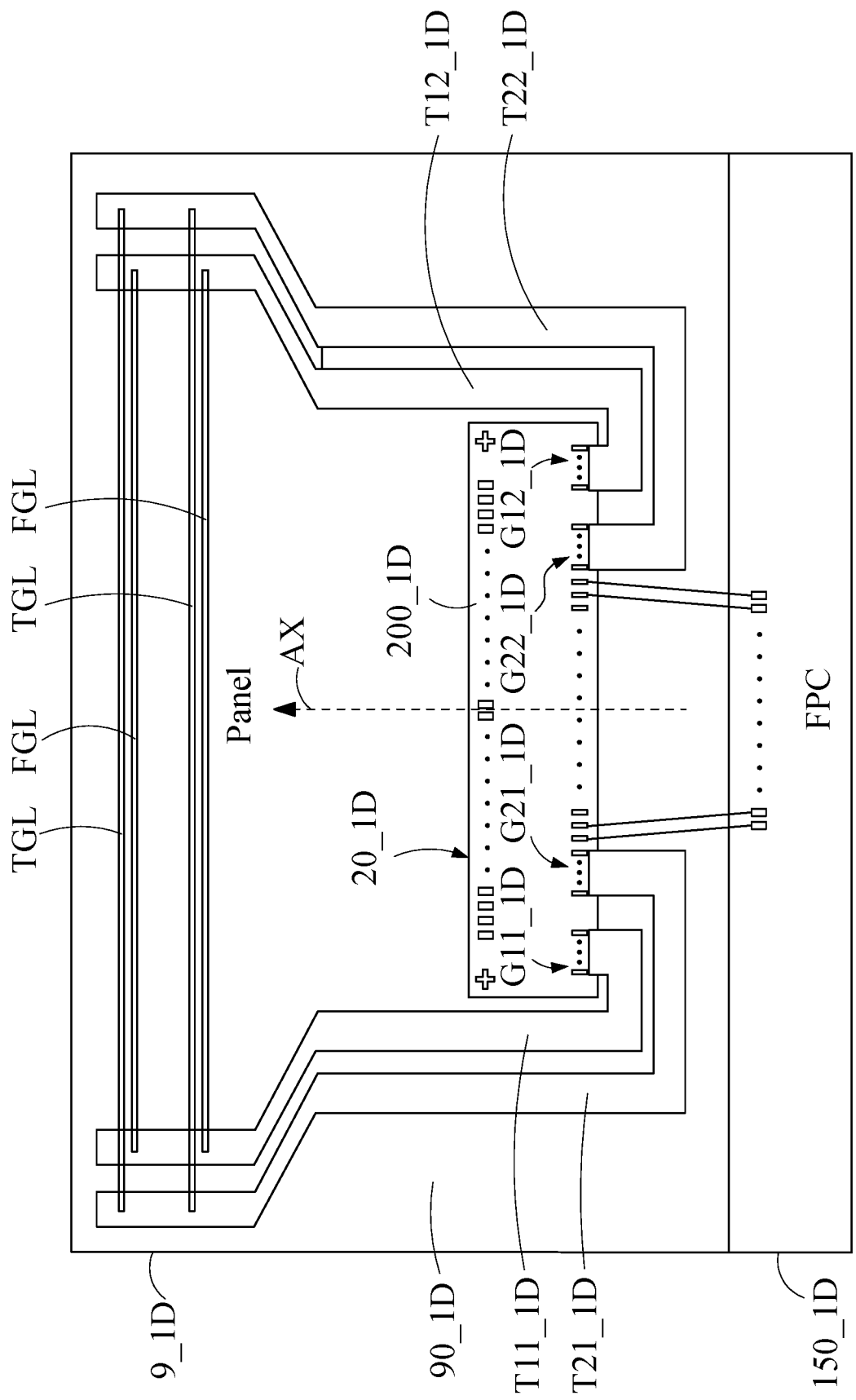
FIG. 9C is a schematic diagram illustrating an embodiment of pad arrangement of a single-chip device along a first side thereof.

In another example using COG packaging, referring to FIG. 9C, a single-chip device 20_1D bonded on a glass portion 90_1D of a display panel 9_1D comprises all first group of pads G11_1D-G12_1D for fingerprint sensing and the second group of pads G21_1D-G22_1D for display and touch sensing (e.g., TDDI) disposed along the first side (or a lower transversal side). On the glass portion 90_1D, a plurality of first traces T11_1D and T12_1D can be implemented to connect to the first group of pads G11_1D and G12_1D, respectively, and extended to the left and right borders of a display panel 9_1D. A plurality of second traces T21_1D and T22_1D can be implemented to connect to the second group of pads G21_1D and G22_1D, respectively, and extended to the left and right borders of the display panel 9_1D. For the sake of brevity, the details are similar to those of FIG. 9B and will not be described.

In the examples as shown in FIGS. 5 and 9B, the first group of pads are closer to the axis AX than the second group of pads. In the examples as shown in FIGS. 9A and 9C, the second group of pads are closer to the axis AX than the first group of pads. In some examples, the first group of pads and the second group of pads as in any one of FIGS. 5, 9A to 9C can be inner-lead-bonding pads. However, the invention is not limited thereto.

In some embodiments based on FIGS. 1 and 4A, as illustrated in FIGS. 10A-10D, all the first group of pads and all the second group of pads are disposed along an upper side of the single-chip device (or the second side S2 as in FIG. 4A).

Figure 10A:
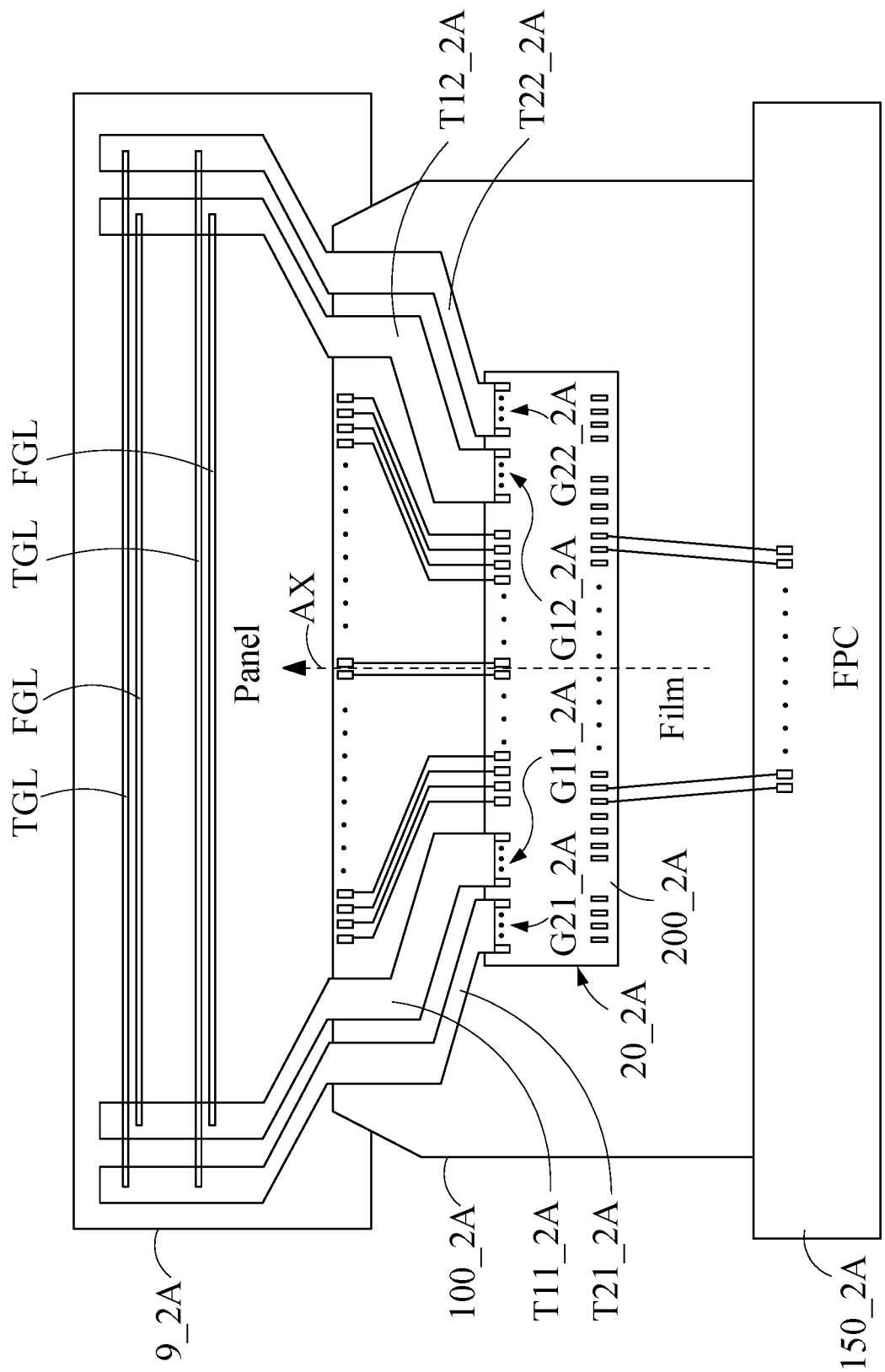
FIG. 10A is a schematic diagram illustrating an embodiment of pad arrangement of a single-chip device along a second side thereof.

As an example using COF packaging, referring to FIG. 10A, a single-chip device 20_2A bonded on a film 100_2A comprises all of the first group of pads G11_2A-G12_2A for fingerprint sensing and the second group of pads G21_2A-G22_2A for display and touch sensing (e.g., TDDI) disposed along the second side (or an upper transversal side). A plurality of first traces T11_2A and T12_2A can be implemented to connect to the first group of pads G11_2A and G12_2A, respectively, and extended to the left and right borders of a display panel 9_2A to drive a plurality of fingerprint scan lines FGL connected to a fingerprint sensing array associated with the display panel 9_2A. A plurality of second traces T21_2A and T22_2A, can be implemented to connect to the second group of pads G21_2A and G22_2A, respectively, and extended to the left and right borders of the display panel 9_2A to drive a plurality of TDDI scan lines TGL connected to a display pixel array and a touch sensing array associated with the display panel 9_2A.

Figure 10B:
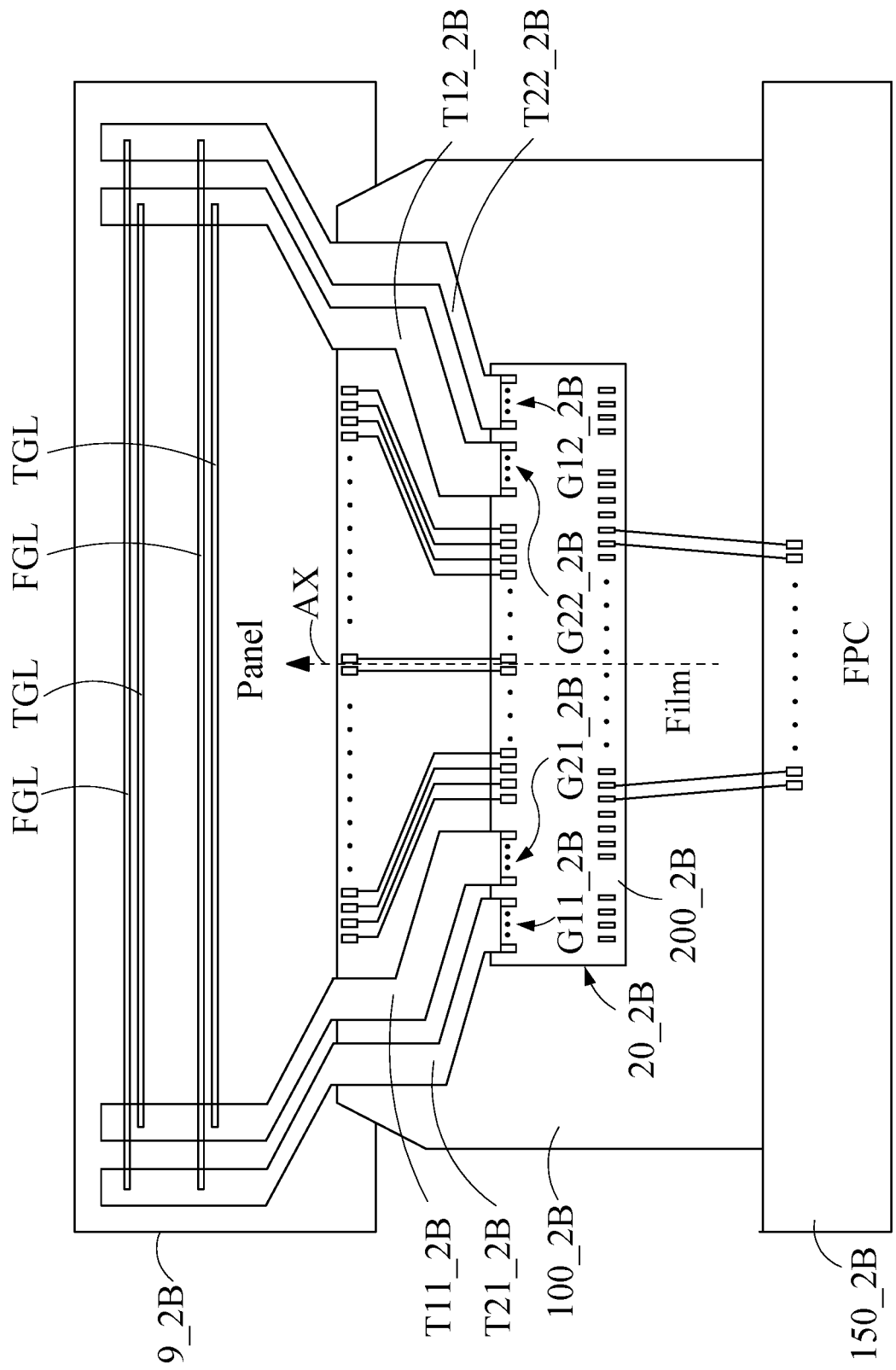
FIG. 10B is a schematic diagram illustrating an embodiment of pad arrangement of a single-chip device along a second side thereof.

In another example using COF packaging, referring to FIG. 10B, a single-chip device 20_2B bonded on a film 100_2B comprises all first group of pads G11_2B-G12_2B for fingerprint sensing and the second group of pads G21_2B-G22_2B for display and touch sensing (e.g., TDDI) disposed along the second side.

Figure 10C:
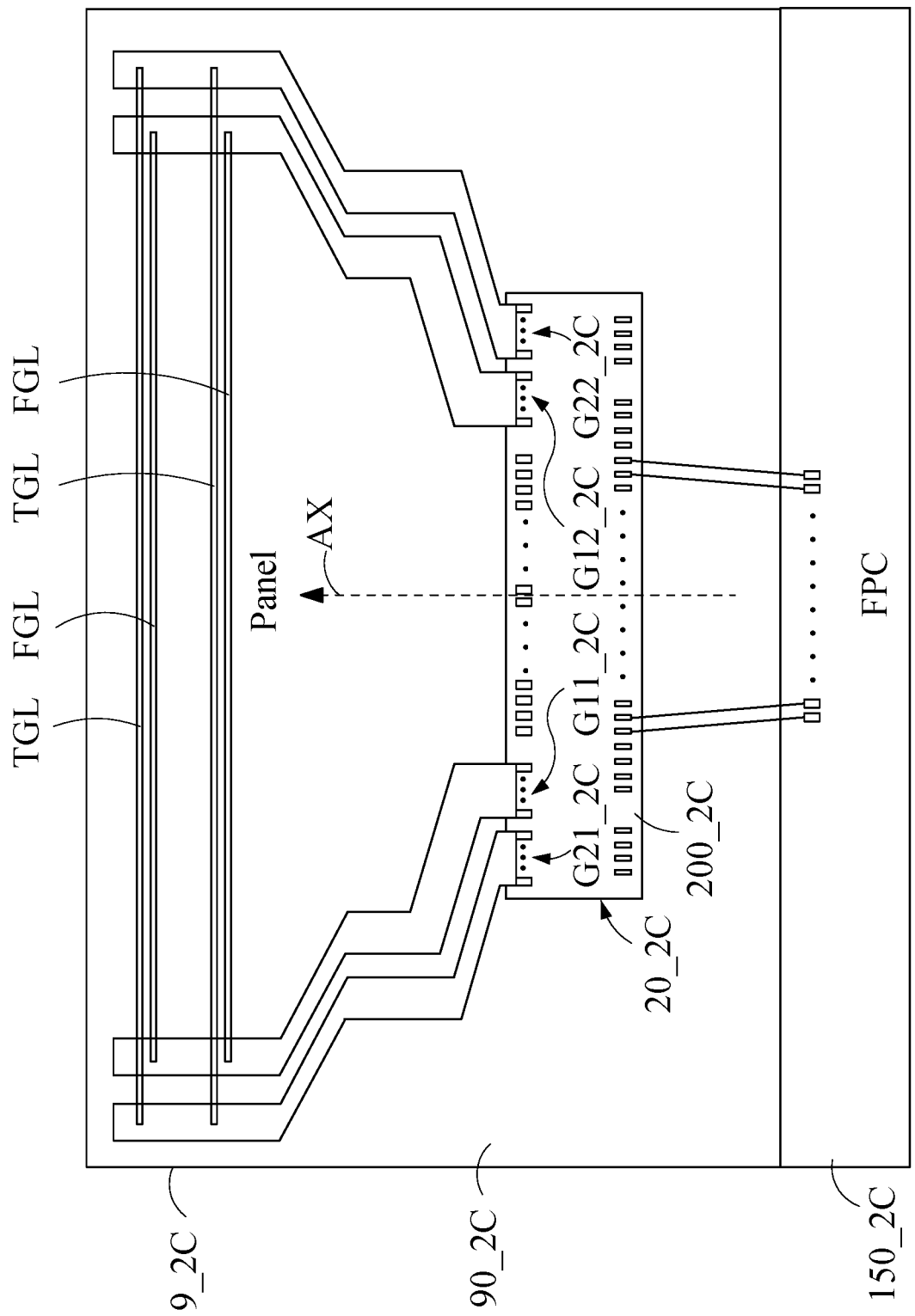
FIG. 10C is a schematic diagram illustrating an embodiment of pad arrangement of a single-chip device along a second side thereof.

In an example using COG packaging, referring to FIG. 10C, a single-chip device 20_2C bonded on a glass portion 90_2C of a display panel 9_2C comprises all first group of pads G11_2C-G12_2C for fingerprint sensing and the second group of pads G21_2C-G22_2C for display and touch sensing (e.g., TDDI) disposed along the second side.

Figure 10D:
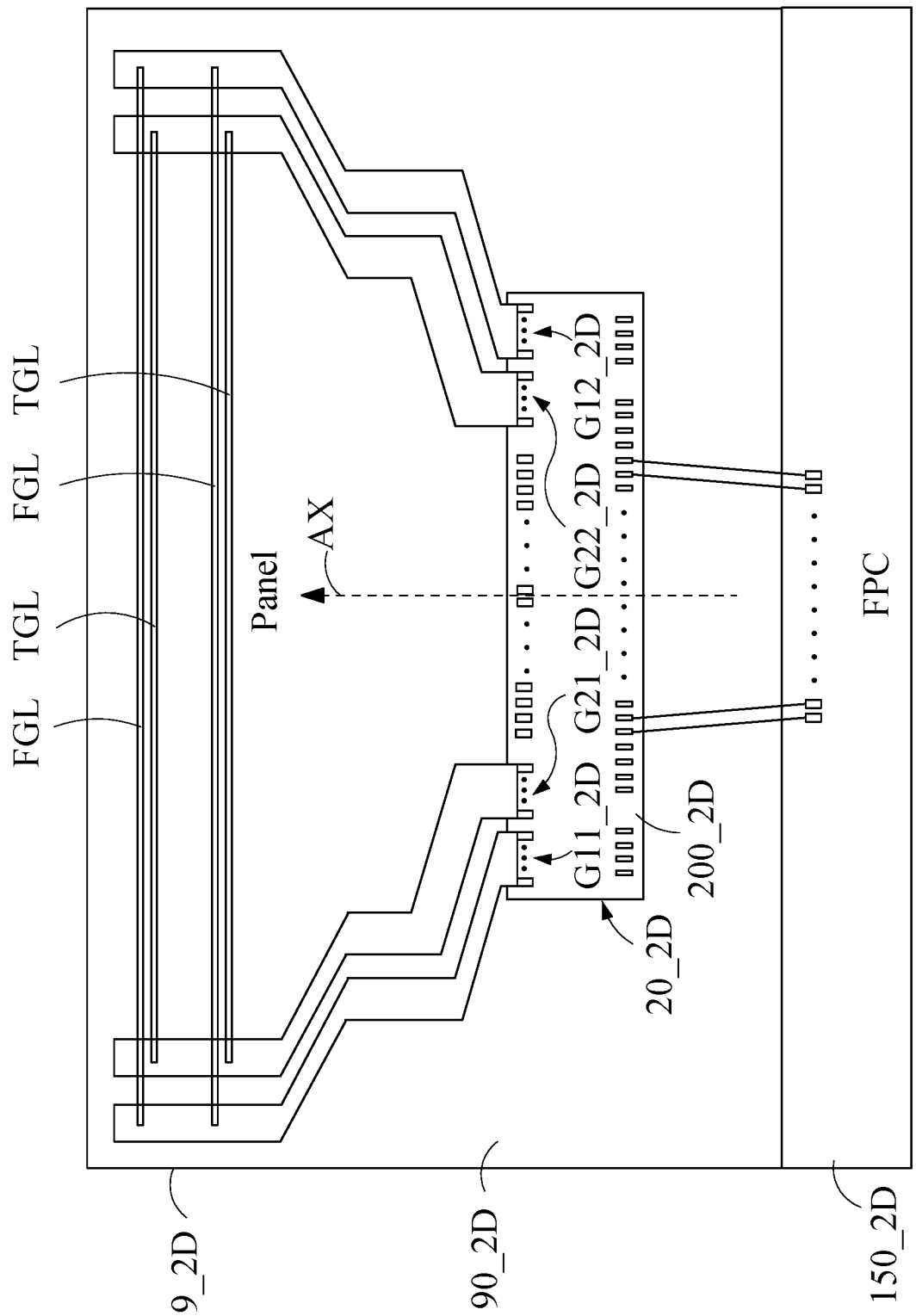
FIG. 10D is a schematic diagram illustrating an embodiment of pad arrangement of a single-chip device along a second side thereof.

In another example using COG packaging, referring to FIG. 10D, a single-chip device 20_2D bonded on a glass portion 90_2D of a display panel 9_2D comprises all first group of pads G11_2D-G12_2D for fingerprint sensing and the second group of pads G21_2D-G22_2D for display and touch sensing (e.g., TDDI) disposed along the second side.

In FIG. 10B (or FIG. 10C, FIG. 10D), a plurality of first traces T11_2B and T12_2B (or T11_2C and T12_2C; T11_2D and T12_2D) can be implemented to connect the first group of pads G11_2B and G12_2B (or G11_2C and G12_2C; G11_2D and G12_2D), respectively, to the panel 9_2B (or 9_2C, 9_2D). A plurality of second traces T21_2B and T22_2B (or T21_2C and T22_2C; T21_2D and T22_2D) can be implemented to connect the second group of pads G21_2B and G22_2B (or G21_2C and G22_2C; G21_2D and G22_2D), respectively, to the panel 9_2B (or 9_2C, 9_2D). For the sake of brevity, the details for FIG. 10B-10D are similar to the above examples and will not be described.

In the examples as shown in FIGS. 10A and 10C, the first group of pads are closer to the axis AX than the second group of pads. In the examples as shown in FIGS. 10B and 9D, the second group of pads are closer to the axis AX than the first group of pads. In some examples, the first and second group of pads as in any one of FIGS. 10A-10D can be outer-lead-bonding (OLB) pads. As compared to those in FIGS. 5, 9A-9C, shorter traces can be implemented in the examples shown in FIGS. 10A-10D. However, the invention is not limited to the examples.

Figure 11A:
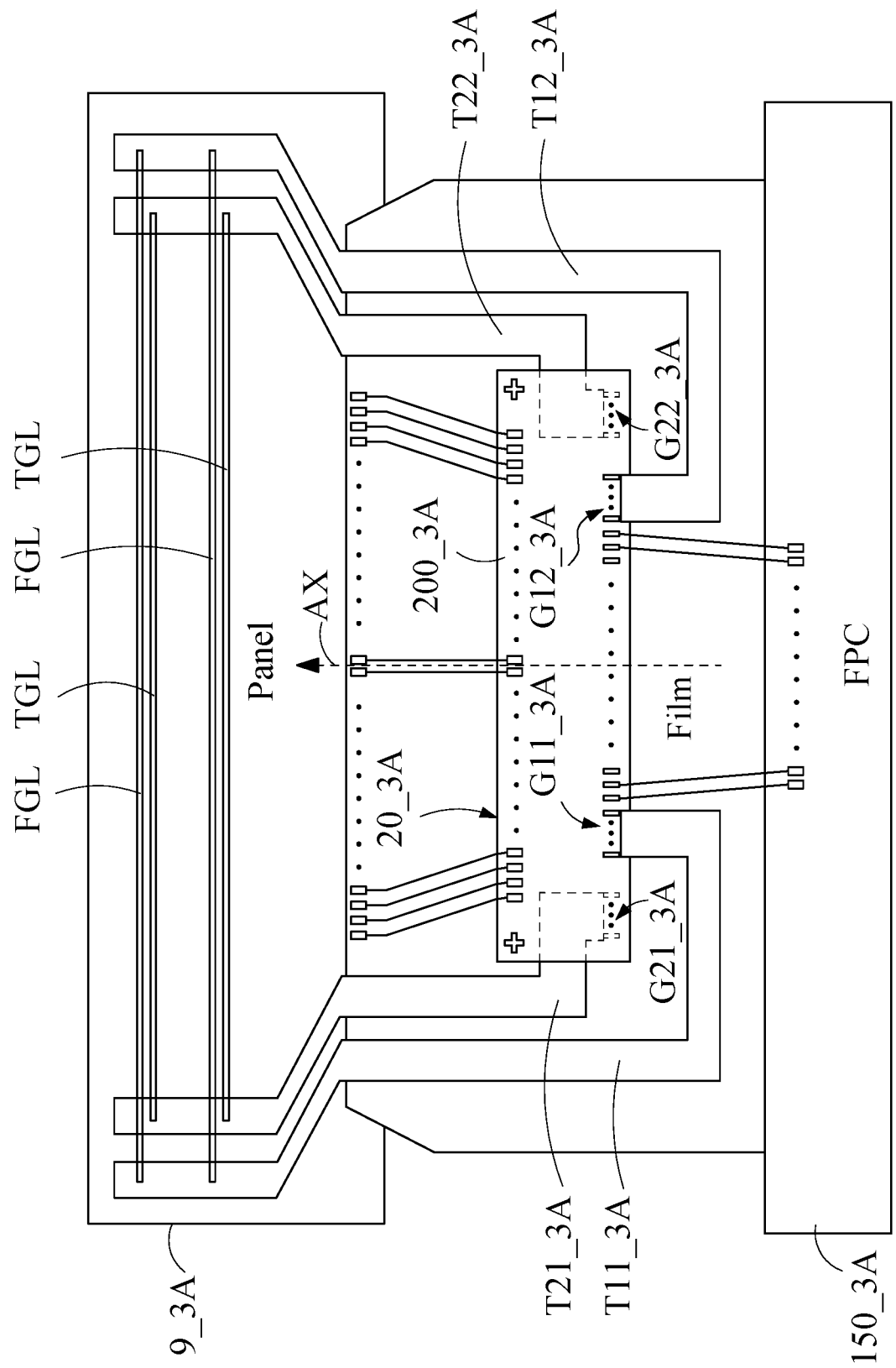
FIG. 11A is a schematic diagram illustrating an embodiment of pad arrangement of a single-chip device along a first side thereof.
Figure 11B:
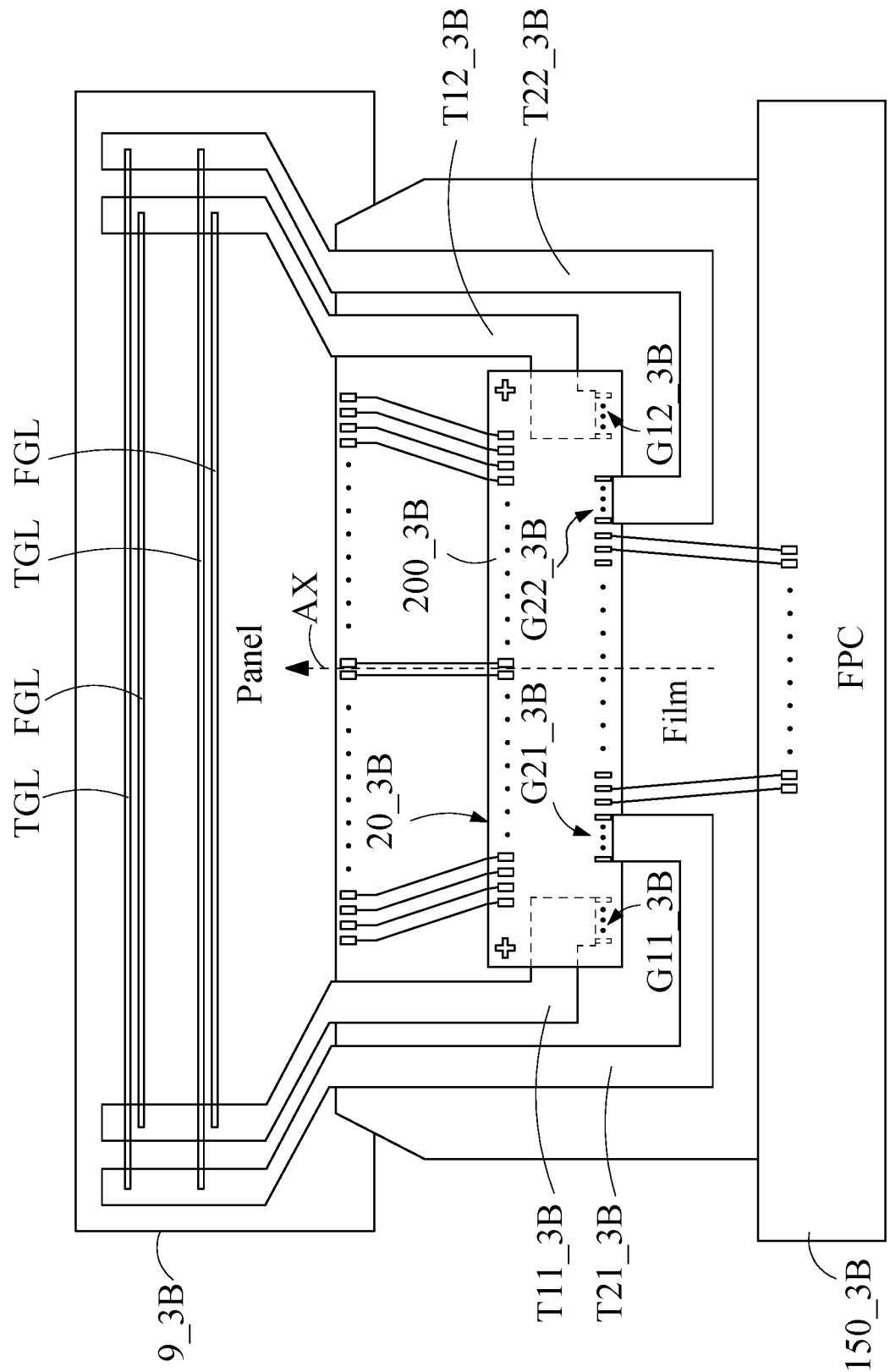
FIG. 11B is a schematic diagram illustrating an embodiment of pad arrangement of a single-chip device along a first side thereof.
Figure 11C:
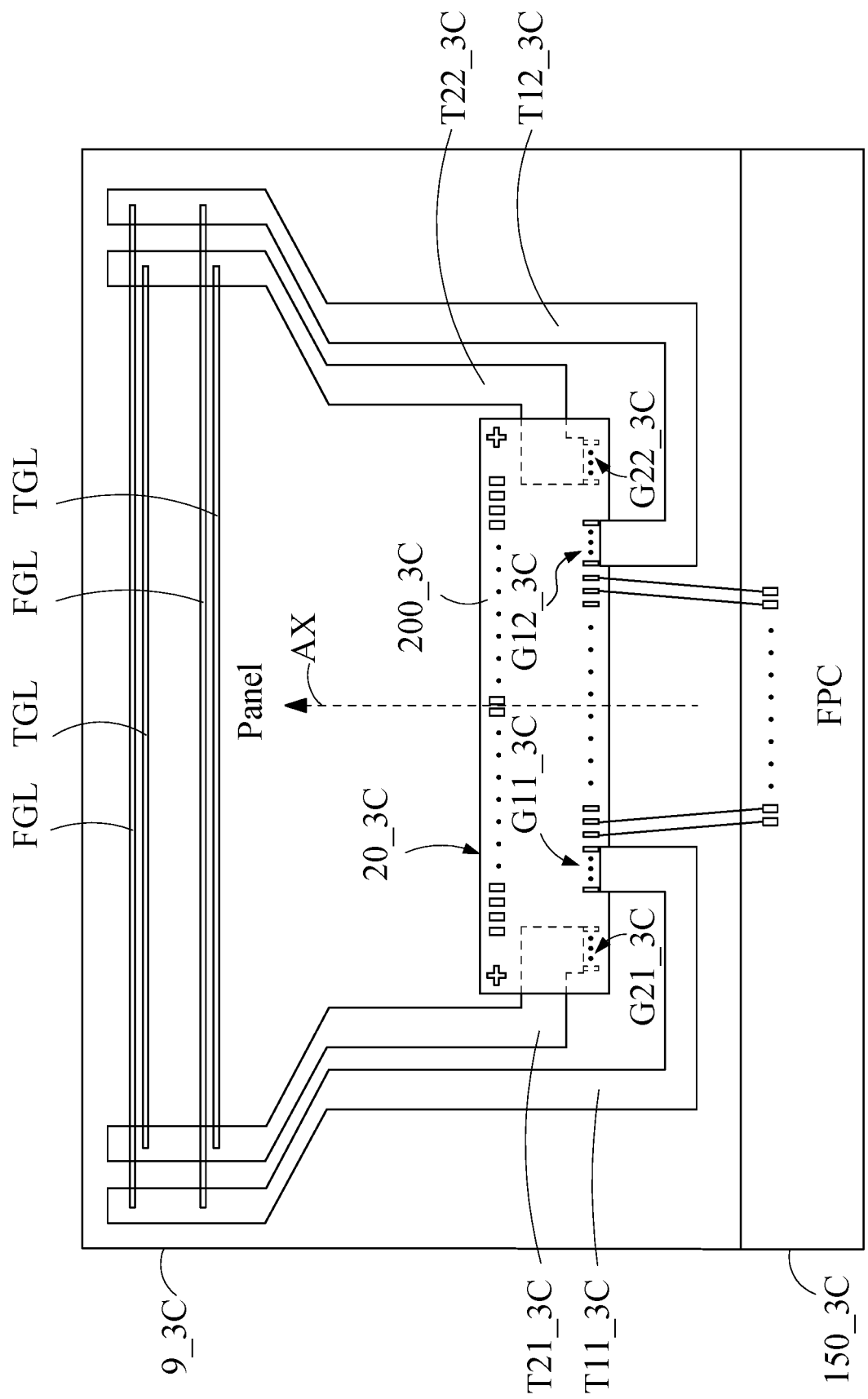
FIG. 11C is a schematic diagram illustrating an embodiment of pad arrangement of a single-chip device along a first side thereof.
Figure 11D:
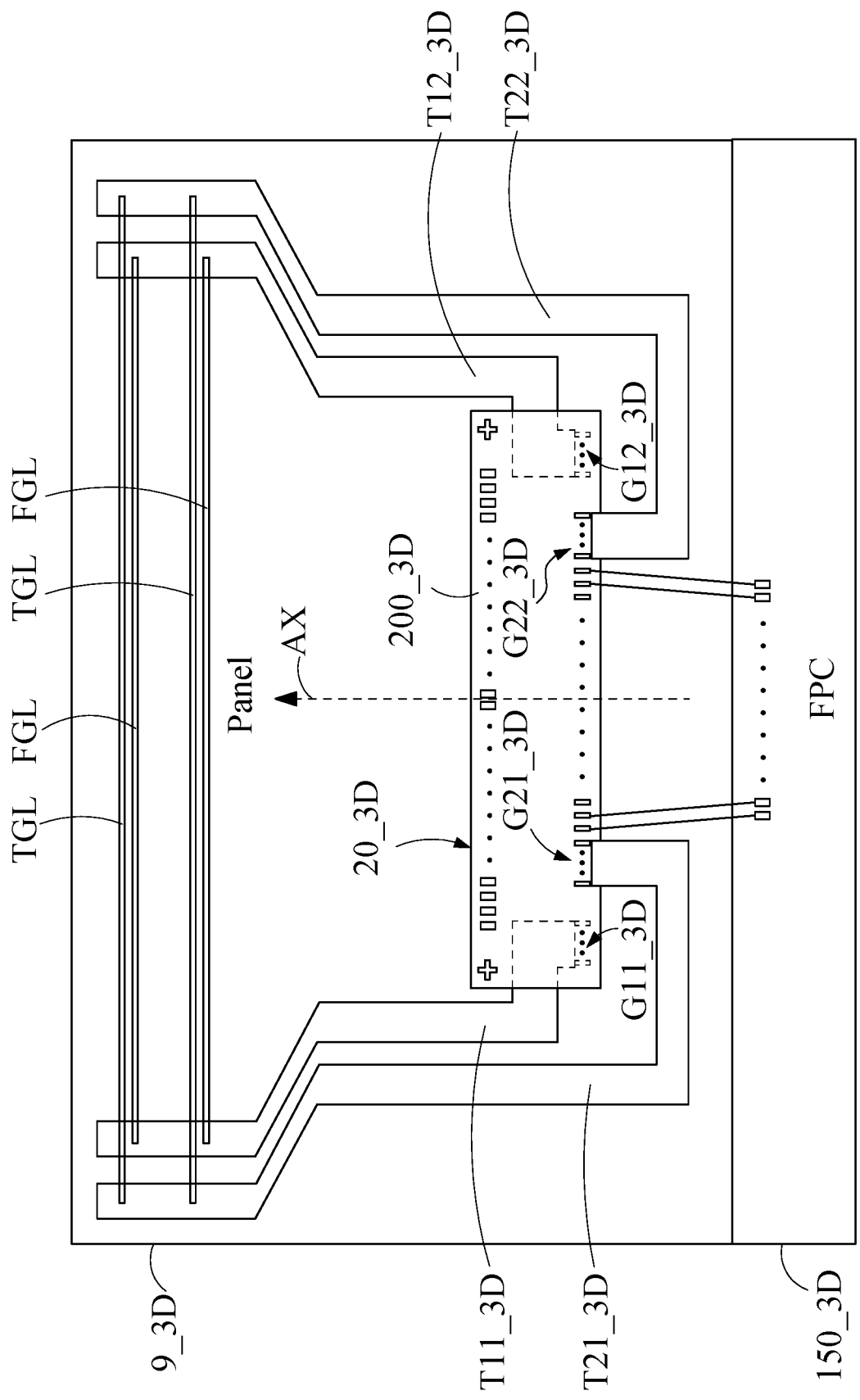
FIG. 11D is a schematic diagram illustrating an embodiment of pad arrangement of a single-chip device along a first side thereof.

In some embodiments based on FIGS. 1 and 4A, as illustrated in FIGS. 11A-11D, all the first group of pads and all the second group of pads are disposed along a lower side of the single-chip device (or the first side S1 as in FIG. 4A) and traces connected to the first group of pads or the second group of pads can be routed from shorter sides (e.g., the left side S3 and right sides S4). FIGS. 11A and 11B employ COF arrangements while FIGS. 11C and 11D employ COG arrangements. In FIG. 11B or 11D, the second group of pads G21_3B-G22_3B or G21_3D-G22_3D (e.g., TDDI CGOUT) are ILB pads of the single-chip device 20_3B or 20_3D closer to the axis AX than the first group of pads G11_3B-G12_3B or G11_3D-G12_3D (e.g., FPR CGOUT). The traces T11_3B-T12_3B or T11_3D-T12_3D of the first group of pads G11_3B-G12_3B or G11_3D-G12_3D are routed from the shorter sides (e.g., the left side S3 and right side S4) through line-on-film (LOF) lines or line-on-glass (LOG) lines to the display panel while the traces T21_3B-T22_3B or T21_3D-T22_3D of the second group of pads G21_3B-G22_3B or G21_3D-G22_3D are routed from the lower side (e.g., the first side S1). In FIG. 11A or 11C, the first group of pads G11_3A-G12_3A or G11_3C-G12_3C (e.g., FPR CGOUT) are ILB pads of the single-chip device 20_3A or 20_3C closer to the axis AX than the second group of pads G21_3A-G22_3A or G21_3C-G22_3C (e.g., TDDI CGOUT). The traces T21_3A-T22_3A or T21_3C-T22_3C of the second group of pads G21_3A-G22_3A or G21_3C-G22_3C are routed from the shorter sides (e.g., the left side S3 and right side S4) through line-on-film (LOF) lines or line-on-glass (LOG) lines to the display panel while the traces T11_3A-T12_3A or T11_3C-T12_3C of the first group of pads G11_3A-G12_3A or G11_3C-G12_3C are routed from the lower side (e.g., the first side S1). This can allow the panel manufacturer to flexibly choose whether to route the traces from the longer sides of the chip (e.g., FTDI IC) or route the traces from the shorter sides to the display panel.

In some embodiments of the single-chip device based on FIGS. 1 and 4A, as illustrated in FIGS. 12A-12D, all the first group of pads are disposed along the left side S3 and the right side S4, and all the second group of pads are disposed along the left side S3 and the right side S4.

Figure 12A:
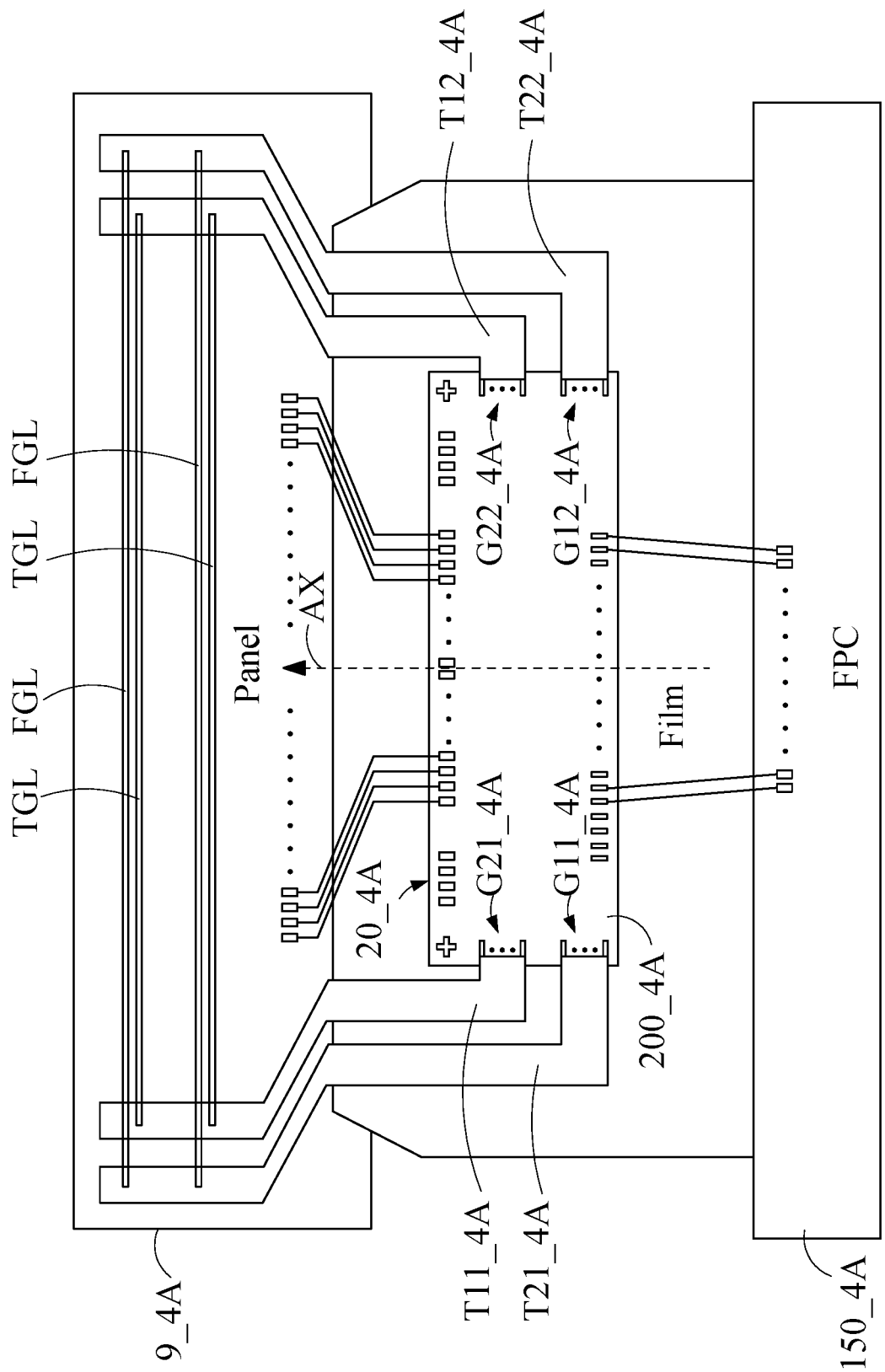
FIG. 12A is a schematic diagram illustrating an embodiment of pad arrangement of a single-chip device along left and right sides thereof.
Figure 12B:
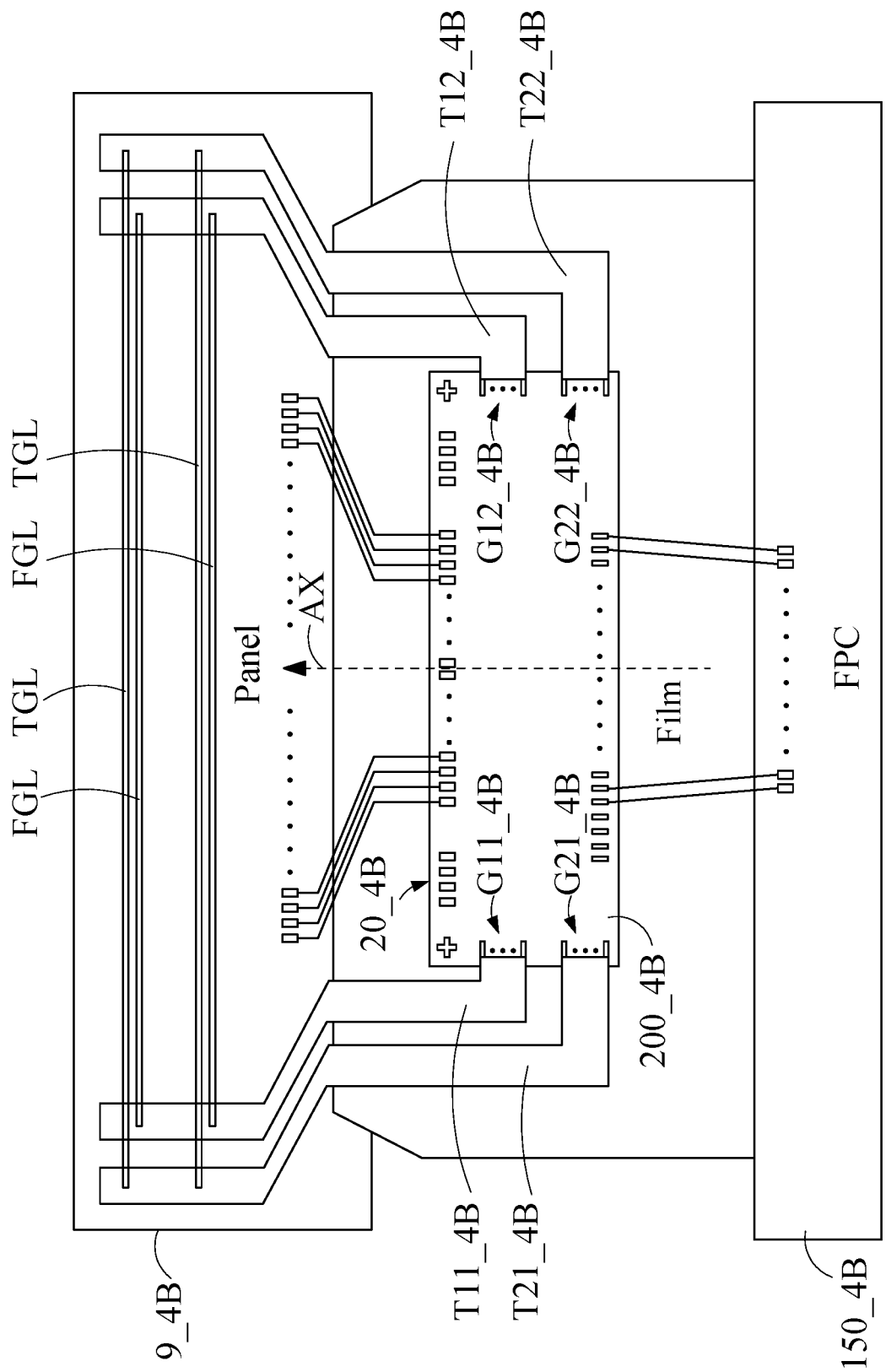
FIG. 12B is a schematic diagram illustrating an embodiment of pad arrangement of a single-chip device along left and right sides thereof.
Figure 12C:
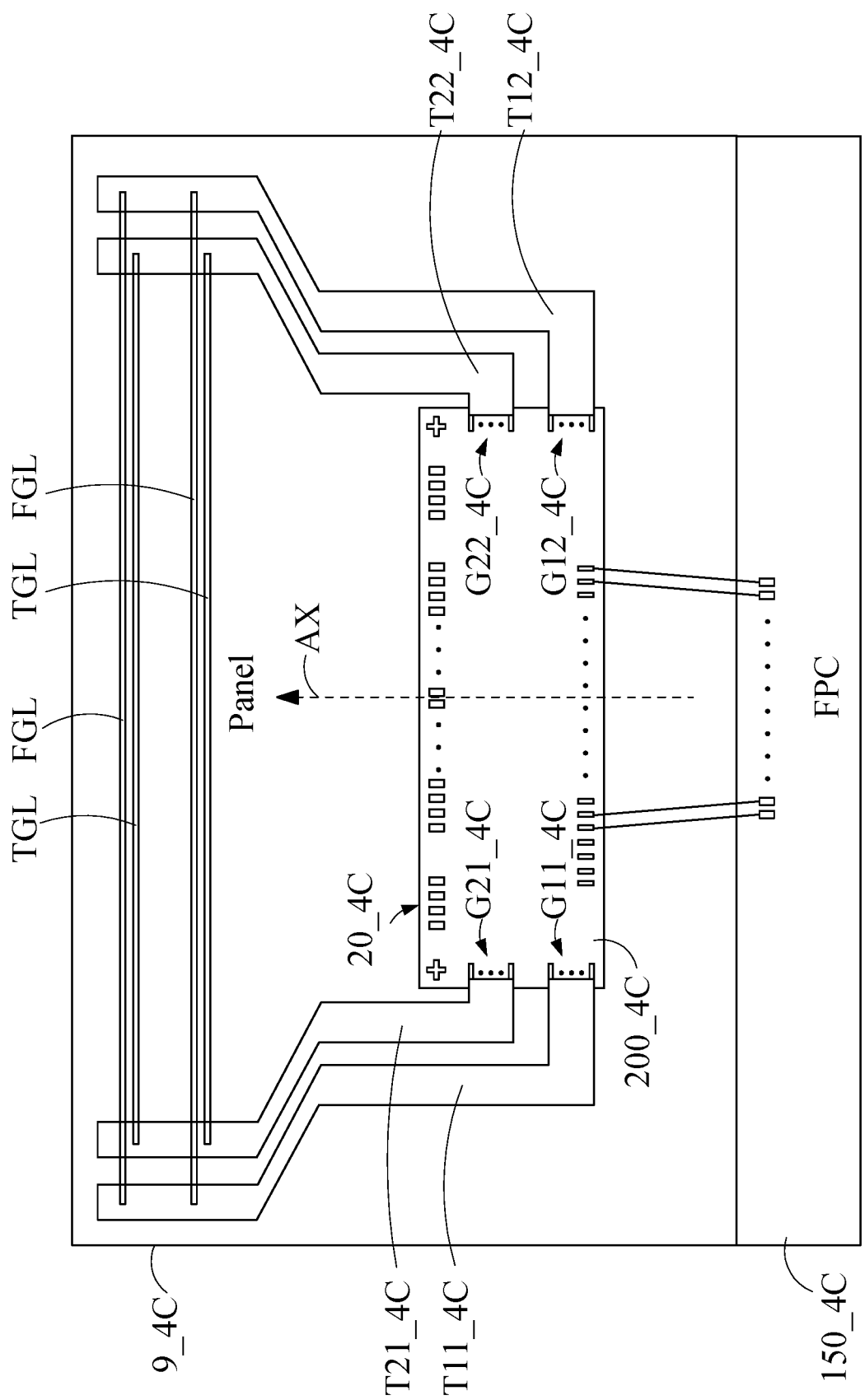
FIG. 12C is a schematic diagram illustrating an embodiment of pad arrangement of a single-chip device along left and right sides thereof.
Figure 12D:
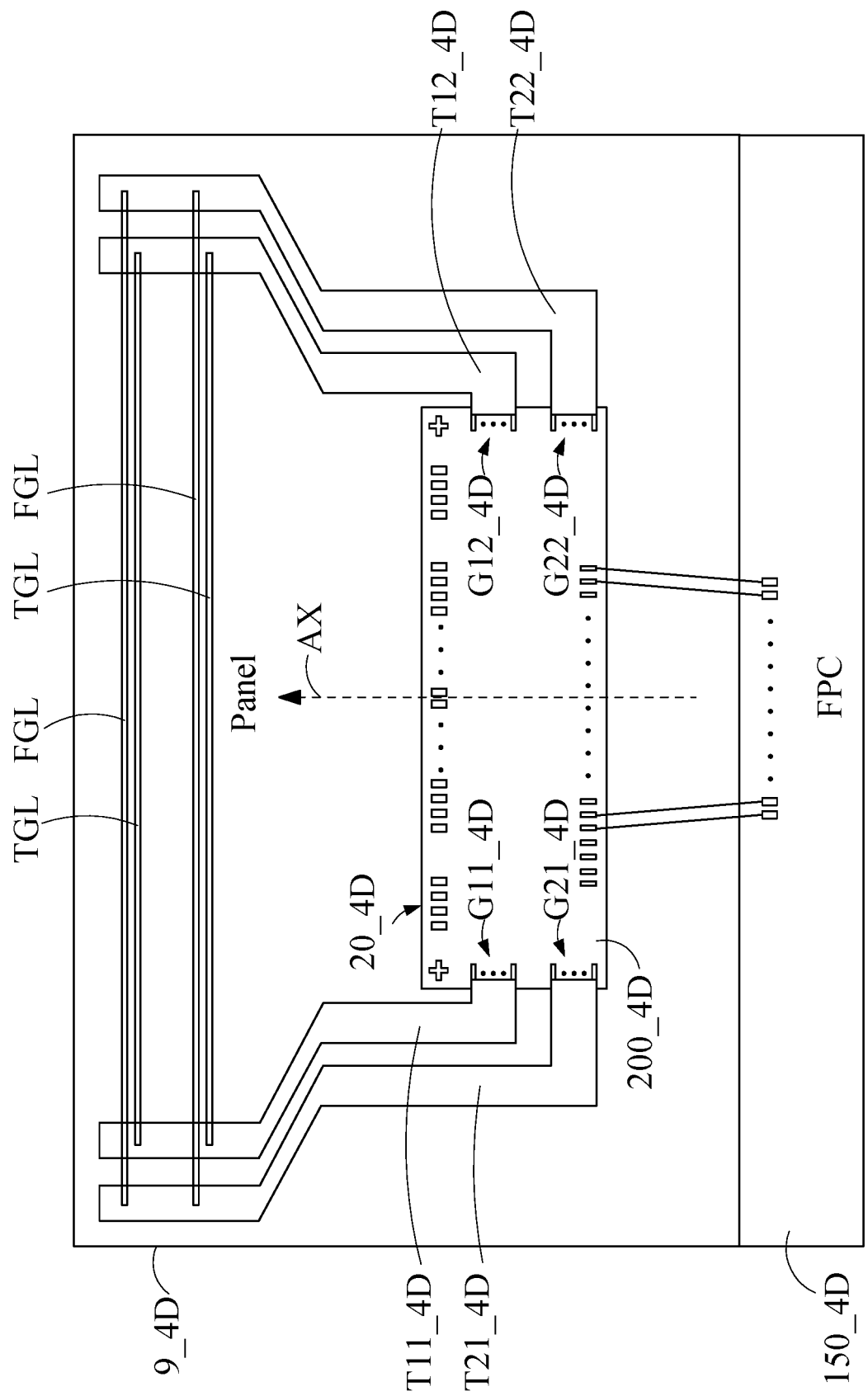
FIG. 12D is a schematic diagram illustrating an embodiment of pad arrangement of a single-chip device along left and right sides thereof.

FIGS. 12A and 12B employ COF arrangements, and FIGS. 12C and 12D employ COG arrangements. Both the first group of pads G11_4A-G12_4A, G11_4B-G12_4B, G11_4C-G12_4C, or G11_4D-G12_4D (e.g., FPR CGOUT) and the second group of pads G21_4A-G22_4A, G21_4B-G22_4B, G21_4C-G22_4C, or G21_4D-G22_4D (e.g., TDDI CGOUT) are pads from the shorter sides of the single-chip device 20_4A, 20_4B, 20_4C, or 20_4D. In FIG. 12A or 12C, the second group of pads (e.g., TDDI CGOUT) are configured to be near the OLB pads while the first group of pads (e.g., FPR CGOUT) are configured to be near the ILB pads. In FIG. 12B or 12D, the second group of pads are configured to be near the ILB pads while the first group of pads are configured to be near the OLB pads. In FIG. 12A (or FIG. 12B, 12C, or 12D), a plurality of first traces T11_4A and T12_4A (or T11_4B, T12_4B; T11_4C, T12_4C; T11_4D, T12_4D) can be implemented to connect the first group of pads G11_4A and G12_4A (or G11_4B, G12_4B; G11_4C, G12_4C; G11_4D, G12_4D), respectively, to the panel 9_4A (or 9_4B, 9_4C, 9_4D). A plurality of second traces T21_4A and T22_4A (or T21_4B, T22_4B; T21_4C, T22_4C; T21_4D, T22_4D) can be implemented to connect the second group of pads G21_4A and G22_4A (or G21_4B, G22_4B; G21_4C, G22_4C; G21_4D, G22_4D), respectively, to the panel 9_2B (or 9_2C, 9_2D).

In some embodiments of the single-chip device based on FIGS. 1 and 4A, all the first group of pads are disposed along one of the first side S1 and the second side S2 (e.g., as illustrated in FIGS. 5, 9A-9C; FIGS. 10A-10D), and all the second group of pads are disposed along both the left side S3 and the right side S4 (e.g., as illustrated in FIGS. 12A-12D).

In some embodiments of the single-chip device based on FIGS. 1 and 4A, all the first group of pads are disposed along both the left side S3 and the right side S4 (e.g., as illustrated in FIGS. 12A-12D), and all the second group of pads are disposed along one of the first side S1 and the second side S2 (e.g., as illustrated in FIGS. 5, 9A-9C; FIGS. 10A-10D).

As such, the above embodiments (as illustrated in FIGS. 5, 9A-12D, or related embodiments) regarding pad arrangements, as compared to the possible implementation in FIG. 3, can facilitate corresponding traces configured in a nearly symmetrical manner, without crossing over each other. Accordingly, signal interference reduction can be achieved with respect to touch sensing and fingerprint sensing. In addition, the manufacturing cost can also be reduced due to the saving of additional processing and specific material for use in reduction of influence of the traces crossing over each other.

The following further provides embodiments of a single-chip device based on the architecture of FIG. 1 with pad assignments in terms of FPR CGOUT signals and TDDI CGOUT signals.

Figure 13:
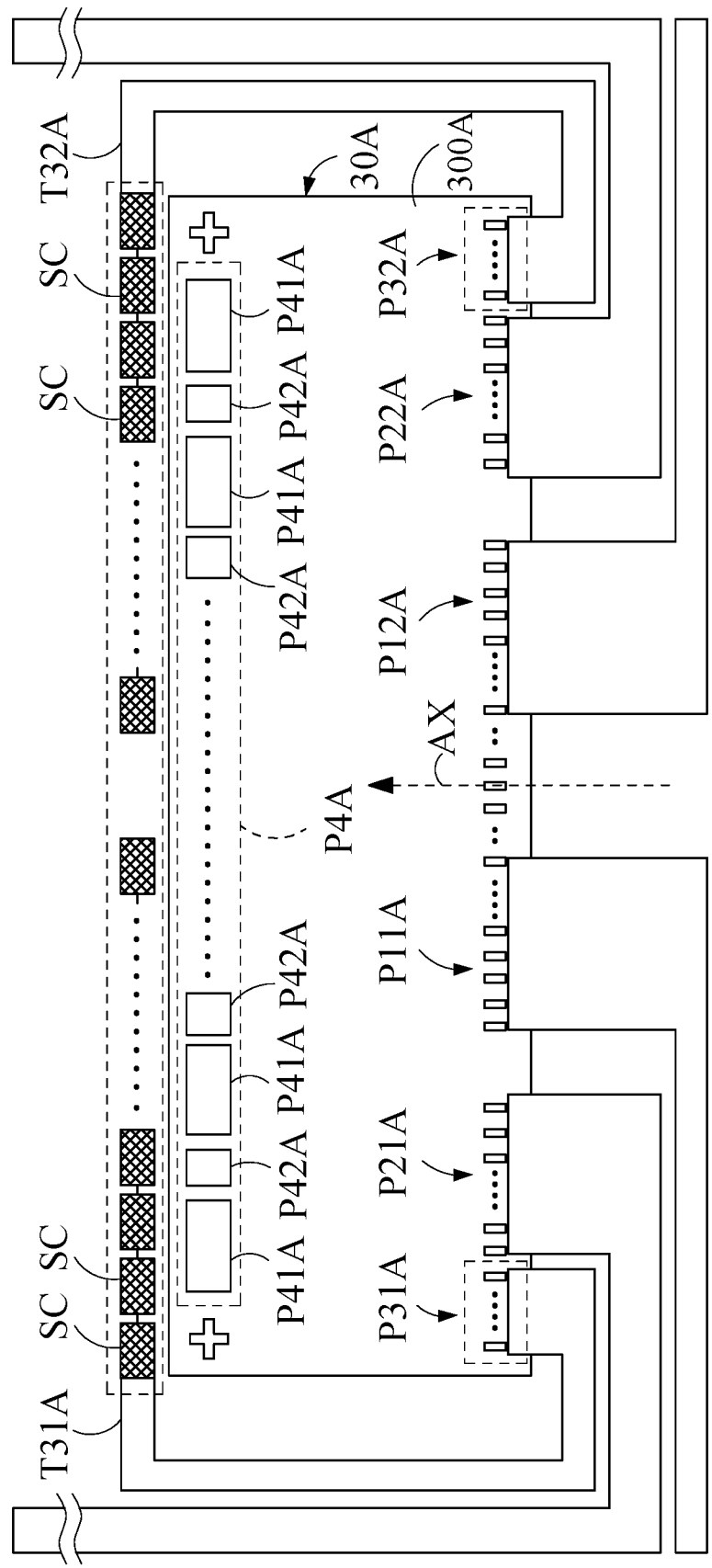
FIG. 13 is a schematic diagram illustrating an embodiment of pad arrangement of a single-chip device.
Figure 14:
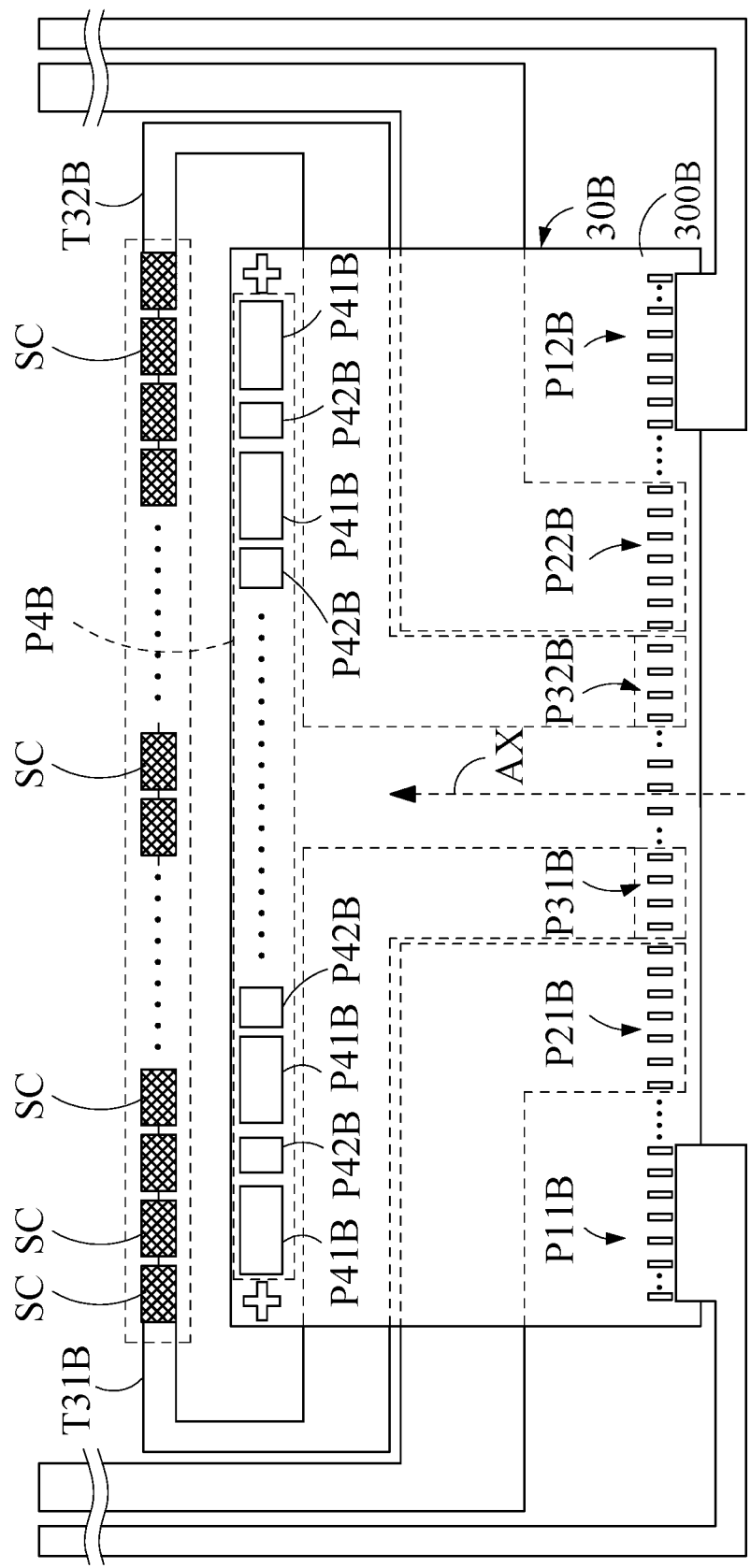
FIG. 14 is a schematic diagram illustrating another embodiment of pad arrangement of a single-chip device.

In a computing device that employs a single-chip device based on the architecture of FIG. 1, the panel of the computing device may be generally implemented with a data line selection circuit, a fingerprint sensing line selection circuit, or both of them (e.g., the block B1 illustrated in FIG. 6B or 6C) disposed beside a border of the panel, wherein the border is typically adjacent to the single-chip device. In order to avoid the possibility of traces for TDDI CGOUT signals crossing over the traces on the panel, the traces for TDDI_SWR/TDDI_SWG/TDDI_SWB/TDDI_SW_FP signals may be implemented to be near the center of the panel as much as possible. Referring to FIGS. 13 and 14, a single-chip device is coupled to the panel that, among other components, including a plurality of selection circuits SC, each of which may implement the switches SWR/SWG/SWB/SW_FP as shown in FIG. 6B or 6C.

As illustrated in FIG. 13, a single-chip device 30A, for example, based on the architecture of the single-chip device 10 or 10A and the pad arrangement as illustrated in FIG. 4A, comprises a first group of pads, a second group of pads, and a third group of pads.

The first group of pads can include a plurality of first pads P11A and P12A. For example, the first group of pads and the second group of pads are disposed on both the left portion and the right portion (e.g., on a lower side or first side) while the third group of pads are disposed along an upper side or the second side. As shown in FIG. 13, the first group of pads including the first pads P11A and P12A are closer to the axis AX than the second group of pads including the second pads P21A and P22A and the third pads P31A and P32A are. For example, the first group of pads include the first pads P11A for FPR_STV, FPR_GCK1, FPR_GCK2, FPR_GCK3, FPR_SEL1, FPR_SEL2, FPR_SEL3, FPR_UD, and/or FPR_UDB signals for the left portion, and the first group of pads further include the corresponding first pads P12A for their respective signals of the same for the right portion, as exemplified in TABLE 1 and 2.

The second group of pads can include a plurality of second pads P21A and P22A and a plurality of third pads P31A and P32A. The second group of pads include the second pads P21A for TDDI_STV, TDDI_UD, TDDI_UDB, TDDI_GCK1, TDDI_GCK2, TDDI_RST signals for the left portion and the second group of pads further include the corresponding second pads P22A for their respective signals of the same for the right portion, as exemplified in TABLE 1 and 2. The second group of pads may further include the third pads P31A for outputting control signals, such as TDDI_SWR, TDDI_SWG, TDDI_SWB, and/or TDDI_SW_FP signals for the left portion, and further include the corresponding third pads P32A pads for their respective signals of the same for the right portion, as exemplified in TABLE 1 and 2. In FIG. 13, the third pads P31A, P32A (e.g., ILB pads) are configured to be coupled to the selection circuits SC of the panel through traces T31A, T32A, respectively.

The third group of pads including a plurality of fourth pads (e.g., P4A). In some embodiments, the third group of pads include the fourth pads P4A for driving the data lines or receiving fingerprint sensing signals from the fingerprint sensing lines or for being coupled to a plurality of touch sensing lines of the panel and receiving touch signals from the touch sensing lines.

In an embodiment, the fourth pads P4A include a plurality of first sub-groups of pads (e.g., P41A) for driving the data lines and receiving fingerprint sensing signals from the fingerprint sensing lines in a time-division manner, and a plurality of second sub-groups of pads (e.g., P42A), configured to be coupled to the touch sensing lines of the panel, for receiving touch signals from the touch sensing lines. For example, referring to FIGS. 6B, 8, 13, one of the first sub-group of pads connected a trace LS is employed to send the TDDI_SWR, TDDI_SWG, TDDI_SWB signals (e.g., asserted selectively as shown on the left of FIG. 8) in different time instants during a plurality of time intervals for display, and the same pad connected the trace LS is employed to receive a fingerprint sensing signal from the fingerprint sensing line when the related signals such as TDD_SW_FP signal (e.g., asserted selectively as shown on the right of FIG. 8) during the time interval for fingerprint (FP). In addition, during time intervals for touchpad (TP) (as illustrated in FIG. 8), a second sub-group of pads (e.g., P42A) is employed to receive touch signals from the touch sensing lines of the panel.

In another example, the first sub-group of pads (e.g. P41A) are configured to drive the data lines in a time-division manner with the second sub-group of pads receiving touch signals from the touch sensing lines. For example, referring to FIGS. 6C, 13, one of the first sub-group of pads connected a trace LS is employed to send the TDDI_SWR, TDDI_SWG, TDDI_SWB signals (e.g., asserted selectively as shown on the left of FIG. 8) in different time instants by way of the selection circuit of the block B1, selectively.

In some embodiments, the first sub-group of pads and the second sub-group of pads are alternately disposed on the main body. For example, as shown in FIG. 13 or 14, the first sub-group of pads P41A (or P41B) and the second sub-group of pads P42A (or P42B) are alternately disposed on the main body of the single-chip device 30A (or 30B).

As illustrated in FIG. 14, for example, a single-chip device 30B (e.g., based on the single-chip device 10 or 10A) comprises a first group of pads including a plurality of first pads P11B and P12B, a second group of pads including a plurality of second pads P21B and P22B and a plurality of third pads P31B and P32B, and a third group of pads including a plurality of fourth pads P4B. As shown in FIG. 14, the embodiment of FIG. 13 is different from that of FIG. 14 in that in the embodiment in FIG. 14, the third pads P31B and P32B are closer to the axis AX than the second pads P21B and P22B and the first pads P11B and P12B are. For example, the first pads P11B and P12B, the second pads P21B and P22B, the third pads P31B and P32B, and the fourth pads P4B in the embodiment of FIG. 14 can include pads for the same kinds of signals as their counterparts as illustrated in the embodiment of FIG. 13. In some implementations, the traces of the second group of pads including the second pads P21B and P22B and the third pads P31B and P32B may be routed from the shorter sides (e.g., the left side and right side) through line-on-film (LOF) lines or line-on-glass (LOG) lines to the display panel. In FIG. 14, the traces T31B, T32B coupled to the third pads P31B and P32B are for controlling the selection circuits SC. In this manner, the panel manufacturer is capable of flexibly choosing whether to route the traces from the longer sides of the chip (e.g., FTDI IC) or route the traces from the shorter sides to the display panel.

In the above embodiments of FIGS. 13 and 14, the SW_FP signal belongs to the TDDI CGOUT signal group and the pad for the SW_FP signal is included in the second group of pads correspondingly, but the invention is not limited to the examples. In some other embodiments, the SW_FP signal may belong to the FPR CGOUT signal group and the pad for the SW_FP signal is included in the first group of pads in this case. It is preferable, but not limited to, that the position of pad and trace for the SW_FP signal is close to the positions of pads and traces for TDDI_SWR, TDDI_SWG, and TDDI_SWB signals in the TDDI group.

In some other embodiments, such as entitled "A driver chip for fingerprint identification and touch display, a display system and a driving method," is submitted as Annex 3 of U.S. provisional Patent Application No. 62/912,666 filed on Oct. 9, 2019, and as part of this application document, wherein SW_FP signal does not need to be implemented, so TDDI_SW_FP is optional and can be removed.

In addition, either pads for FPR CGOUT or TDDI CGOUT signal group (e.g., the first group of pads or second group of pads) can be located on the upper longer side, the lower long side, the short side, and the upper/lower long side and the short side of the single-chip device. Even the pads for either TDDI CGOUT and FPR CGOUT can be located on different sides. For example, some pad(s) are located on the upper long/short side, and some pad(s) are located on the shorter side; or some pads are located on the upper long or the short side and is short-circuited with the short side, partly on the upper/lower long side; or some pads are on the upper long/short side and short-circuited with the short side, and some are on the short side. The pads for TDDI CGOUT and the pads for FPR CGOUT signals can be configured to be the two portions of pads of FTDI's ILB pads, located on the position near the ends of one side and the position between the ends of the side of the main body of the single-chip device (as illustrated in the example related to FIG. 13), respectively, or the position between the ends of the side and the position near the ends of one side (as illustrated in the example related to FIG. 14), respectively. There are a variety of combinations that can be configured according to design requirements. However, the pads for TDDI CGOUT and FPR CGOUT signals are not staggered. Other embodiments can be deduced by analogy, and the details will not be repeated here for the sake of brevity.

In some embodiments, the positional relationship between the source pads (or data line pads) used to drive the data lines of the display panel, the touch RX pad used to couple the receiving line of the touch control sensing data, and the relationship between each other and the CGOUT are provided. In some embodiments, the two types of pads (e.g., source pads and touch RX pads) may be located on the long side opposite to CGOUT pads, such as the embodiments in FIGS. 5, 9A to 12D. Preferably, the two types of pads can be located on the long side of the FTDI IC closer to the panel, as illustrated in FIGS. 13 and 14, but the invention is not limited thereto.

In some embodiments of the single-chip device, the first pads comprise a plurality of fingerprint gate-driver-on-array selection pads. The fingerprint gate-driver-on-array selection pads as mentioned above are related to the pads of the single-chip device for controlling fingerprint sensing pixels. For the sake of illustration regarding this, referring to FIGS. 6A, 6B, 6C, and 7, a panel 9C comprises multiple display rows, and each display row comprises multiple display pixels DP, and one display pixel DP comprises a plurality of sub-pixels such as red sub-pixel (R), a green sub-pixel (G), and a blue sub-pixel (B) (not limited thereto), wherein gate on array (GOA) circuits GOA1 and GOA2 are disposed on the left and right borders of the display or panel 9C. In FIG. 6B (or 6C, 6E), a gate on array (GOA) circuit GOA2 of the panel 9C is coupled to the scan lines (or gate lines) TGL of the display pixels DP and the scan lines are coupled to the display pixels DP. The GOA circuit GOA2 is used for controlling the display pixels DP through the scan lines TGL. The GOA circuit GOA2 scans the scan lines TGL of the display pixels DP according to the control of a TDDI circuit 21A (e.g., a circuit including a display driver and a touch driver). In an example, each of the scan lines TGL may be single wire or include multiple wires. For example, each of the scan lines TGL may include a reset wire and/or a selecting wire.

As shown in FIG. 6B or 6C, each one (or more) display pixel DP is associated with a fingerprint sensing pixel FS, as illustrated in FIG. 7. A GOA circuit GOA1 of the panel 9C is coupled to the fingerprint sensing pixels FS through multiple scan lines (e.g. FGL). The first group of pads are configured to be coupled to the fingerprint sensing pixels through one or more GOA circuits GOA1. The GOA circuit GOA1 scans the fingerprint scan lines FGL of the fingerprint sensing pixels FS according to the control of a fingerprint driver circuit 29A. In an example, each of the fingerprint scan lines FGL may be single wire or include multiple wires. For example, each of the fingerprint scan lines FPR may include a reset wire for transmitting a reset signal (e.g., represented by FPR_GCK in FIG. 7) to control a switch (e.g., switch TS1), and/or a selecting wire for transmitting an acquiring signal (e.g., represented by FPR_SEL in FIG. 7) to control another switch (e.g., switch TS2). In the above embodiments, the first group of pads of the single-chip device include the pads (or referred to as fingerprint gate-driver-on-array selection pads) for outputting a first signal set (or group) including the reset signal and a second set (or group) including the acquiring signals to the reset wire and the selecting wire for controlling the fingerprint sensing pixels. In an example, the fingerprint gate-driver-on-array selection pads include the pads for outputting the FPR_GCK1, FPR_GCK2, FPR_GCK3, FPR_SEL1, FPR_SEL2, FPR_SEL3 signals, as in the embodiment related to FIG. 13 or 14. In some examples, the GOA circuit GOA2 can be further used for controlling the touch sensors of the panel. In practical implementation, if the touch sensors are self-capacitance touch sensors, the touch sensors can be implemented as common electrodes of the display panel.

Regarding implementation of the fingerprint gate-driver-on-array selection pads, in an embodiment, a panel (e.g., as illustrated in any one of FIGS. 5, 9A-12D, 15, or related examples) can be implemented based on FIGS. 6A and 6B to include two GOA circuits (e.g., represented by GOA1 as in any one of FIGS. 6B-6D) on the left and right borders of the panel for fingerprint sensing while a single-chip device (e.g., as illustrated in any one of FIG. 5, 9A-12D, 15, or related examples) can be implemented to include the first group of pads for the left portion and the right portion, each portion of which includes the first pads for outputting both the first signal set and the second signal set so as to control at least the two kinds of switches (e.g., switches TS1 and TS2, such as transistors) of the fingerprint sensing pixels for the panel. In another embodiment with a panel (e.g., as illustrated in any one of FIG. 5, 9A-12D, 15, or related examples) with two GOA circuits GOA1 as above, a single-chip device (e.g., as illustrated in any one of FIG. 5, 9A-12D, 15 or related examples) can be implemented to include the first group of pads for the left portion (or right portion) which include the pads for outputting the first signal set and include the first group of pads for the right portion (or left portion) which includes the pads for outputting the second signal set, so as to control at least the two kinds of switches (e.g., switches TS1 and TS2) of the fingerprint sensing pixels for the panel, respectively.

In some embodiments of the single-chip device, the second pads comprise a plurality of gate-driver-on-array selection pads. For example, the gate-driver-on-array selection pads are used for outputting signals (e.g., represented by TDDI_S1 in FIG. 6B) for driving the display pixels and/or touch sensors. In some examples, the gate-driver-on-array selection pads include the pads for outputting the TDDI_GCK1, TDDI_GCK2, TDDI_RST signals, as illustrated in the embodiment related to FIG. 13 or 14.

In some embodiments of the single-chip device, the panel further comprises a plurality of data lines coupled to the display pixels, a plurality of fingerprint sensing lines coupled to the fingerprint sensing pixels, and a plurality of selection circuits, wherein each of the selection circuits is coupled to a set of the plurality of data lines and one of the fingerprint sensing lines, and the single-chip device further comprises a plurality of third pads disposed in the main body and configured to be coupled to the panel for controlling the selection circuits. In an example, as shown in FIG. 6B, the block B1 serving as a selection circuit can be implemented by using a multiplexer, demultiplexer or switches, and the pads of the single-chip device 20A connected to the TDDI circuit 21A output the controlling signals (e.g., represented by TDDI_S2 in FIG. 6B) to control the block B1. For example, the third pads can be implemented to include the pads for outputting the TDDI_SWR, TDDI_SWG, TDDI_SWB, TDDI_SW_FP signals, as illustrated in the embodiment related to FIG. 13 or 14. In FIG. 6B, a number of fingerprint sensing pixels FS are controlled by a switch. Certainly, the present disclosure is not limited thereto. In another example, the panel can be implemented so that the fingerprint sensing pixels are controlled by the single-chip device (e.g., FTDI) without using switches. Further, the selection circuit can be also implemented in any appropriate manner; for example, by way of time multiplexing, one of the second pads can be implemented to control three or four (or more) switches so as to achieve signal line reduction.

In some embodiments of the single-chip device, the third pads are disposed on both the left portion and the right portion (e.g., as shown in FIG. 13 or 14).

In some embodiments of the single-chip device, the main body has a rectangular shape having a first side and a second side parallel to the first side and closer to the panel than the first side, and the third pads are disposed along the first side (e.g., as shown in FIG. 13 or 14).

In some embodiments, the third pads can be disposed along the second side, in a manner similar to those pads as exemplified in any of FIGS. 10A-10D.

In some embodiments of the single-chip device, the panel further comprises a plurality of data lines coupled to the display pixels, a plurality of fingerprint sensing lines coupled to the fingerprint sensing pixels, and the single-chip device further comprises a plurality of fourth pads, disposed in the main body. For example, the fourth pads can be used for driving the data lines, or receiving fingerprint sensing signals from the fingerprint sensing lines, or for being coupled to a plurality of touch sensing lines of the panel and receiving touch signals from the touch sensing lines (as shown in FIG. 13 or 14). One or more of the above examples of the fourth pads can be implemented in different scenarios of the panel, whenever appropriate. In an example, referring to FIGS. 6A and 6B, a panel for the architecture based on FIG. 1 is implement to include signals for display pixels and fingerprint sensing pixels in a multiplexing circuit; that is, to share the same selection circuits (e.g., blocks B1). In another example, referring to FIG. 6D, a panel for the architecture of FIG. 1 can be further modified to implement without using selection circuits (e.g., block B1). In yet another example, referring to FIGS. 6A and 6C, a panel for the architecture of FIG. 1 can be further modified to implement the control for display pixels with a selection circuit. Certainly, the implementation of the present disclosure is not limited thereto.

In some embodiments of the single-chip device, the panel further comprises a plurality of selection circuits, wherein each of the selection circuits (e.g., block B1 as illustrated in FIG. 6B) is coupled to a set of the plurality of data lines (e.g., SLR, SLG, SLB as illustrated in FIG. 6B) and one of the fingerprint sensing lines (e.g., SL_FP as illustrated in FIG. 6B), and wherein the first group of pads are configured to be coupled to the selection circuits.

In some embodiments of the single-chip device, the main body has a rectangular shape having a first side and a second side parallel to the first side and closer to the panel than the first side, and the fourth pads are disposed along the second side (e.g., as illustrated in FIG. 13 or 14).

In some embodiments of the single-chip device, a fingerprint driver circuit (e.g., 19; 19A; 29A) and a touch-display driver circuit (e.g., 11 and 12; 11A and 12A; 21A) can be implemented in the main body of the single-chip device. The fingerprint driver circuit is disposed in the main body and coupled to the first group of pads. The touch-display driver circuit is disposed in the main body and coupled to the second pads. In implementations with the third pads, the touch-display driver circuit can be further coupled to the third pads.

In some embodiments of the single-chip device, in the right portion, none of the third pads is disposed between the first pads and the second pads, and in the left portion, none of the third pads is disposed between the first pads and the second pads.

In some embodiments of the single-chip device, the third pads are disposed beside the second pads and not beside the first pads (as shown in FIG. 13 or 14).

In some embodiments of the single-chip device, the second pads are disposed beside the first pads and beside the third pads (as shown in FIG. 13 or 14).

In some embodiments of the single-chip device, the single-chip device further comprises a fingerprint driver circuit and a touch-display driver circuit. The fingerprint driver circuit is disposed in the main body and coupled to the first pads. The touch-display driver circuit is disposed in the main body and coupled to the second pads.

In some embodiments of the single-chip device, in the right portion, none of the first group of pads is disposed between the second group of pads, and none of the second group of pads is disposed between the first group of pads, and in the left portion, none of the first group of pads is disposed between the second group of pads, and none of the second group of pads is disposed between the first group of pads (e.g., as illustrated in FIGS. 5, 9A-12D, 13-15).

Figure 15:
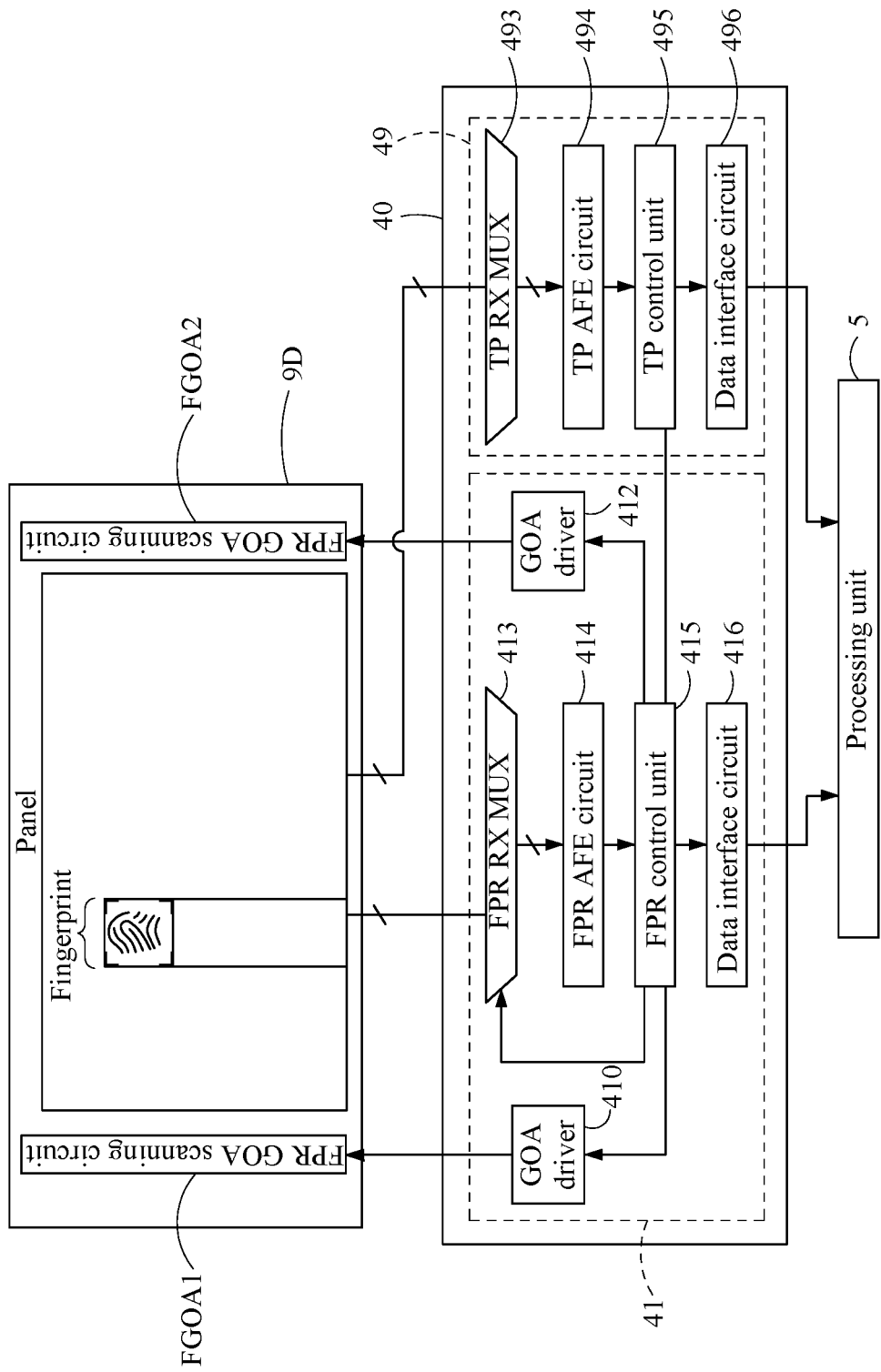
FIG. 15 is a schematic diagram illustrating an embodiment of a single-chip device.

In some embodiments, a structure of a single-chip device (e.g., FTDI IC) is illustrated in FIG. 15. In FIG. 15, for example, the single-chip device 40 includes a fingerprint driver circuit 41 and a touch driver circuit 49. For example, the fingerprint driver circuit 41 includes a fingerprint receiver multiplexing circuit (FPR RX MUX) 413, a fingerprint analog-front end (AFE) circuit 414 (which may include an analog front-end (e.g., low-noise amplifier) and an analog-to-digital converter), a fingerprint control circuit 415 and a data interface circuit 416. The fingerprint control circuit 415 can be implemented to connected to one or more GOA drivers 410 and 412 so as to drive the fingerprint GOA scanning circuits FGOA1 and FGOA2 disposed on the panel 9D. For example, the touch driver circuit 49 includes a touch panel receiver multiplexing circuit (TP RX MUX) 493, a touch analog front-end circuit 494 (which may include an analog-to-digital converter), a touch control circuit 495 (e.g., MCU), and a data interface circuit 496.

Moreover, the following provides some embodiments regarding the implementation of the selection circuits and the configuration of the single-chip device (or electronic module) in FIG. 13 or 14. These embodiments can also be utilized, in part or full, to any of the single-chip device as exemplified above, based on the configuration based on FIGS. 6B, 6C, or other selection circuit, whenever appropriate.

Figure 16:
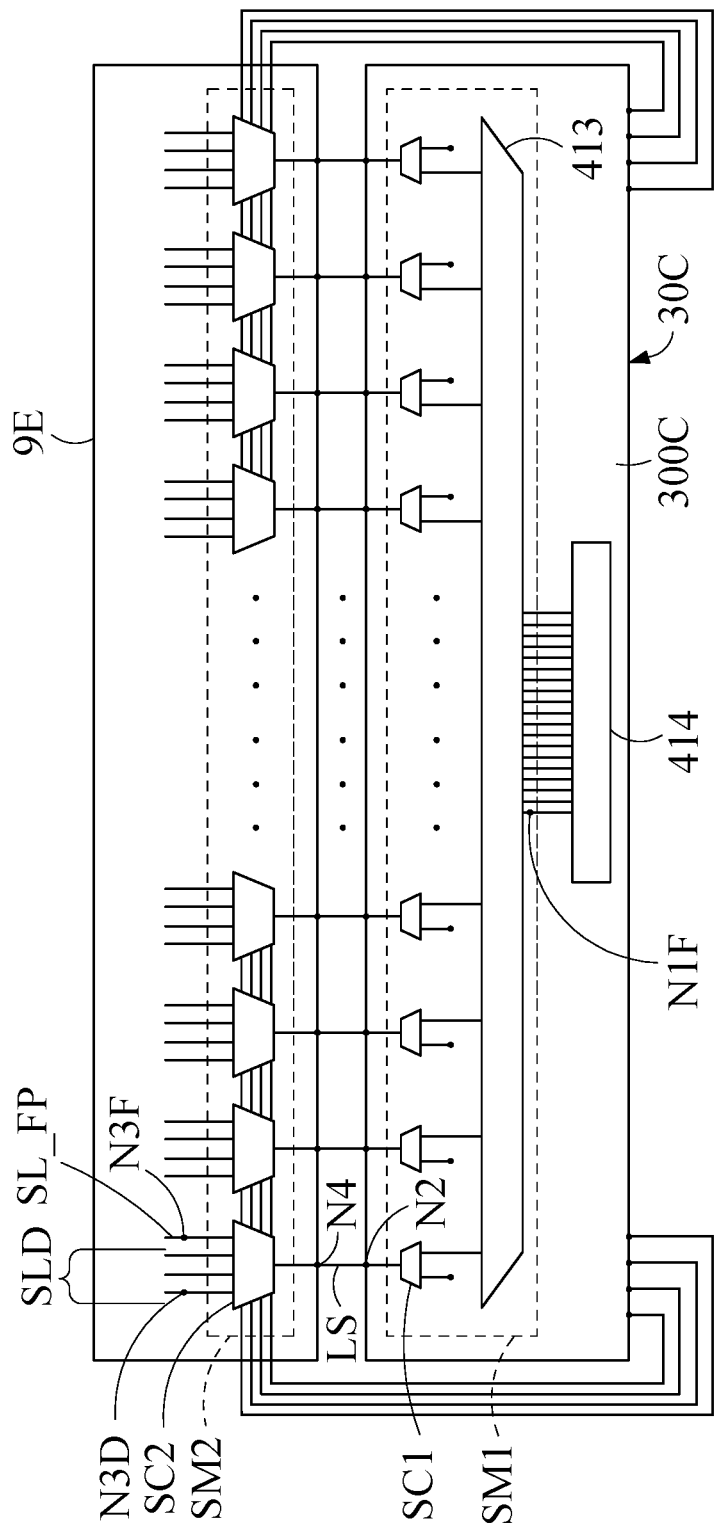
FIG. 16 is a schematic diagram illustrating a routing structure between a single-chip device (or electronic module) and the panel according to an embodiment of the invention.
Figure 17:
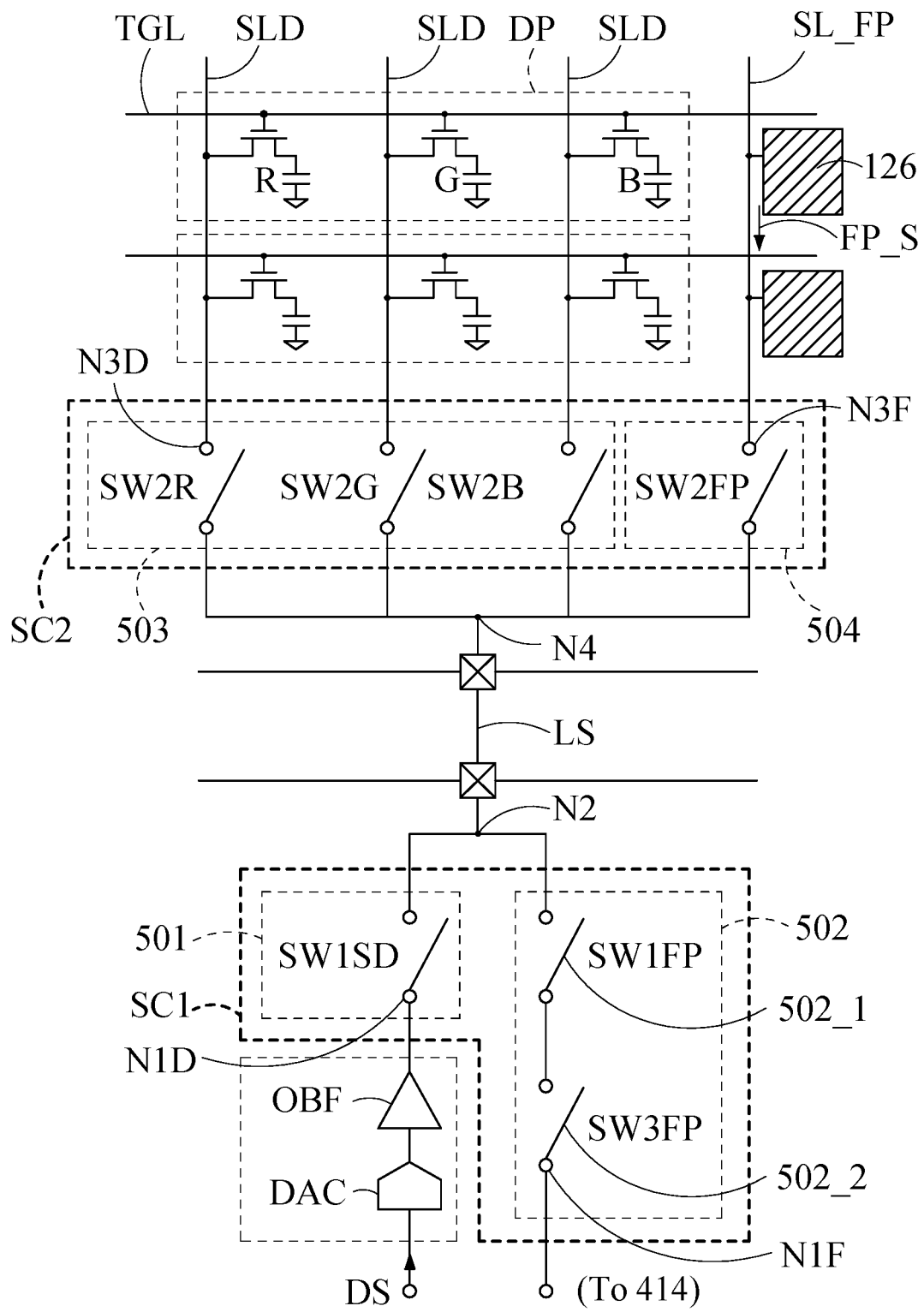
FIG. 17 is a schematic diagram illustrating a selection circuit on a single-chip device (or electronic module) and the panel according to an embodiment of the invention.

FIG. 16 and FIG. 17 are schematic diagrams illustrating a routing structure between a single-chip device (or electronic module) 30C and a display panel 9E according to an embodiment based on the architecture of FIG. 1. Referring to FIGS. 16 and 17, the single-chip device 30C includes a selection module SM1 (or a first switch circuit). The display panel 9E includes a selection module SM2 (or a second switch circuit). The selection module SM1 is configurable to be coupled to the selection module SM2 via traces (or transmission lines) LS.

The selection module SM1 includes a plurality of first terminals N1D and N1F and a plurality of second terminals N2, wherein the second terminals N2 can be regarded as or coupled to pads of the fourth pads, such as first sub-group of pads P41A as illustrated in FIG. 13 or 14. The number of the first terminals N1D and N1F is larger than the number of the second terminals N2. The first terminals N1D are coupled to the display driver circuit (e.g., 11 or 11A) or touch-display driver circuit (e.g., 21A). In the present embodiment, the display driver circuit (e.g., 11 or 11A) includes a signal processing circuit including an output buffer OBF and a signal converter DAC and outputs display driving signals DS for driving the display panel 9E. The first terminals N1F are coupled to a fingerprint AFE circuit 414 of the fingerprint driver circuit (e.g., 19, 19A, or 29A). The second terminals N2 is configurable to be coupled to the selection module SM2 of the display panel 9E via the traces LS.

In the present embodiment, the selection module SM1 includes a plurality of selection circuits SC1. Each of the selection circuits SC1 includes a first switch element 501 and a second switch element 502. The first switch element 501 is coupled between the signal processing circuit and a corresponding one of the second terminals N2. The first switch element 501 is controlled to transmit the display driving signals DS from the signal processing circuit in a display driving phase (a first time interval). The second switch element 502 is coupled between the fingerprint driver circuit (e.g., 19, 19A, or 29A) and a corresponding one of the second terminals N2. The second switch element 502 is controlled to transmit fingerprint sensing signals FP_S from the display panel 9E to the fingerprint driver circuit (e.g., 19, 19A, or 29A) in a fingerprint sensing phase (a second time interval).

The second switch element 502 may include a first switch device 502_1 and a second switch device 502_2. The first switch device 502_1 is coupled to the corresponding one of the second terminals N2 and the fingerprint driver circuit (e.g., 19, 19A, or 29A). The first switch device 502_1 is controlled to transmit the fingerprint sensing signals FP_S to the fingerprint driver circuit (e.g., 19, 19A, or 29A) in the fingerprint sensing phase. The second switch device 502_2 is coupled between the first switch device 502_1 and the fingerprint driver circuit (e.g., 19, 19A, or 29A). The second switch device 502_2 is controlled to transmit the fingerprint sensing signals FP_S to the fingerprint driver circuit (e.g., 19, 19A, or 29A) in response to a determination of touch information in the fingerprint sensing phase. The first switch device 502_1 and the second switch device 502_2 are controlled by different control signals SW1FP and SW3FP, respectively. That is to say, the control signal SW1FP is asserted in the fingerprint sensing phase and the control signal SW3FP is asserted according to the touch information in the fingerprint sensing phase.

The selection module SM2 includes a plurality of third terminals N3D and N3F and a plurality of fourth terminals N4. The number of the third terminals N3D and N3F is larger than the number of the fourth terminals N4. The third terminals N3D are coupled to the display data lines SLD. The third terminals N3F are coupled to the fingerprint sensing lines SL_FP. The fourth terminals N4 are configurable to be coupled to the selection module SM1 of the single-chip device 30C via the traces LS.

To be specific, the selection module SM2 includes a plurality of selection circuits SC2. Each of the selection circuits SC2 includes a plurality of third switch elements 503 and one or more fourth switch elements 504. The third switch elements 503 are coupled between the third terminals N3D (respective first part of the third terminals) and the fourth terminals N4 (one of the fourth terminals). The fourth switch element 504 is coupled between the third terminals N3F (respective second part of the third terminals) and the fourth terminals N4 (the one of the fourth terminals). The first part (e.g., N3D) of the third terminals N3D and N3F is coupled to the data lines SLD of the display panel 9E, and the second part (e.g., N3F) of the third terminals N3D and N3F is coupled to the fingerprint sensing lines SL_FP. In the present embodiment, the third switch elements 503 are switched to receive the display driving signals DS from the single-chip device 30C in the display driving phase. The fourth switch element 504 is switched to transmit the fingerprint sensing signals FP_S to the single-chip device 30C in the fingerprint sensing phase.

In the present embodiment, the single-chip device 30C (e.g. a control circuit of the single-chip device, such as 10 or 10A) is configured to generate control signals for controlling the selection modules SM1 and SM2. For example, the single-chip device 30C generates the control signals SW1SD, SW1FP and SW3FP to control corresponding switch elements of the selection circuits SC1 of the selection module SM1, and generates the control signals SW2R, SW2G, SW2B and SW2FP to control corresponding switch elements of the selection circuits SC2 of the selection module SM2.

In the display driving phase, the control signal SW1SD turns on the corresponding switch elements of the selection module SM1, and the control signals SW2R, SW2G and SW2B turn on the corresponding switch elements of the selection module SM2. The selection module SM2 is switched to receive the display driving signals DS from the single-chip device 30C in the display driving phase. To be specific, the third switch elements 503 are switched to receive the display driving signals DS from the single-chip device 30C in the display driving phase. On the other hand, the control signals SW1FP and SW3FP turn off the corresponding switch elements of the selection module SM1, and the control signal SW2FP turns off the corresponding switch elements of the selection module SM2 in the display driving phase.

Therefore, the display driving signals DS are outputted from the single-chip device 30C to the display panel 9E via the traces LS and the selection modules SM1 and SM2. That is to say, the single-chip device 30C generates the control signals SW1SD, SW2R, SW2G and SW2B for controlling the selection modules SM1 and SM2, so as to transmit the display driving signals DS from the display driver circuit (11 or 11A) or touch-display driver circuit (e.g., 21A) to the data lines SLD through the selection modules SM1 and SM2 in the display driving phase. In the present embodiment, the display pixel DP includes three sub-pixels but the invention is not limited thereto. The display driving signals DS is multiplexed RGB signals in this case, and is delivered to respective data lines SLD on the display panel 9E through the selection modules SM1 and SM2.

In the fingerprint sensing phase, the control signals SW1FP and SW3FP turn on the corresponding switch elements of the selection module SM1, and the control signal SW2FP turns on the corresponding switch elements of the selection module SM2. The selection module SM2 is switched to transmit the fingerprint sensing signals FP_S from the display panel 9E to the single-chip device 30C in the fingerprint sensing phase. To be specific, the fourth switch elements 504 are switched to transmit the fingerprint sensing signals FP_S to the single-chip device 30C in the fingerprint sensing phase.

On the other hand, the control signal SW1SD turns off the corresponding switch elements of the selection module SM1, and the control signals SW2R, SW2G and SW2B turn off the corresponding switch elements of the selection module SM2. Therefore, the fingerprint sensing signals FP_S are inputted from the display panel 9E to the single-chip device 30C via the traces LS and the selection modules SM1 and SM2. That is to say, the single-chip device 30C generates the control signals SW1FP, SW3FP and SW2FP for controlling the selection modules SM1 and SM2, so as to receive the fingerprint sensing signals FP_S from the fingerprint sensors 126 to the fingerprint AFE circuit 414 of the fingerprint driver circuit (e.g., 19, 19A, or 29A) through the selection modules SM1 and SM2 in the fingerprint sensing phase. In the present embodiment, the traces LS are shared by the display driving signals DS and the fingerprint sensing signals FP_S. The display driving signals DS and the fingerprint sensing signals FP_S are transmitted on the traces LS in different phases.

In a touch sensing phase (a third time interval), the control signals for controlling the corresponding switch elements of the selection modules SM1 and SM2 can be appropriately asserted to permit signal transmission to the data lines SLD and/or the fingerprint sensing lines SL_FP of the display panel 9E for facilitating touch sensing operation. For example, the control signals SW2R, SW2G, SW2B and SW2FP may turn on the corresponding switch elements of the selection module SM2 in the touch sensing phase to allow signals transmitted to the data lines SLD and/or the fingerprint sensing lines SL_FP. The signals may be a DC voltage such as a ground voltage or other AC voltages capable of reducing parasitic noises in the touch sensing operation.

Alternatively, the control signals for controlling the corresponding switch elements of the selection modules SM1 and SM2 can be appropriately de-asserted to prohibit the signal transmission to the data lines SLD and/or the fingerprint sensing lines SL_FP of the display panel 9E. The control signals SW1SD, SW1FP and SW3FP may turn off the corresponding switch elements of the selection module SM1, and/or the control signals SW2R, SW2G, SW2B and SW2FP may turn off the corresponding switch elements of the selection module SM2 in the touch sensing phase to prohibit signal transmission to the data lines SLD and/or the fingerprint sensing lines SL_FP. The prohibition of signal transmission may cause the data lines SLD and/or the fingerprint sensing lines SL_FP to be floated to avoid noises being coupled from parasitic capacitances in the touch sensing operation. Therefore, the single-chip device 30C respectively generates the control signals SW1SD, SW1FP, SW3FP and SW2R, SW2G, SW2B, SW2FP for controlling the selection modules SM1 and SM2, so as to cause the data lines SLD and/or the fingerprint sensing lines SL_FP of the display panel 9E to be floating or coupled to a DC voltage in the touch sensing phase. Since the data lines SLD and/or the fingerprint sensing lines SL_FP of the display panel 9E are floating or coupled to the DC voltage, parasitic capacitance affecting touch sensing signals is reduced.

Figure 18:
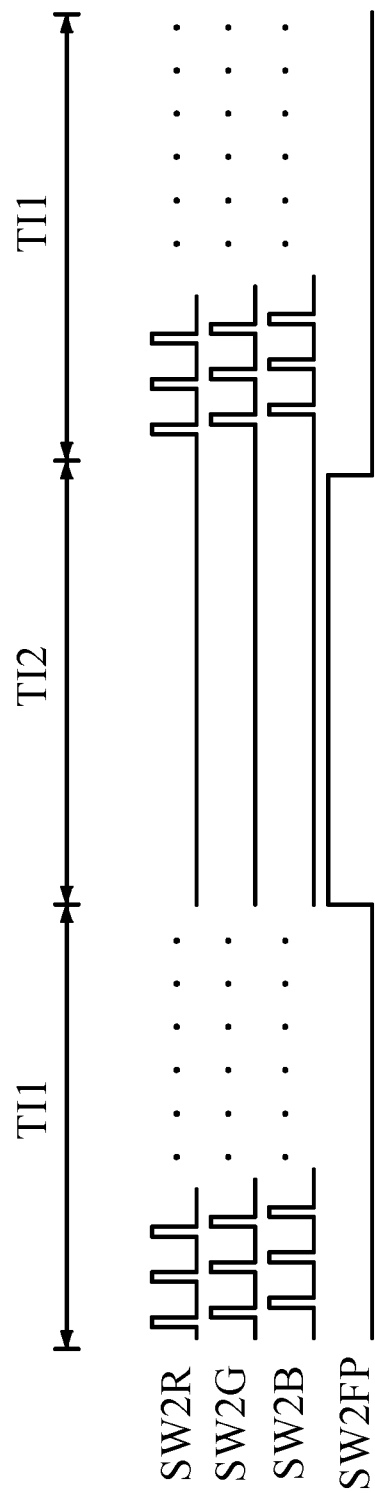
FIG. 18 is a waveform diagram illustrating the control signals for controlling switch elements depicted in FIG. 17.

FIG. 18 is a waveform diagram illustrating the control signals for controlling switch elements depicted in FIG. 17. Referring to FIGS. 16 to 17, the selection module SM2 is configured to perform a 1:Q demultiplexing (e.g., Q=4) for example. In the display driving phase TI1, the control signals SW2R, SW2G and SW2B sequentially turn on the corresponding switch elements of the selection module SM2. In the fingerprint sensing phase T12, the control signal SW2FP turns on the corresponding switch elements of the selection module SM2. It is noted that an additional touch sensing phase can be added. For example, the display driving phase TI1 may further include at least one sub-period (not shown) for touch sensing.

The embodiments as illustrated in FIGS. 16-18 can be applied to or combined with the embodiment as shown above (such as FIG. 15, any embodiments based on FIG. 6C or 6B, and so on) so as to achieve functionality of an FTDI single-chip device or electronic module as exemplified in the above various embodiments, whenever appropriate.

While the present disclosure has been described by means of specific embodiments, numerous modifications and variations could be made thereto by those skilled in the art without departing from the scope and spirit of the present disclosure set forth in the claims.

What is claimed is:

1. A single-chip device for driving a panel including a plurality of display pixels, a plurality of touch sensors, a plurality of fingerprint sensing pixels, a plurality of data lines coupled to the display pixels, a plurality of fingerprint sensing lines coupled to the fingerprint sensing pixels and a plurality of selection circuits, wherein each selection circuit of the plurality of selection circuits is coupled to a corresponding set of the plurality of data lines and to a corresponding fingerprint sensing line of the plurality of fingerprint sensing lines, and the single-chip device comprising:
   a main body having a left portion and a right portion with respect to an axis;
   a first group of pads disposed in the main body and comprising a plurality of first pads for driving the fingerprint sensing pixels, wherein the first group of pads are disposed on both the left portion and the right portion and configured to be coupled to the fingerprint sensing pixels; and
   a second group of pads disposed in the main body and comprising a plurality of second pads for driving the display pixels and a plurality of third pads coupled to the selection circuits of the panel, wherein the second group of pads are disposed on both the left portion and the right portion and configured to be coupled to the panel and a plurality of selection signals are outputted to each selection circuit of the plurality of selection circuits through the third pads.

2. The single-chip device according to claim 1, wherein the main body has a rectangular shape having a first side, a second side parallel to the first side and closer to the panel than the first side, a left side on the left portion and perpendicular to the first side and the second side, and a right side on the right portion and parallel to the left side, and the axis intersects with the first side and the second side.

3. The single-chip device according to claim 2, wherein all the first group of pads and all the second group of pads are disposed along the first side.

4. The single-chip device according to claim 3, wherein the first group of pads are closer to the axis than the second group of pads.

5. The single-chip device according to claim 3, wherein the second group of pads are closer to the axis than the first group of pads.

6. The single-chip device according to claim 2, wherein all the first group of pads and all the second group of pads are disposed along the second side.

7. The single-chip device according to claim 6, wherein the first group of pads are closer to the axis than the second group of pads.

8. The single-chip device according to claim 6, wherein the second group of pads are closer to the axis than the first group of pads.

9. The single-chip device according to claim 2, wherein all the first group of pads are disposed along one of the first side and the second side, and all the second group of pads are disposed along both the left side and the right side.

10. The single-chip device according to claim 2, wherein all the first group of pads are disposed along both the left side and the right side, and all the second group of pads are disposed along one of the first side and the second side.

11. The single-chip device according to claim 2, wherein all the first group of pads are disposed along the left side and the right side, and all the second group of pads are disposed along the left side and the right side.

12. The single-chip device according to claim 1, wherein the first pads comprise a plurality of fingerprint gate-driver-on-array selection pads.

13. The single-chip device according to claim 1, wherein the second pads comprise a plurality of gate-driver-on-array selection pads.

14. The single-chip device according to claim 1, wherein each of the selection circuits is further coupled to at least one of the fingerprint sensing lines.

15. The single-chip device according to claim 1, wherein the third pads are disposed on both the left portion and the right portion.

16. The single-chip device according to claim 1, wherein the main body has a rectangular shape having a first side and a second side parallel to the first side and closer to the panel than the first side, and
the third pads are disposed along the first side.

17. The single-chip device according to claim 1, wherein the main body has a rectangular shape having a first side and a second side parallel to the first side and closer to the panel than the first side, and
the third pads are disposed along the second side.

18. The single-chip device according to claim 1, wherein the panel further comprises a plurality of data lines coupled to the display pixels, a plurality of fingerprint sensing lines coupled to the fingerprint sensing pixels, and a plurality of touch sensing lines coupled to the touch sensors, and the single-chip device further comprises:
a third group of pads, disposed in the main body, for driving the data lines or receiving fingerprint sensing signals from the fingerprint sensing lines or for being coupled to the touch sensing lines of the panel and receiving touch signals from the touch sensing lines.

19. The single-chip device according to claim 18, wherein the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

20. The single-chip device according to claim 19, wherein the panel further comprises a plurality of selection circuits, wherein each of the selection circuits is coupled to a corresponding set of the plurality of data lines and a corresponding one of the fingerprint sensing lines, and wherein the first sub-group of pads are configured to be coupled to the selection circuits.

21. The single-chip device according to claim 19, wherein the first sub-group of pads and the second sub-group of pads are alternately disposed on the main body.

22. The single-chip device according to claim 19, wherein the first sub-group of pads are configured to drive the data lines in a time-division manner with the second sub-group of pads receiving touch signals from the touch sensing lines.

23. The single-chip device according to claim 18, wherein
the main body has a rectangular shape having a first side and a second side parallel to the first side and closer to the panel than the first side, and
the third group of pads are disposed along the second side.

24. The single-chip device according to claim 1, further comprising:
a fingerprint driver circuit disposed in the main body and coupled to the first pads, and
a touch-display driver circuit disposed in the main body and coupled to the second pads and the third pads.

25. The single-chip device according to claim 1, wherein
in the right portion, none of the third pads is disposed between the first pads and the second pads, and
in the left portion, none of the third pads is disposed between the first pads and the second pads.

26. The single-chip device according to claim 1, wherein the third pads are disposed beside the second pads and not beside the first pads.

27. The single-chip device according to claim 1, wherein the second pads are disposed beside the first pads and beside the third pads.

28. The single-chip device according to claim 1, wherein the main body is configured to be disposed on a film as a chip-on-film structure.

29. The single-chip device according to claim 1, wherein the main body is configured to be disposed on a glass as a chip-on-glass structure.

30. The single-chip device according to claim 1, further comprising:
a fingerprint driver circuit disposed in the main body and coupled to the first group of pads, and
a touch-display driver circuit disposed in the main body and coupled to the second group of pads.

31. The single-chip device according to claim 1, wherein
in the right portion, none of the first group of pads is disposed between the second group of pads, and none of the second group of pads is disposed between the first group of pads, and
in the left portion, none of the first group of pads is disposed between the second pads, and none of the second group of pads is disposed between the first pads.

32. The single-chip device according to claim 1, wherein the panel further comprises at least one first gate-on-array (GOA) circuit, and the first group of pads are configured to be coupled to the fingerprint sensing pixels through the at least one first GOA circuit.

33. The single-chip device according to claim 32, wherein the panel further comprises at least one second gate-on-array (GOA) circuit, and the second group of pads are configured to be coupled to the display pixels through the at least one second GOA circuit.

34. A single-chip device for driving a panel, the panel including a plurality of display pixels, a plurality of touch sensors, and a plurality of fingerprint sensing pixels, the panel further including a plurality of data lines coupled to the display pixels, a plurality of fingerprint sensing lines coupled to the fingerprint sensing pixels, a plurality of touch sensing lines coupled to the touch sensors, and a plurality of selection circuits each coupled to a corresponding set of the plurality of data lines, the single-chip device comprising:
a main body having a left portion and a right portion with respect to an axis, wherein the main body has a rectangular shape having a first side and a second side parallel to the first side and closer to the panel than the first side;
a first group of pads disposed in the main body and comprising a plurality of first pads for driving the fingerprint sensing pixels, the first group of pads being disposed on both the left portion and the right portion and configured to be coupled to the fingerprint sensing pixels; and
a second group of pads disposed in the main body and comprising a plurality of second pads for driving the display pixels, and a plurality of third pads for controlling the selection circuits, the second group of pads being disposed on both the left portion and the right portion and configured to be coupled to the panel, wherein the third pads are disposed along the first side; and
a third group of pads, disposed in the main body, for driving the data lines or receiving fingerprint sensing signals from the fingerprint sensing lines or for being coupled to the touch sensing lines of the panel and receiving touch signals from the touch sensing lines, wherein the third group of pads are disposed along the second side.

35. The single-chip device according to claim 34, wherein the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

36. The single-chip device according to claim 35, wherein each of the selection circuits is further coupled to a corresponding one of the fingerprint sensing lines, and the first sub-group of pads are configured to be coupled to the selection circuits.

37. The single-chip device according to claim 35, wherein the first sub-group of pads are configured to drive the data lines in a time-division manner with the second sub-group of pads receiving touch signals from the touch sensing lines.

38. The single-chip device according to claim 34, wherein the panel further comprises at least one first gate-on-array (GOA) circuit, and the first group of pads are configured to be coupled to the fingerprint sensing pixels through the at least one first GOA circuit.

39. The single-chip device according to claim 38, wherein the panel further comprises at least one second gate-on-array (GOA) circuit, and the second group of pads are configured to be coupled to the display pixels through the at least one second GOA circuit.

40. An electronic module for driving a panel including a plurality of fingerprint sensing pixels, a plurality of display pixels, a plurality of touch sensors, a plurality of data lines coupled to the display pixels, a plurality of fingerprint sensing lines coupled to the fingerprint sensing pixels and a plurality of selection circuits, wherein each selection circuit of the plurality of selection circuits is coupled to a corresponding set of the plurality of data lines and to a corresponding fingerprint sensing line of the plurality of fingerprint sensing lines, and, the electronic module comprising:
a film configured to be electrically coupled to the fingerprint sensing pixels, the display pixels, and the touch sensors; and
a single-chip device disposed on the film, the single-chip device comprising:
a main body having a left portion and a right portion with respect to an axis;
a first group of pads disposed in the main body and comprising a plurality of first pads for driving the fingerprint sensing pixels, wherein the first group of pads are disposed on both the left portion and the right portion and configured to be electrically coupled to the fingerprint sensing pixels; and
a second group of pads disposed in the main body and comprising a plurality of second pads for driving the display pixels and a plurality of third pads coupled to the selection circuits of the panel, wherein the second group of pads are disposed on both the left portion and the right portion and configured to be electrically coupled to the panel and a plurality of selection signals are outputted to each selection circuit of the plurality of selection circuits through the third pads.

41. The electronic module according to claim 40, wherein the main body has a rectangular shape having a first side, a second side parallel to the first side and closer to the display than the first side, a left side on the left portion and perpendicular to the first side and the second side, and a right side on the right portion and parallel to the left side, and the axis intersects with the first side and the second side.

42. The electronic module according to claim 41, wherein all the first group of pads and all the second group of pads are disposed along the first side.

43. The electronic module according to claim 42, wherein the first group of pads are closer to the axis than the second group of pads.

44. The electronic module according to claim 42, wherein the second group of pads are closer to the axis than the first group of pads.

45. The electronic module according to claim 41, wherein all the first group of pads and all the second group of pads are disposed along the second side.

46. The electronic module according to claim 45, wherein the first group of pads are closer to the axis than the second group of pads.

47. The electronic module according to claim 45, wherein the second group of pads are closer to the axis than the first group of pads.

48. The electronic module according to claim 41, wherein all the first group of pads are disposed along one of the first side and the second side, and all the second group of pads are disposed along both the left side and the right side.

49. The electronic module according to claim 41, wherein all the first group of pads are disposed along both the left side and the right side, and all the second group of pads are disposed along one of the first side and the second side.

50. The electronic module according to claim 41, wherein all the first group of pads are disposed along the left side and the right side, and all the second group of pads are disposed along the left side and the right side.

51. The electronic module according to claim 50, wherein the first pads comprise a plurality of fingerprint gate-driver-on-array selection pads.

52. The electronic module according to claim 50, wherein the second pads comprise a plurality of gate-driver-on-array selection pads.

53. The electronic module according to claim 41, wherein each of the selection circuits is further coupled to at least one of the fingerprint sensing lines.

54. The electronic module according to claim 40, wherein the third pads are disposed on both the left portion and the right portion.

55. The electronic module according to claim 40, wherein the main body has a rectangular shape having a first side and a second side parallel to the first side and closer to the panel than the first side, and
the third pads are disposed along the first side.

56. The electronic module according to claim 40, wherein the main body has a rectangular shape having a first side and a second side parallel to the first side and closer to the panel than the first side, and
the third pads are disposed along the second side.

57. The electronic module according to claim 40, wherein the panel further comprises a plurality of data lines coupled to the display pixels, a plurality of fingerprint sensing lines coupled to the fingerprint sensing pixels, the single-chip device further comprises:
a third group of pads, disposed in the main body, for driving the data lines or receiving fingerprint sensing signals from the fingerprint sensing lines or for being coupled to the touch sensing lines of the panel and receiving touch signals from the touch sensing lines.

58. The electronic module according to claim 57, wherein the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

59. The electronic module according to claim 58, wherein the panel further comprises a plurality of selection circuits, wherein each of the selection circuits is coupled to a corresponding set of the plurality of data lines and a corresponding one of the fingerprint sensing lines, and wherein the first sub-group of pads are configured to be coupled to the selection circuits.

60. The electronic module according to claim 58, wherein the first sub-group of pads and the second sub-group of pads are alternately disposed on the main body.

61. The electronic module according to claim 58, wherein the first sub-group of pads are configured to drive the data lines in a time-division manner with the second sub-group of pads receiving touch signals from the touch sensing lines.

62. The electronic module according to claim 57, wherein the main body has a rectangular shape having a first side and a second side parallel to the first side and closer to the panel than the first side, and
the third group of pads are disposed along the second side.

63. The electronic module according to claim 40, further comprising:
a fingerprint driver circuit disposed in the main body and coupled to the first pads, and
a touch-display driver circuit disposed in the main body and coupled to the second pads and the third pads.

64. The electronic module according to claim 40, wherein in the right portion, none of the third pads is disposed between the first pads and the second pads, and
in the left portion, none of the third pads is disposed between the first pads and the second pads.

65. The electronic module according to claim 40, wherein the third pads are disposed beside the second pads and not beside the first pads.

66. The electronic module according to claim 40, wherein the second pads are disposed beside the first pads and beside the third pads.

67. The electronic module according to claim 40, further comprising:
a fingerprint driver circuit disposed in the main body and coupled to the first group of pads, and
a touch-display driver circuit disposed in the main body and coupled to the second group of pads.

68. The electronic module according to claim 40, wherein in the right portion, none of the first group of pads is disposed between the second group of pads, and none of the second group of pads is disposed between the first group of pads, and
in the left portion, none of the first group of pads is disposed between the second pads, and none of the second group of pads is disposed between the first pads.

69. The electronic module according to claim 40, wherein the fingerprint sensing pixels correspond to a fingerprint sensing region, the panel has a display region, the touch sensors correspond to a touch sensing region, and sizes of the fingerprint sensing region, the display region, and the touch sensing region are substantially the same.

70. The electronic module according to claim 40, wherein the panel further comprises at least one first gate-on-array (GOA) circuit, and the first group of pads are configured to be coupled to the fingerprint sensing pixels through the at least one first GOA circuit.

71. The electronic module according to claim 70, wherein the panel further comprises at least one second gate-on-array (GOA) circuit, and the second group of pads are configured to be coupled to the display pixels through the at least one second GOA circuit.

72. An electronic apparatus, comprising:
a panel including a plurality of display pixels, a plurality of touch sensors, a plurality of fingerprint sensing pixels, a plurality of data lines coupled to the display pixels, a plurality of fingerprint sensing lines coupled to the fingerprint sensing pixels and a plurality of selection circuits, wherein each selection circuit of the plurality of selection circuits is coupled to a corresponding set of the plurality of data lines and to a corresponding fingerprint sensing line of the plurality of fingerprint sensing lines; and a single-chip device for being coupled to the panel, the single-chip device comprising:
a main body having a left portion and a right portion with respect to an axis;
a first group of pads disposed in the main body and comprising a plurality of first pads for driving the fingerprint sensing pixels, wherein the first group of pads are disposed on both the left portion and the right portion and electrically coupled to the fingerprint sensing pixels; and
a second group of pads disposed in the main body and comprising a plurality of second pads for driving the display pixels and a plurality of third pads coupled to the selection circuits of the panel, wherein the second group of pads are disposed on both the left portion and the right portion and electrically coupled to the panel and a plurality of selection signals are outputted to each selection circuit of the plurality of selection circuits through the third pads.

73. The electronic apparatus according to claim 72, wherein the main body has a rectangular shape having a first side, a second side parallel to the first side and closer to the display than the first side, a left side on the left portion and perpendicular to the first side and the second side, a right side on the right portion and parallel to the left side, and the axis intersects with the first side and the second side.

74. The electronic apparatus according to claim 73, wherein all the first group of pads and all the second group of pads are disposed along the first side.

75. The electronic apparatus according to claim 74, wherein the first group of pads are closer to the axis than the second group of pads.

76. The electronic apparatus according to claim 74, wherein the second group of pads are closer to the axis than the first group of pads.

77. The electronic apparatus according to claim 73, wherein all the first group of pads and all the second group of pads are disposed along the second side.

78. The electronic apparatus according to claim 77, wherein the first group of pads are closer to the axis than the second group of pads.

79. The electronic apparatus according to claim 77, wherein the second group of pads are closer to the axis than the first group of pads.

80. The electronic apparatus according to claim 73, wherein all the first group of pads are disposed along one of the first side and the second side, and all the second group of pads are disposed along both the left side and the right side.

81. The electronic apparatus according to claim 73, wherein all the first group of pads are disposed along both the left side and the right side, and all the second group of pads are disposed along one of the first side and the second side.

82. The electronic apparatus according to claim 73, wherein all the first group of pads are disposed along the left side and the right side, and all the second group of pads are disposed along the left side and the right side.

83. The electronic apparatus according to claim 72, wherein the first pads comprise a plurality of fingerprint gate-driver-on-array selection pads.

84. The electronic apparatus according to claim 72, wherein the second pads comprise a plurality of gate-driver-on-array selection pads.

85. The electronic apparatus according to claim 74, wherein each of the selection circuits is further coupled to at least one of the fingerprint sensing lines.

86. The electronic apparatus according to claim 72, wherein the third pads are disposed on both the left portion and the right portion.

87. The electronic apparatus according to claim 72, wherein
the main body has a rectangular shape having a first side and a second side parallel to the first side and closer to the panel than the first side, and
the third pads are disposed along the first side.

88. The electronic apparatus according to claim 72, wherein
the main body has a rectangular shape having a first side and a second side parallel to the first side and closer to the panel than the first side, and
the third pads are disposed along the second side.

89. The electronic apparatus according to claim 72, wherein the panel further comprises a plurality of data lines coupled to the display pixels, a plurality of fingerprint sensing lines coupled to the fingerprint sensing pixels, the single-chip device further comprises:
a third group of pads, disposed in the main body, for driving the data lines or receiving fingerprint sensing signals from the fingerprint sensing lines or for being coupled to the touch sensing lines of the panel and receiving touch signals from the touch sensing lines.

90. The electronic apparatus according to claim 89, wherein the third group of pads comprise: a first sub-group of pads for driving the data lines and receiving fingerprint sensing signals from the fingerprint sensing lines in a time-division manner; and a second sub-group of pads, configured to be coupled to the touch sensing lines of the panel, for receiving touch signals from the touch sensing lines.

91. The electronic apparatus according to claim 90, wherein the panel further comprises a plurality of selection circuits, wherein each of the selection circuits is coupled to a corresponding set of the plurality of data lines and a corresponding one of the fingerprint sensing lines, and wherein the first sub-group of pads are configured to be coupled to the selection circuits.

92. The electronic apparatus according to claim 90, wherein the first sub-group of pads and the second sub-group of pads are alternately disposed on the main body.

93. The electronic apparatus according to claim 90, wherein the first sub-group of pads are configured to drive the data lines in a time-division manner with the second sub-group of pads receiving touch signals from the touch sensing lines.

94. The electronic apparatus according to claim 89, wherein
the main body has a rectangular shape having a first side and a second side parallel to the first side and closer to the panel than the first side, and
the third group of pads are disposed along the second side.

95. The electronic apparatus according to claim 72, further comprising:
a fingerprint driver circuit disposed in the main body and coupled to the first pads, and
a touch-display driver circuit disposed in the main body and coupled to the second pads and the third pads.

96. The electronic apparatus according to claim 72, wherein
in the right portion, none of the third pads is disposed between the first pads and the second pads, and
in the left portion, none of the third pads is disposed between the first pads and the second pads.

97. The electronic apparatus according to claim 72, wherein the third pads are disposed beside the second pads and not beside the first pads.

98. The electronic apparatus according to claim 72, wherein the second pads are disposed beside the first pads and beside the third pads.

99. The electronic apparatus according to claim 72, further comprising:
a fingerprint driver circuit disposed in the main body and coupled to the first group of pads, and
a touch-display driver circuit disposed in the main body and coupled to the second group of pads.

100. The electronic apparatus according to claim 72, wherein
in the right portion, none of the first group of pads is disposed between the second group of pads, and none of the second group of pads is disposed between the first group of pads, and
in the left portion, none of the first group of pads is disposed between the second group of pads, and none of the second group of pads is disposed between the first group of pads.

101. The electronic apparatus according to claim 72, wherein the fingerprint sensing pixels correspond to a fingerprint sensing region, the panel has a display region, the touch sensors correspond to a touch sensing region, and sizes of the fingerprint sensing region, the display region, and the touch sensing region are substantially the same.

102. The electronic apparatus according to claim 72, further comprising a substrate, and the display pixels, the touch sensors, and the fingerprint sensing pixels are disposed on the substrate.

103. The electronic apparatus according to claim 102, wherein the substrate includes a glass and the single-chip device is disposed on a portion of the glass as a chip-on-glass structure.

104. The electronic apparatus according to claim 102, wherein the substrate includes a film, and the single-chip device is disposed on the film as a chip-on-film structure.

105. The electronic apparatus according to claim 72, wherein the panel further comprises at least one first gate-on-array (GOA) circuit, and the first group of pads are configured to be coupled to the fingerprint sensing pixels through the at least one first GOA circuit.

106. The electronic apparatus according to claim 105, wherein the panel further comprises at least one second gate-on-array (GOA) circuit, and the second group of pads are configured to be coupled to the display pixels through the at least one second GOA circuit and at least some pads of the second group of pads are configured for coupling to gate-on-array (GOA) circuit for display pixels of the panel.

* * * * *